United States Patent [19]

Clausing

[11] 4,091,448

[45] May 23, 1978

[54] OFF-LINE, ONE-LEVEL/ON-LINE, TWO-LEVEL TIMESHARED AUTOMATED BANKING SYSTEM

[76] Inventor: Martin B. Clausing, 2 Concord Woods #17, Milford, Ohio 45150

[21] Appl. No.: 736,900

[22] Filed: Oct. 29, 1976

[51] Int. Cl.² ........................ H04Q 9/00; G06F 15/00

[52] U.S. Cl. ...................................... 364/200; 235/379

[58] Field of Search ...................... 235/61.7 B, 61.7 R; 340/149 A, 153; 364/900, 200

[56] References Cited

U.S. PATENT DOCUMENTS

| | | | |
|---|---|---|---|
| 3,622,995 | 11/1971 | Dilks et al. | 340/153 |
| 3,770,941 | 11/1973 | Gechele et al. | 235/61.7 B |
| 3,931,497 | 1/1976 | Gentile et al. | 235/61.7 B |
| 3,937,925 | 2/1976 | Boothroyd | 235/61.7 B |
| 3,941,977 | 3/1976 | Voss et al. | 235/61.7 B |
| 3,956,615 | 5/1976 | Anderson et al. | 235/61.7 B |
| 3,970,992 | 7/1976 | Boothroyd et al. | 235/61.7 B |
| 3,982,103 | 9/1976 | Goldman | 235/61.7 B |

*Primary Examiner*—Leo H. Boudreau

[57] ABSTRACT

An automated banking system is responsive to data on a customer's card and customer responses to messages which the system displays. The system includes a central processor which is interconnected with at least one local processor via a communication network. Each locl processor is interconnected via another communication network or a data link with a plurality of customer stations which timeshare the local processor. The central processor preferably determines the mode of operation of each local processor, and each local processor is operable in either an off-line mode or an on-line mode.

Each local processor in the off-line mode does not communicate with the central processor. The local processor determines which transactions customers may perform and processes customer-selected transactions by means of data on customers' cards and customers' responses that are sent to the local processor by customer stations which timeshare the local processor.

Each local processor in the on-line mode timeshares the central processor. The central processor communicates data to the local processor in response to request messages from the local processor. From communicated data, which includes customers' account descriptions, the local processor determines which transactions customers may perform. The local processor processes customer-selected transactions by means of data communicated by the central processor as well as customers' responses that are sent to the local processor by the customer stations which timeshare the local processor.

10 Claims, 25 Drawing Figures

OFF-LINE, ONE-LEVEL/ON-LINE, TWO-LEVEL TIMESHARED AUTOMATED BANKING SYSTEM

BACKGROUND OF THE INVENTION

The present invention relates to a system for processing commercial or financial transactions and, specifically, to an automated banking system which includes a central processor that is timeshared by a plurality of local transaction processors, wherein each local transaction processor is timeshared by a plurality of transaction input/output stations accessible to card-carrying customers.

Due to competition, financial institutions must constantly improve the quality of their services in order to keep present customers and attract new customers. To accomplish this objective, banks, for example, have resorted to establishment of branch offices. By using branch offices, banks are able to make their services more convenient to present customers in outlying areas, rather than requiring them to utilize a central location. They are also able to attract new customers who seek a conveniently located bank. However, branch banking is expensive since each branch office requires substantial capital investment and operational expense. In their search for new business methods to reduce the cost of their financial services, banks have installed, for example, manned, or staffed, counters in supermarkets, shopping center malls, and airports.

A pressure on banks for added services stems from customer's inability to satisfy their banking needs during normal banking hours except at considerable inconvenience, such as when customers must interrupt their work to journey to the bank during normal banking hours because banking hours coincide with their working hours. Thus, customers want extended banking hours or after-hours banking. Additionally, most banks are closed on Saturday and Sunday, yet a substantial share of purchases of consumer goods occurs on weekends. As a result, customers want access to their bank on weekends. Customers also wish to transact business around-the-clock at locations such as hospitals, hotels, bus depots, airports, etc. Thus, customer's demand for after-hours, weekend, and around-the-clock banking services has increased the problem banks have in satisfying their customers.

To meet these needs banks have begun to use unmanned, automated card-responsive banking equipment. Voss et al., "Off-Line Cash Dispenser and Banking System," U.S. Pat. No. 3,845,277 disclosed such an unmanned, automated card-responsive teller. The teller unit is completely self-contained, relying on data stored on the customer's card and/or stored locally in a memory at the site of the installation to limit the nature and/or amount of transactions. Such equipment can be located at a remote location to serve as a branch office at significantly reduced capital investment and operational expense, or outside a bank building for use when the bank is closed. In either case, the customer receives the benefit of after-hours, weekend, and around-the-clock banking services, including cash withdrawal, fund transfer, and payment and deposit transactions.

While these teller units have been extremely useful, they are not without limitations. For example, the immediate centralized accounting capability of conventional teller-assisted banking systems, which facilitates maintenance of an up-to-date running balance of each customer's account, is absent. Moreover, the teller unit must operate under limitations imposed by the types and amounts of data which are encoded on the customer's card and which can be stored locally in the teller unit memory. To increase the flexibility of the teller unit by increasing the size of the memory and/or the amount of hardware increases the cost.

An even more recent development in automated banking systems is described in Slater et al. U.S. Ser. No. 722,741 Sept. 13, 1976) which is entitled "On-line/-Off-line Automated Banking System." Slater et al. comprehend a plurality of remotely located card-responsive transaction and cash dispensing units which are each interconnected with a central unit via a communication network. The Slater et al. system provides "off-line" operation of the remote unit when access to the central unit is not available or desired. In the "off-line" mode, the remote unit does not communicate with the central unit. In the "off-line" mode, the remote unit is responsive to insertion of a customer's card to initiate a series of one or more customer transactions, including cash withdrawal, fund transfer between accounts, and deposit and payment transactions, based on an evaluation of data encoded on the customer's card and the customer's responses to instruction messages. The card includes a code which the remote unit uses to identify the transactions from among which the remote unit permits the customer to select. The card also includes data which the remote unit uses to process a customer-entered transaction. In the "off-line" mode the remote unit records customer transaction data for all "off-line" transactions. As distinguished from previous "off-line" systems, the remote unit is able to send the transaction data in a series of completion messages to the central unit when the system resumes "on-line" operation.

The Slater et al. system provides "on-line" operation of the remote unit when access to the central unit is available. In the "on-line" mode, the remote unit communicates with the central unit. The remote unit requests account descriptions, which identify the customer's accounts, account balances, and the central unit sends this data to the remote unit. The remote unit is responsive to receipt of the reply from the central unit to initiate a series of one or more customer transactions based on an evaluation of data which the central unit sent and the customer's responses to instructional messages. The remote unit uses the account descriptions to identify the transactions from among which the remote unit permits the customer to select. The remote unit uses the account balances and other data which the central unit may send to process a customer-entered transaction.

The Slater et al. system requires a single data communication from the remote unit to the central unit and a single data communication from the central unit to the remote unit on the "on-line" mode to enable the remote unit to process a series of one or more transactions which a customer selects. This reduces central unit processing time and system communication time. Such an "on-line" system is to be contrasted with prior art schemes in which the central unit, rather than the remote unit, determines the propriety of the transaction by comparison at the central unit of (a) transaction data sent by the remote unit and (b) account data stored at the central unit, and in which the central unit thereafter sends an "approval" or "disapproval" reply to the remote unit which in response grants or denies the customer request, depending upon whether it was approved or disapproved by the central unit. Once the transactions are completed at the remote unit, a single transmission of the nature and amount of the transaction to the central unit will suffice to permit the central unit records to be updated to reflect the transaction.

While the Slater et al. system provides significant advantages over prior art "off-line" and "on-line" systems, the system is relatively expensive.

Part of the expense of the Slater et al. system is due to the fact that each remote unit is an integrated processor and customer input/output terminal. The processor both processes transactions and supervises input functions, such as to elicit customer responses which the processor needs to process a customer transaction and output functions, such as to print transaction receipts, etc. A greater percentage of processor time is spent on supervision of simple yet slow input/output functions, such as displaying messages which elicit customer responses, than on more complicated but faster data processing operations. Hence, expensive data processing elements are constantly awaiting the completion of input/output functions during the transaction sequence. This means that the remote unit operates somewhat inefficiently and that the system is costly in terms of the productive use which is derived from the investment in data processing elements and, therefore, the productive use which is derived from overall investment in the system. Each remote unit in the Slater et al. system includes, in addition to registers which are used in processing transactions, a memory with records which are accessed when the remote unit performs certain checks on an inserted card, such as a determination whether the card is lost or stolen, fraudulently reproduced, etc. The fact that a memory must be provided for each remote unit increases the investment in each remote unit and, therefore, the overall investment in the system.

Also, if it is necessary to update the records in the memories at the Slater et al. remote units, for example, it is necessary to update the records which relate to lost or stolen cards, personnel must visit each installation and enter additions and deletions by means of a console. This results in a high system operating cost since personnel must be dispatched to each remote unit. Moreover, it is conceivable that a breach in the security of the system might occur in the event that the records in the memories at the remote units are not updated at the same time, since, for example, a stolen card could be used at remote units which had not yet been visited by bank personnel whereas the stolen card could not be used at remote units which had been visited. Even in the situation where the records in the memories at the remote units are updated by the central unit, the system operating cost could be high if a significant amount of central and remote unit time and communication time is required to enter additions and deletions. Nevertheless, the aforementioned problem with regard to a potential breach of security would still exist due to the method of polling which is used in the Slater et al. system whereby each remote unit memory is updated individually.

In the same vein, it is also necessary for personnel to visit the remote units of the Slater et al. system to obtain the hard copy or machine readable transaction records which are prepared by the remote units and which are used to verify transactions that the remote units send to the central unit during the on-line mode of operation. This leads to high system operating cost since personnel must be dispatched to each remote unit.

Finally, when the Slater et al. system is in the on-line mode of operation, the remote units are each polled by the central unit. Since each remote unit is capable of accommodating only one customer at a time, the Slater et al. system will have many remote units if the financial institution has a large number of customers so that these customers can have access to the service which is provided by the automated banking system. This results in line-loading of the central unit since the central unit sporatically polls each remote unit to determine whether or not a customer is actually using the remote unit. If the time period between polls is significant, the remote unit may also have to await data which the central unit sends to the remote unit in response to a request message during "on-line" operation. Hence, a customer may have to wait to perform his transactions while the central unit polls other remote units which are not in use.

One objective of the present invention is to provide an alternative to branch banking by providing automated customer stations in remote areas.

A second objective is to provide automated customer stations for the transaction of banking business after normal bank hours, on weekends, and around-the-clock.

An additional objective is to provide a local processor which is timeshared by a plurality of customer stations so that low-cost customer stations, which do not have data processing elements or memory, can be employed.

Another objective is to provide a local processor which is timeshared by a plurality of customer stations and which executes faster data processing functions associated with a transaction but relegates slower input/output functions associated with a transaction to a customer station, to reduce demand on the local processor by a customer station to a minimum and to maximize use of timeshared data processing elements at the local processor by the plurality of customer stations.

An additional objective is to provide a local processor which is timeshared by a plurality of customer stations and which includes a memory with card data check and update records so that these records can be readily and conveniently changed to enhance system security and reduce system operating expense.

Another objective is to provide a local transaction processor which is timeshared by a plurality of customer stations and which operates as a central accounting station for transactions which are performed by customers at the plurality of customer stations.

It is also an objective of the present invention to provide a local processor which is timeshared by a plurality of customer stations and which is operable in both an "off-line" mode and an "on-line" mode; that is, a local processor which is operable to process transactions either with or without communication with a central processor, depending on the availability of the central processor, which is often needed by the bank for other purposes and unavailable to assist with customer transactions.

Another objective of the present invention is to provide a local processor which is timeshared by a plurality of customer stations and operates to economize the demand on the central processor and communication time with the central processor by processing one or more customer transactions following each data transmission from the central processor and which, in the "on-line" mode reduces line-loading of the central processor by processing communication demands incident to the use of any of a plurality of customer stations.

SUMMARY OF THE INVENTION

These and other objectives are achieved, and consequent advantages are derived, with a preferred embodiment of the present invention which provides an improved automated banking system of the type that is operable in so-called "off-line" and "on-line" modes and that is responsive to data on a customer's card and customer responses to messages which the automated banking system displays, including instructional messages to select a transaction and indicate a transaction amount, to handle a series of one or more transactions, including cash withdrawal, fund transfer, and deposit and payment transactions, subsequent to a single insertion of the customer's card. The improvement lies in a structure and operation for customer stations and a timeshared local processor and in the allocation of functions therebetween; that is, the improvement provides a first level of timesharing which is effective in both "off-line" and "on-line" modes of operation and which is also complemented by a second level of timesharing between the local processor and a timeshared central processor in the "on-line" mode of operation.

The automated banking system of the present invention includes a central processor which is interconnected with at least one local processor via a communication network. Each local processor is interconnected via another communication network or a data link with a plurality of customer stations which timeshare the local processor. The central processor preferably determines the mode of operation of each local processor, and each local processor is operable in either an "off-line" mode or an "on-line" mode.

In the off-line mode, there is only one active timesharing level. Each local processor in the off-line mode does not timeshare the central processor. The local processor determines what transactions a customer may perform and processes those transactions which a customer selects by means of data on the customer's card and the customer's responses that are sent to the local processor by one of the customer stations which timeshares the local processor.

In the on-line mode, there are two active timesharing levels. Each local processor in the on-line mode timeshares the central processor. The central processor sends data to the local processor in response to a request message from the local processor. From the data that the central processor sends, which includes a customer's account descriptions, the local processor determines what transactions a customer may perform. The local processor processes those transactions which a customer selects by means of data that the central processor sends as well as the customer's responses that are sent to the local processor by one of the customer stations which timeshares the local processor.

The local processor and each customer station which timeshares the local processor operate in a master/slave relationship. The local processor simply commands initiation of input/output functions at each customer station. In response each customer station handles input functions, such as to elicit customer responses which the local processor needs to process a customer transaction, and output functions, such as to print transaction receipts, dispense cash, etc. This arrangement minimizes the demand on the local processor, since the local processor executes only the faster data processing operations and relegates the slower input/output operations to the customer stations. Since data processing is handled by the local processor and input/output functions are handled by each customer station, customer stations need not include data processing elements so that the cost of a customer station is reduced. Moreover, since data processing operations are faster than input/output operations, the local processor can be efficiently time-shared by a plurality of customer stations, such that while one customer station is executing an input/output operation the local processor can process data which is sent by another customer station and vice versa. This maximizes the productive use which is derived from the investment in data processing elements within the automated banking system.

The local processor contains the data processing element which performs certain checks on an inserted card, such as a determination whether the card is lost or stolen, fraudulently reproduced, etc. The local processor includes a memory with records which are accessed when the checks are performed. The customer stations which timeshare the local processor, therefore, need not include a memory for use in the performance of card checks. This substantially reduces the cost of a customer station. Moreover, if it is necessary to update the records which are accessed in the performance of card checks, for example, it is necessary to update the records which relate to lost or stolen cards, personnel must visit the local processor installation to enter additions and deletions by means of a console, but personnel need not visit customer stations since there are no such memories at the customer stations which must be updated. This reduces system operating cost and eliminates a potential breach in security, since a stolen card could not be used at any of the customer stations which time-share the local processor whose records have been updated. Even in the situation where the records in the memory at the local processor are updated by the central unit, the system operating cost is reduced and a potential breach in security is eliminated.

The local processor also acts as an accounting station which prepares a hard copy or machine readable transaction record of transactions that it processes for the plurality of customer stations which timeshare the local processor. Thus, personnel must visit only the local processor to obtain the hard copy or machine readable transaction record that is used to verify transactions which are performed at customer stations that time-share the local processor and which the local processor sends to the central processor during the on-line mode of operation.

Also, when the automated banking system of the present invention is in the on-line mode of operation, the local processors rather than the customer stations which timeshare the local processors are polled by the central unit. This reduces line-loading of the central unit, since the central unit must sporatically poll only the local processors and not a plurality of customer stations which timeshare each customer station to determine whether or not a customer is actually using any of the customer stations. This also potentially reduces the time a local processor has to await data that the central unit sends in response to a request message in the on-line mode of operation and, consequently, potentially reduces the time that a customer may have to wait to perform his transactions.

BRIEF DESCRIPTION OF THE DRAWINGS

The foregoing objectives and advantages of the present invention will become clear from the following general and detailed descriptions thereof given in connection with the drawing in which.

GENERAL DESCRIPTION OF SYSTEM AND OPERATION

Figure 1:
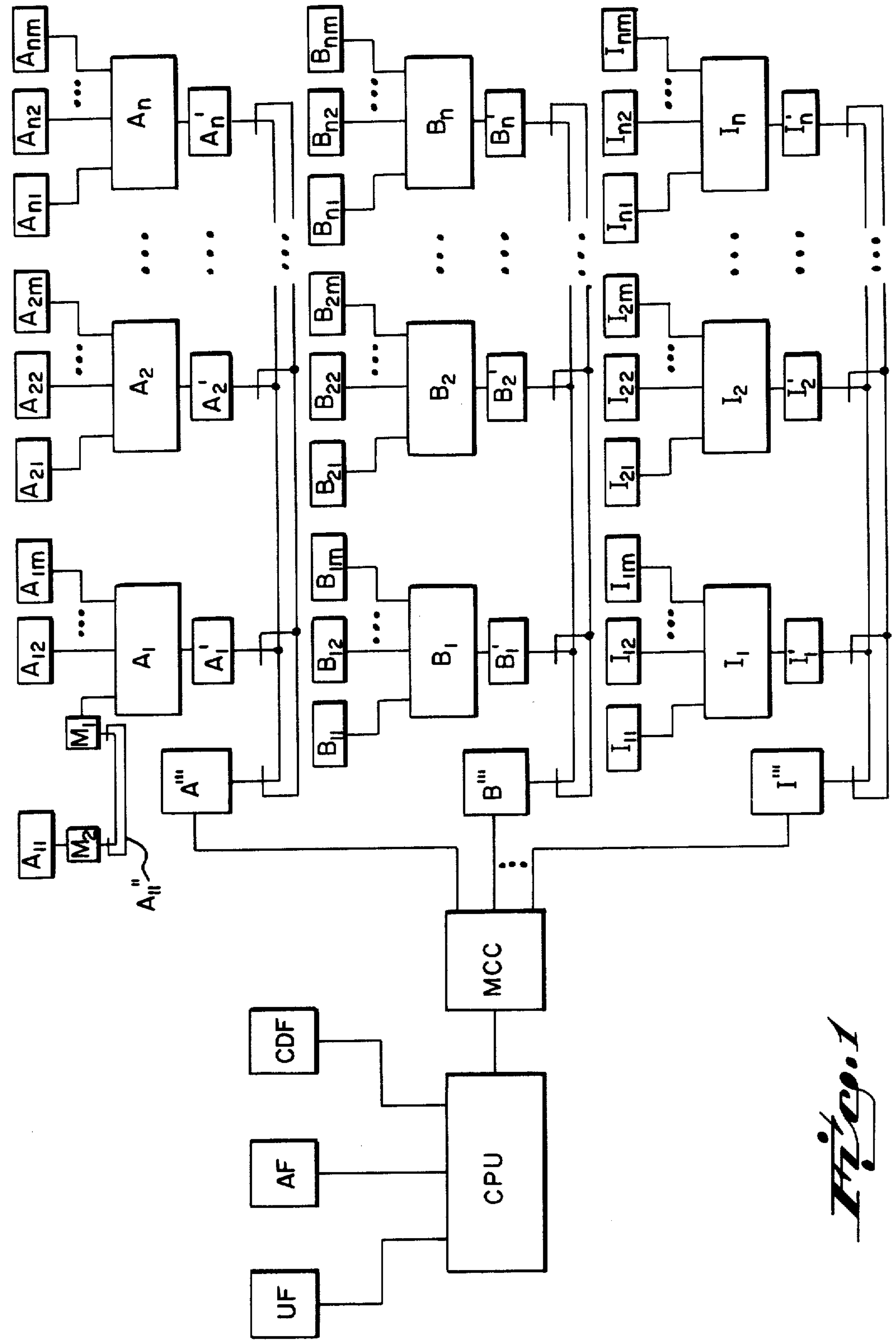
FIG. 1 is a block diagram of the on-line/off-line automated banking system of the present invention.

FIG. 1 is a block diagram of the on-line/off-line automated banking system of the present invention. The system includes one or more local processors $A_n$, $B_n$, . . . $I_n$. Each local processor is timeshared by one or more customer stations, for example, customer stations $A_{nm}$ timeshare local processor $A_n$, customer stations $B_{nm}$ timeshare local processor $B_n$, and customer stations $I_{nm}$ timeshare local processor $I_n$. Local processors $A_n$, $B_n$, . . . $I_n$ are operative in an on-line mode and an off-line mode. In the on-line mode, operative local processors $A_n$, $B_n$, . . . $I_n$ timeshare central processor CPU.

In order to facilitate use of the present invention in data communication networks of conventional teller-assisted on-line banking systems, local processors $A_n$, $B_n$, . . . $I_n$ of the present invention are constructed to emulate conventional I/O terminals, such as CRT's and teletypewriters, and terminal communication controllers presently employed in conventional teller-assisted on-line banking systems. Each local processor $A_n$, $B_n$, . . . $I_n$ may be constructed in a conventional manner to emulate a remote IBM 2848 controller with one or more IBM 2260 CRT's attached, a remote IBM 3272 controller with one or more IBM 3270 CRT's attached, or a remote IBM 2972 controller with one or more IBM 2980 CRT's attached. Each local processor $A_n$, $B_n$, . . . $I_n$ may also be constructed in a conventional manner to emulate certain Burroughs and NCR terminal facilities. As a result, local processors $A_n$, $B_n$, . . . $I_n$ may be interchanged with I/O terminal facilities in conventional teller-assisted on-line banking systems to provide in association with central processor CPU and customer stations $A_{nm}$, $B_{nm}$, . . . $I_{nm}$ an on-line/off-line automated banking system capability.

Local processors $A_n$, $B_n$, . . . $I_n$ preferably connect to sets of voice-grade data transmission lines, such as telephone wires. For example, telephone wires A'' are associated with local processors $A_n$, telephone wires B'' are associated with local processors $B_n$, and telephone wires I'' are associated with local processors $I_n$.

Local processors $A_n$ connect via modems $A_n'$ to telephone wires A'', local processors $B_n$ connect via modems $B_n'$ to telephone wires B'', and local processors $I_n$ connect via modems $I_n'$ to telephone wires I''.

Each set of telephone wires connects via a modem to a master communication controller MCC. Telephone wires A'' connect via modem A''' to master communication controller MCC, telephone wires B'' connect via modem B''' to master communication controller MCC, and telephone wires I'' connect via modem I''' to master communication controller MCC. Master communication controller MCC interfaces with central processor CPU.

Modems $A_n'$, $B_n'$, . . . $I_n'$ and A''', B''', . . . I''' and master communication controller MCC handle encoding and transmission of data between local processors $A_n$, $B_n$, . . . $I_n$ and data processing unit CPU over telephone wires A'', B'' . . . I''.

A representative system of the present invention might include, for example, local processors $A_n$, $B_n$, . . . $I_n$ constructed to emulate remote IBM 2848 controllers with IBM 2260 CRT's attached; DEC DL-11 asynchronous line interfaces (not shown); Bell Telephone Company 202 modems employing telephone company four wire half duplex service; an IBM system 370 integrated communications adapter; and an IBM system 370 computer.

Customer stations $A_{nm}$, $B_{nm}$, . . . $I_{nm}$ preferably connect to data links as generally shown in FIG. 1. However, each customer station may connect to a separate set of voice-grade data transmission lines, such as telephone wires. For example, customer station $A_{11}$ connects to telephone wires $A_{11}'$.

In the case where data links are employed, data links connect timesharing customer stations $A_{nm}$, $B_{nm}$, . . . $I_{nm}$ directly to local processors $A_n$, $B_n$, . . . $I_n$.

In the case where telephone wires are employed, the customer stations connect to the telephone wires via modems. For example, customer station $A_{11}$ connects to telephone wires $A_{11}'$ via modem $M_1$. The telephone wires connect via another modem to the timeshared local processor. For example, telephone wires $A_{11}'$ connect via modem $M_2$ to local processor $A_1$. A representative system might include, for example, customer station $A_{11}$ interconnected to local processor $A_1$ via Bell Telephone Company 202 modems employing telephone company four wire full duplex service.

With reference to FIG. 1, $A_n$ may represent, for example, one or more financial institutions having local processors $A_1$, $A_2$, . . . $A_n$ at various locations. Each local processor $A_1$, $A_2$, . . . $A_n$ would connect via a modem $A_1'$, $A_2'$, . . . $A_n'$, respectively, at each location to telephone wires A'', whereby local processors $A_1$, $A_2$, . . . $A_n$ would be connected to, or multidropped on, the same set of telephone wires. Telephone wires A'' would connect via modem A''' to master communication controller MCC. Master communication controller MCC would interface with central processing unit CPU.

Focusing on local processor $A_1$, local processor $A_1$ might, for example, be located at a bank branch. Customer stations $A_{12}$, . . . $A_{1m}$, which, for example, provide automated teller services in the lobby of the branch bank, connect via data links to local processor $A_1$. Customer station $A_{11}$, which, for example, provides automated teller services at a grocery store, airport, etc., connects via modem $M_1$ to telephone wires $A_{11}'$. Telephone wires $A_{11}'$ connect via modem $M_2$ to local processor $A_1$ at the remotely located bank branch.

Figure 2:
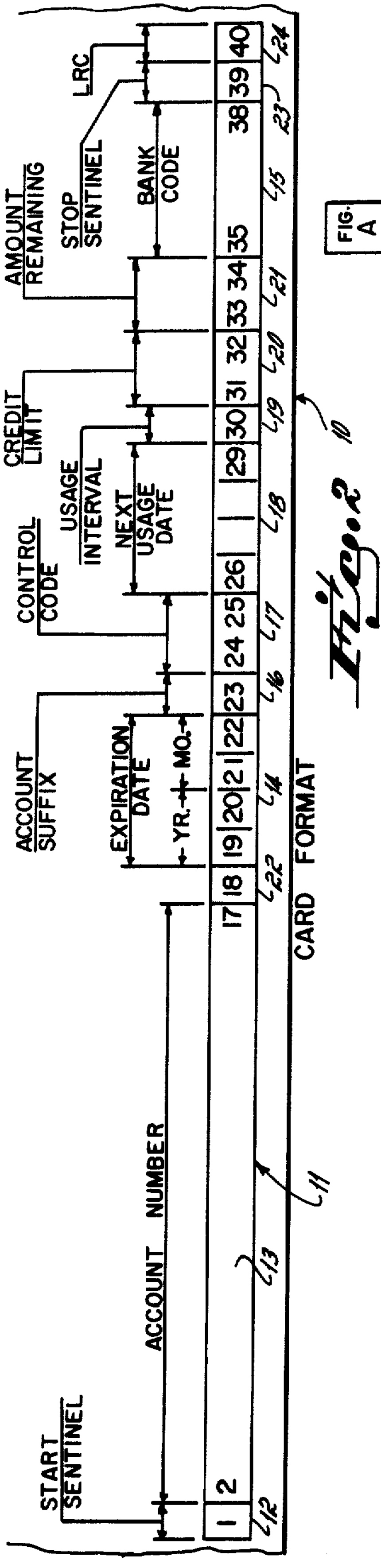
FIG. 2 illustrates a preferred form of a customer card utilized in the system of the present invention.

FIG. 2 illustrates a card 10 which a bank issues to a customer to whom it extends use of the on-line/off-line automated banking system of the present invention. Card 10 includes a ferrous oxide strip 11 which is magnetically encoded with fields of data. Each field of data consists of one or more groups of four-bit BCD characters plus a character parity bit.

Figure 3:
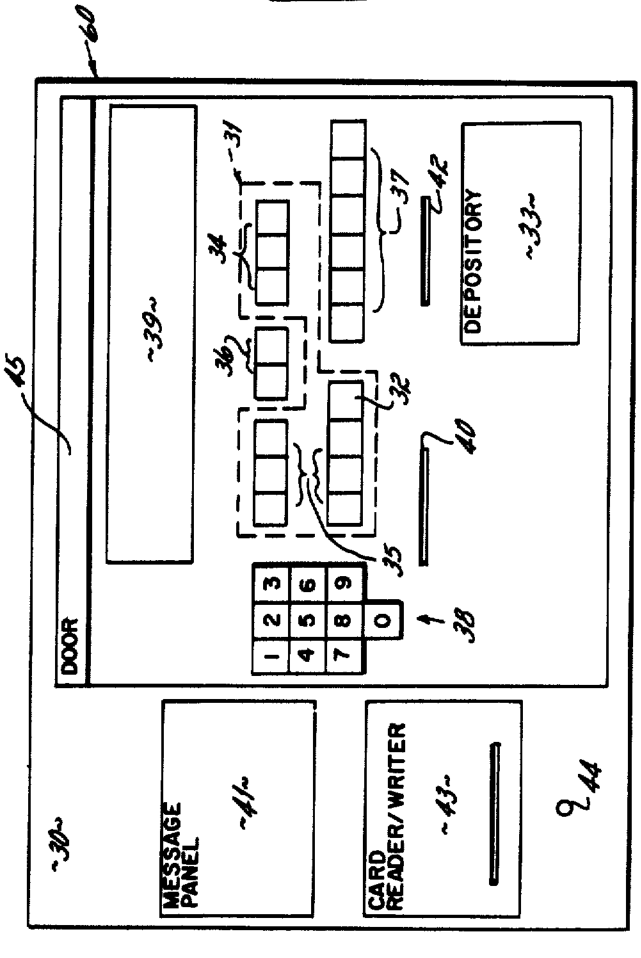
FIG. 3 is a front elevational view of a panel of a customer station employed in the system of the present invention.
Figure 4A:
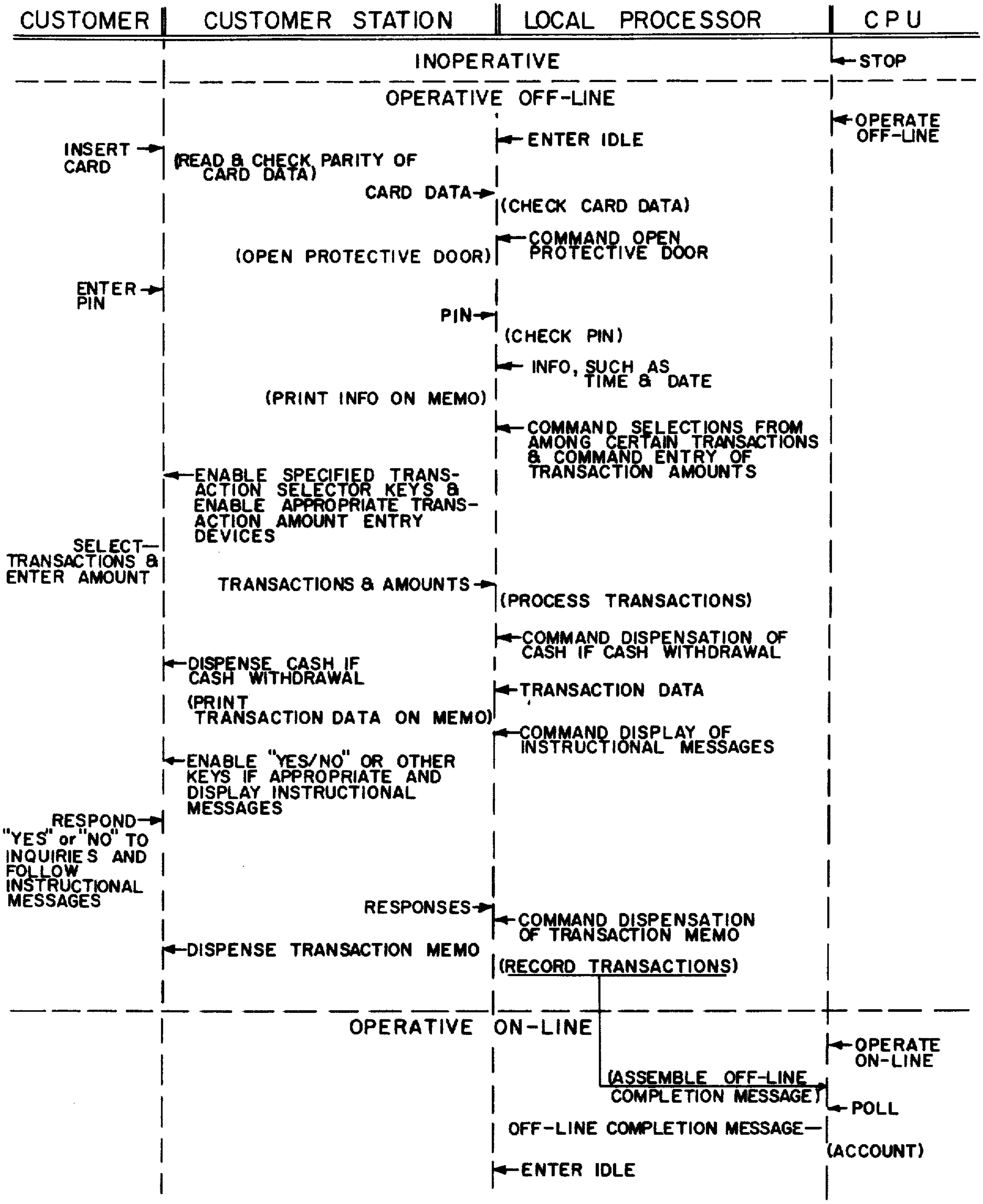
Figure 4B:
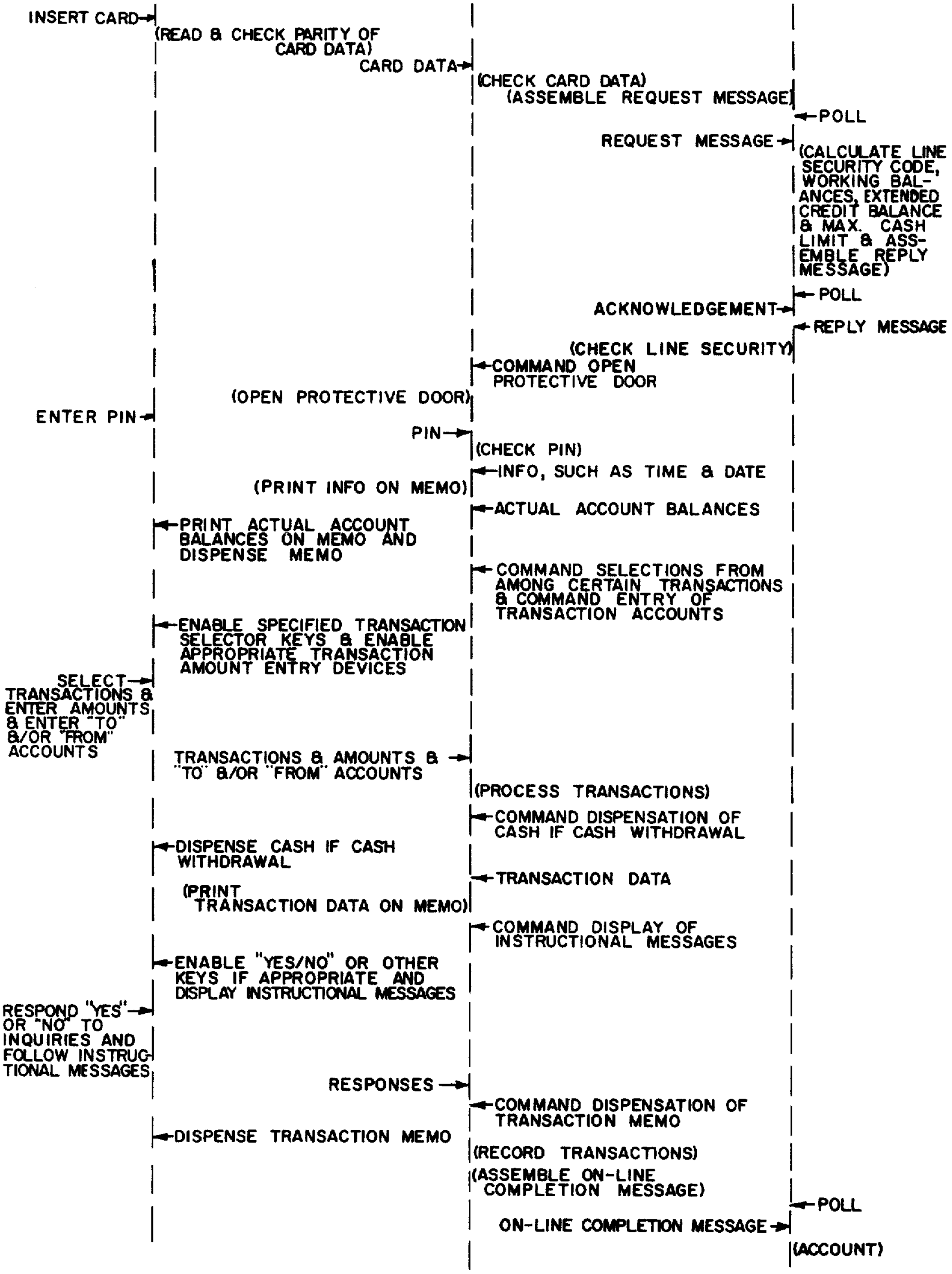

A first field of data, account number field 13, consists of 16 characters which comprise an account number for the customer. A second field of data, account suffix field 16, consists of one character which identifies the customer as the holder of one of a plurality of cards which have the same account number in account number field 13, such as when separate cards are provided for different members of a given family. A third field of data, expiration date field 14, consists of four characters which identify card 10 expiration date by month and year. A fourth field of data, bank code field 15, consists of four characters. Bank code field 15 identifies the commercial bank or other financial institution, such as a savings and loan, credit union, etc., where the customer has his accounts. Start sentinel field 12, separator field 22, stop sentinel field 23, and longitudinal register check (LRC) field 24 each consist of one character. Each of these data fields functions to effect control of card reader/writer 43 (FIG. 3). Other fields of data include control code field 17, next usage date field 18, usage interval field 19, credit limit field 20, and amount remaining field 21. These fields of data relate primarily to off-line operation and are described in greater detail in Voss et al., "Off-line Cash Dispenser and Banking System," U.S. Pat. No. 3,845,277, which is incorporated by reference herein.

FIG. 3 illustrates a panel 30 which is associated with a customer station 60 of the on-line/off-line automated banking system of the present invention. Panel 30 includes a card reader/writer 43 into which the customer inserts card 10 to initiate use of the system. The customer operates card return switch 44 to cancel his use of the system and to have card 10 returned to him prior to his selection of a transaction. A message display 41 communicates messages, such as "Enter Card", to the customer. With the exception of card reader/writer 43, card return switch 44 and message display 41, panel 30 is concealed behind a vertically movable protective door 45 (shown in its open position) when customer station 60 is not in use.

The customer operates keyboard 38 to enter digits of a personal identification number (PIN) which he was instructed to memorize at the time his bank issued him his card. Customer station 60 compares the customer's PIN with a number which is derived from data on card 10 to verify that the customer is the rightful user of the card. If desired, the card verification technique disclosed in Spetz, "Verification System", U.S. Pat. No. 3,794,813, incorporated herein by reference, may be used to verify a cardholder.

Panel 30 also includes illuminable push button transaction selector keys 31. Customer station 60 selectively enables certain transaction selector keys 31 in response to commands from the local processor with which it is associated so that the customer may select a transaction. Transaction selector keys 31 may be provided for any of numerous different transactions in the basic categories of cash withdrawal, fund transfer, and payment and deposit transactions. The number and designation of transaction selector keys 31, which will be described below, provide a selection of various exemplary transactions in the basic categories and are not intended to limit the number or designation of transaction selector keys which may be included in panel 30.

The customer operates deposit/payment key 32 to select deposit and payment transactions. The customer must enter the amount of a deposit or payment by means of the numerical keys of keyboard 38. The customer inserts deposits and payments in depository 33.

A group of three illuminable push button transaction selector keys 34 is associated with cash withdrawal transactions. The customer operates one of the transaction selector keys 34 to select a cash withdrawal from his credit card account, a cash withdrawal from his checking account, or a cash withdrawal from his savings account. The customer must enter the amount of a cash withdrawal by means of the illuminable push button cash amount selector keys 37. Paper currency is dispensed to the customer via cash slot 40. If desired, a cash dispenser of the type disclosed in Ransom et al., "Dispenser for Documents Such As Currency and the Like", U.S. Pat. No. 3,795,395 may be used.

A group of six illuminable push button transaction selector keys 35 is associated with fund transfer transactions. The customer operates one of the transaction selector keys 35 to select (a) transfer of funds from his checking account to his savings account, from his credit card account to his checking account, or from his savings account to his checking account; (b) loan payment comprising a transfer of funds from his checking account to his credit card account or from his checking account to his loan account; or (c) mortgage payment comprising a transfer of funds from his checking account to his mortgage account. The customer must enter the amount of a fund transfer by means of the numerical keys of keyboard 38.

Display panel 39 reports amounts which the customer enters on keyboard 38. Display panel 39 also communicates instructional messages to the customer which guide the customer as he performs transactions. For example, display panel 39 instructs the customer to "Select Transaction."

Panel 30 includes a pair of illuminable push button "Yes" and "No" keys 36 which the customer operates to respond "Yes" and "No" to queries such as "Do You Wish Balance Inquiry?" which customer station 60 displays on display panel 39. If the customer requests, a memorandum containing the customer's actual account balances is printed and dispensed to the customer through printer slot 42 in the on-line mode of operation. A receipt containing the customer's transaction data which is generated at the end of each series of one or more transactions by a customer is printed and dispensed to the customer through printer slot 42 in both the on-line mode and the off-line mode of operation.

Figure 4:
FIG. 4 is a flow diagram of the general operation of the system which is depicted in FIG. 1.

FIG. 4 is a flow diagram of the general operation of the system which is depicted in the block diagram of FIG. 1. Preferably, central processor CPU controls the operational status of each local processor $A_n$, $B_n$, . . . $I_n$ (FIG. 1). Thus, central processor CPU may (a) command a remote unit to stop, thereby rendering the local processor and its associated timesharing customer stations inoperative; (b) command a local processor and its associated timesharing customer stations to operate off-line, thereby rendering the local processor and its associated timesharing customer stations operable in an off-line mode; or (c) command local processor and its associated timesharing customer stations to operate on-line, thereby rendering the local processor and its associated timesharing customer stations operable in an on-line mode.

Referring to FIGS. 2, 3, and 4, if a customer inserts his card in the customer station while the timesharing customer station and its associated local processor are in the off-line operational mode, the customer station reads the card and checks the card data for parity. The customer station sends the card data to the local processor which checks bank code 15. The local processor commands the customer station to return the card to the customer if bank code 15 does not appear in a bank code file in local processor memory, thereby indicating that the card is not usable in the system. If bank code 15 does appear in the bank code file, the local processor subsequently checks the card data against images in a duplicate card file in local processor memory. A match indicates a fraud based on card duplication, and the local processor commands the customer station to capture the card. If there is no match, the local processor then checks account number 13 and account suffix 16 against numbers in a discretionary file in local processor memory. If this check produces a match, the local processor determines from other data in the discretionary file what action to take. For example, if the data associated with the matching account number and account suffix in the discretionary file consists entirely of zeros, the local processor commands the customer station to capture the card, and, if the data is non-zero, the local processor sets an update flag and uses the discretionary file data as a source of updating information for the card. The local processor checks credit limit 20 against the maximum credit limit which is associated with bank code 15. If the credit limit on the card exceeds the maximum credit limit for the bank, the local processor commands the customer station to capture the card. Otherwise, the local processor checks expiration date 14 and commands the customer station to capture the card if it has expired.

If the card passes the above checks, the local processor commands the customer station to open protective door 45. The local processor compares the PIN which the customer enters and which is sent by the customer station with a number which the local processor calculates using account number 13 and an algorithm which is associated with bank code 15. If a match occurs, the local processor commands the customer station to enable certain of transaction selector keys 31 for customer selection depending on control code 17. The customer station elicits a transaction selection and a transaction amount in response to commands from the local processor by displaying messages on display panel 39.

Once the customer selects one of the enabled transactions using one of the transaction selector keys 31 and enters an amount using either amount selector keys 37 or keyboard 38 and the customer station sends this data to the local processor, the local processor proceeds to determine what type of transaction the customer has selected. Each of the transaction falls into one of three categories; that is, each transaction is (a) a cash withdrawal, (b) a fund transfer, or (c) a deposit or payment.

If the customer selects a cash withdrawal while the system is off-line, the local processor checks next usage date 18 to determine whether or not the current date is the same as or later than the next usage date. If the current date is not the same as or later than next usage date 18, the local processor denies the cash withdrawal and commands the customer station to query the customer whether or not he desires "Another Transaction?" on display panel 39. If the current date is the same as or later than the next usage date 18, the local processor compares the amount entered by the customer using amount selector keys 37 with amount remaining 21. The local processor commands the customer station to dispense cash to the customer in the amount entered by the customer provided, however, that the amount entered by the customer does not exceed amount remaining 21. If the amount entered by the customer exceeds amount remaining 21, the local processor commands the customer station to dispense cash equivalent to amount remaining 21.

In the case of an off-line cash withdrawal, the local processor writes the image of card 10 on the duplicate card file in local processor memory. The local processor updates amount remaining 21 by subtracting from amount remaining 21 the amount of cash dispensed if the amount requested by the customer does not exceed amount remaining 21. If the amount requested by the customer exceeds amount remaining 21, the local processor updates next usage date 18 to the next usage date plus usage interval 19 and amount remaining 21 to credit limit 20. The local processor also records the cash withdrawal in a transaction file in local processor memory and commands the customer station to query the customer whether or not he desires "Another Transaction?" on display panel 39.

If the customer selects a fund transfer while the system is off-line, the local processor records the fund transfer in the amount entered by the customer using keyboard 38 in the transaction file in local processor memory and commands the customer station to query the customer whether or not he desires "Another Transaction?" on display panel 39.

If the customer selects a deposit or payment while the system is off-line, the local processor commands the customer station to operate depository 33 to accept the deposit or payment; records the deposit or payment in the amount entered by the customer using keyboard 38 in the transaction file in local processor memory; and commands the customer station to query the customer whether or not he desires "Another Transaction?" on display panel 39.

The local processor commands the customer station to print transaction data on a receipt after each of the customer's off-line transactions. After the customer completes his transactions, the local processor, in the event that the discretionary file contains card update data or in the event the customer performs a cash withdrawal, commands the customer station to update card 10 and return it to the customer, to dispense the transaction receipt to the customer, and to close protective door 45.

When a local processor is in the on-line operational mode, the local processor is responsive to polls from the central processor. If the local processor was previously in the off-line operational mode and during such time accumulated off-line transaction data, the local processor when it goes on-line responds to the polls by sending the accumulated off-line transaction data in completion messages. If desired, the content and format of the completion messages which are described in Slater et al. U.S. Pat. Application Ser. No. 722,741 (Sept. 13, 1976) may be used. The central processor is responsive to an off-line transaction completion message to account for the transactions which are reported therein, the accounting being performed in any desired, conventional manner.

If a customer inserts his card in the customer station while the timesharing customer station and its associated local processor are in the on-line operational mode, the customer station reads the card and checks the card data for parity. The customer station sends the card data to the local processor which checks bank code 15. The local processor commands the customer station to return the card if bank code 15 does not appear in the bank code file in local processor memory, thereby indicating that the card is not usuable in the system. If bank code 15 does appear in the bank code file, the local processor subsequently checks the card data against images in the duplicate card file in local processor memory. A match indicates a fraud based on card duplication, and the local processor commands the customer station to capture the card. If there is no match, the local processor then checks account number 13 and account suffix 16 against numbers in the discretionary file in local processor memory. If this check produces a match, the local processor determines from other data in the discretionary file what action to take. For example, if the data associated with the matching account number and account suffix in the discretionary file consists entirely of zeros, the local processor commands the customer station to capture the card, and, if the data is non-zero, the local processor sets an update flag and uses the discretionary file data as a source of updating information for the card. The local processor checks credit limit 20 against the maximum credit limit which is associated with bank code 15. If the credit limit on the card exceeds the maximum credit limit for the bank, the local processor commands the customer station to capture the card. Otherwise the local processor checks expiration date 14 and commands the customer station to capture the card if it has expired.

If the card passes the above checks, the local processor assembles a request message whose format will be described in greater detail below. If desired, the content and format of the request messages which are described in Slater et al. U.S. Pat. Application Ser. No. 722,741 Sept. 13, 1976) may be used. The local processor sends the request message to the central processor in response to a poll.

Referring to FIG. 1, central processor CPU in response to the request message searches an update file UF in central memory, which is associated with the bank that is identified by bank code 15, for account number 13 and suffix 16 included in the request message to determine whether or not the card requires update. Central processor CPU also uses bank code 15 to address, or access, an algorithm in an algorithm file AF in central memory and uses the algorithm to derive from the account number a number for comparison with the customer's PIN. Central processor CPU also searches a customer data file CDF in central memory which is associated with the bank that is identified by bank code 15 and uses account number 13 and suffix 16 to access the customer's account balances and other customer-related tabular information, such as the customer's credit profile.

Central processor CPU uses the customer's account balances and credit profile to compute a working balance, which comprises the amount of funds which the customer has available for on-line transactions, for each of the customer's credit-type accounts, such as his checking, savings, and credit card accounts. The working balance for each of the customer's debittype accounts, such as his mortgage and loan accounts, equals zero. Central processor CPU also uses the customer's account balances, including the account balances of both credit- and debit-type accounts, and credit profile to calculate an extended credit balance, for example, a sum which extends a working balance when a customer transacts an on-line cash withdrawal. Central processor CPU also uses the customer's account balances and credit profile to compute a maximum cash limit which prohibits the customer from withdrawing as cash more than a certain amount during any one use of the system while it is operating on-line.

Central processor CPU uses bank code 15 to access an algorithm in algorithm file AF and uses the algorithm to calculate a line security code from date and time data which the local processor sent in the request message.

Central processor CPU then assembles a reply message. If desired, the content and format of the reply messages which are described in Slater et al. U.S. Pat. Application Ser. No. 722,741 (Sept. 13, 1976) may be used.

After central processor CPU assembles the reply message, central processor CPU polls the local processor via master communication controller MCC (FIG. 1). The poll queries the local processor whether or not the local processor is in condition to receive the reply message. The local processor responds by sending an acknwoledgement if it is in condition to receive the reply message. Master communication controller MCC then sends the reply message to the local processor.

The local processor in response to the reply message uses bank code 15 to access an algorithm in local processor memory and uses the algorithm to calculate from the same date and time data which the local processor assembled in the request message a number for comparison with the line security code which central processor CPU sent in the reply message. If the number calculated by the local processor matches the line security code in the reply message, the local processor proceeds to determine whether or not the reply message includes a number for comparison with the customer's PIN. If the check of line security code does not result in a match, the local processor sets an off-line flag and proceeds in the off-line mode of operation.

Focusing here on the on-line mode of operation, the local processor commands the customer station to open protective door 45. If the reply message includes a number for comparison with the customer's PIN, the local processor compares the PIN which the customer enters and which is sent by the customer station with the number in the reply message. If the reply message does not include a number, the local processor compares the PIN which the customer has entered with a number which the local processor calculates from account number 13 using an algorithm which is associated with bank code 15. If a match results, the local processor determines whether or not the reply message includes card update and, if so, sets a card update flag. The local processor then checks customer command which central processor CPU sent in the reply message.

Assuming that the local processor is instructed to proceed with on-line operation, the local processor commands the customer station to query the customer whether or not he wants to know his actual account balances by displaying "Do You Wish Balance Inquiry?" on display panel 39. The customer responds "Yes" or "No" using "Yes" and "No" keys 36. Alternatively, panel 30 may have a separate balance inquiry transaction key. If the customer responds "Yes" "Yes" key 36 or depresses a separately provided balance inquiry key, the local processor commands the customer station to print the customer's actual account balances, which central processor CPU sends in the reply message, on a memorandum and to dispense it to the customer through printer slot 42. The local processor then commands the customer station to query the customer whether or not he wishes "Another Transaction?" on display panel 39. The customer again responds "Yes" or "No" using "Yes" and "No" keys 36.

Assuming that the customer has rejected a balance inquiry or that after a balance inquiry he wishes a transaction involving funds in one or more of his accounts, the local processor commands the customer station to enable certain transaction selector keys 31 for customer selection depending on the account descriptions which central processor CPU sent in the reply message. The customer station elicits a transaction selection and a transaction amount in response to commands from the local processor by displaying messages on display panel 39.

Once the customer selects a transaction using one of the transaction selector keys 31 and enters a transaction amount using either amount selector keys 37 or keyboard 38 and the customer station sends this data to the local processor, the local processor proceeds to determine what type of transaction the customer has selected. The transaction falls into one of three categories; that is, each transaction is (a) a cash withdrawal, (b) a fund transfer or (c) a deposit or payment.

If the customer selects a cash withdrawal while the system is on-line, the local processor determines from the transaction selector key 31 which the customer selects and the account descriptions which central processor CPU sent in the reply message whether or not the customer has several accounts which can serve as the debit account. For example, the customer may have selected a cash withdrawal from savings account transaction and he has several savings accounts. In this multiple account situation, the customer station instructs the customer to "Enter 'From' Account." When so instructed, the customer enters a predetermined numerical designation, such as "02", to specify the debit account and the customer station sends the designation to the local processor. After the local processor determines which account is the debit account, it compares the amount entered by the customer using amount selector keys 37 with the working balance for the debit account which central processor CPU sent in the reply message. If the amount entered by the customer exceeds the working balance for the debit account, the local processor adds the extended credit balance in the reply message to the working balance for the debit account and compares the amount entered by the customer against the sum. If the amount entered by the customer exceeds the sum of the working balance for the debit account plus the extended credit balance, the local processor changes the amount entered by the customer so that it equals the sum of the working balance for the debit account plus the extended credit balance.

Thereafter, the local processor adds the original amount entered by the customer, or as changed to the sum of the working balance for the debit account plus the extended credit balance, to the previous total of the customer's cash withdrawals since he inserted his card, for example, since he most recently commenced use of the system. If the total exceeds the maximum cash limit which central processor CPU sent in the reply, the local processor denies the transaction and then commands the customer station to query the customer whether or not he desires "Another Transaction?" on display panel 39. If the maximum cash limit is not exceeded, the local processor commands the customer station to dispense cash to the customer in the amount entered by the customer, or as changed to the sum of the working balance for the debit account plus the extended credit balance; debits the working balance for the debit account by the amount dispensed to the customer or debits the working balance to zero and the extended credit balance by the amount by which the amount dispensed to the customer exceeds the working balance for the debit account; adds the amount dispensed to the customer to the previous total of the customer's cash withdrawals since he inserted his card; records the cash withdrawal in a transaction file in local processor memory; and commands the customer station to query the customer whether or not he desires "Another Transaction?" on display panel 39.

If the customer selects a fund transfer while the system is on-line, the local processor determines from the transaction selector key 31 which the customer selects and the account descriptions which central processor CPU sent in the reply message whether or not the customer has several accounts which can serve as the debit account, for example, whether or not the selected one of transaction selector keys 31 and account description in the reply message indicate that funds are to be transferred from one of multiple accounts. Similarly, the local processor determines from the transaction selector key 31 which the customer selects and the account descriptions which central processor CPU sent in the reply message whether or not the customer has several accounts which can serve as the credit account, for example, whether or not the selected one of transaction selector keys 31 and account descriptions in the reply message indicate that funds are to be transferred to one of multiple accounts. For example, the customer may have selected a transfer from savings to checking accounts, and he has several savings and several checking accounts. In this multiple account situation, the customer station (a) instructs the customer to "Enter 'From' Account" and (b) instructs the customer to "Enter 'To' Account." When so instructed, the customer enters predetermined numerical designations, such as "01" and "04," to designate the debit and credit accounts, which the customer station sends to the local processor.

After the local processor determines which account is the debit account and which account is the credit account, it compares the amount entered by the customer using keyboard 38 with the working balance for the debit account. If the amount entered by the customer exceeds the working balance, the local processor denies the fund transfer. The local processor then commands the customer station to query the customer whether or not he desires "Another Transaction?" on display panel 39. If the amount entered by the customer does not exceed the working balance, the local processor debits the working balance for the debit account; records the fund transfer in the transaction file in local processor memory; and commands the customer station to query the customer whether or not he desires "Another Transaction?" on display panel 39.

If the customer selects a deposit or payment while the system is on-line using deposit/payment key 32, the local processor commands the customer station to operate depository 33 to accept the deposit or payment; records the deposit or payment in the amount entered by the customer using keyboard 38 in the transaction file in local processor memory; and commands the customer station to query the customer whether or not he desires "Another Transaction?" on display panel 39.

The burden of processing and authorizing or denying customer transactions, such as cash withdrawals and fund transfers, rests with the local processor. After each transaction, regardless of whether a transaction is authorized or denied, the local processor commands the customer station to quary the customer whether or not he wants another transaction. This permits the customer to transact a series of transactions, including cash withdrawals, fund transfers and deposits and payments, pursuant to a single insertion of his card. In addition, the local processor in the on-line operational mode processes and authorizes or denies additional transactions in the series without any further communication with central processor CPU.

The local processor commands the customer station to print transaction data on a receipt after each of the customer's on-line transactions. After the customer completes his transactions, the local processor commands the customer station to update card 10, in the event that the discretionary file contains card update data or in the event the reply message includes card update data, and return it to the customer, to dispense the transaction receipt to the customer, and to close protective door 45.

The local processor then assembles an on-line transaction completion message. If desired, the content and format of the completion messages which are described in Slater et al. U.S. Pat. Application Ser. No. 722,741 (Sept. 13, 1976) may be used. The local processor sends the on-line completion message to central processor CPU in response to a poll. Consequently, central processor CPU accounts for the on-line transactions reported therein.

DETAILED DESCRIPTION OF SYSTEM AND OPERATION

A preferred embodiment of the automated banking system of the present invention will now be described in detail. The preferred embodiment appears functionally in the flow diagram of FIG. 5 and structurally in the block diagram of FIG. 6 and reference will be made to these figures throughout the detailed description of the preferred embodiment.

Figure 5:
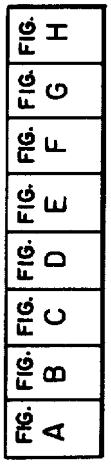
FIG. 5, comprising FIGS. 5A through 5H connected as shown, is a flow diagram which illustrates the operational steps of the system of the present invention.
Figure 5A:
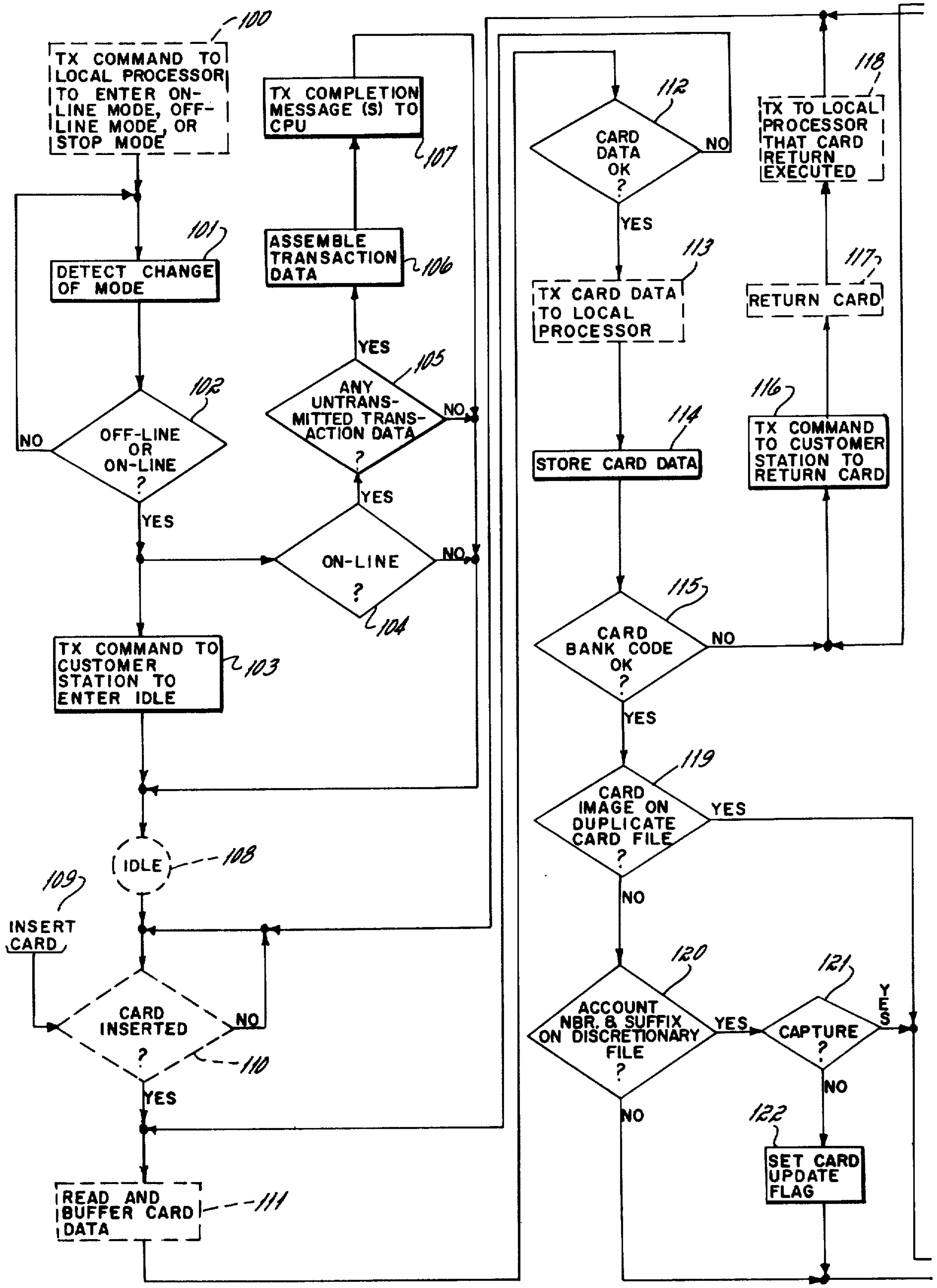

As shown in FIG. 5A, the central processor CPU, whose functions are contained in blocks which consist of alternate dashed and dotted line segments, determines the mode of operation for each local processor and its associated customer station(s) by transmission of a command to operate on-line, operate off-line, or stop, as indicated by CPU function 100. An individual local processor LPU, whose functions are contained in blocks which consist of solid line segments, responds to mode of operation commmands from the CPU, as indicated by LPU function 101.

If the LPU determines at function 102 that the CPU has sent a stop mode command, the LPU stops operation if it is in the on-line mode or the off-line mode, or continues inoperative if it is in the stop mode. If the LPU has received a stop mode command, the LPU awaits further mode of operation commands.

Figure 6:
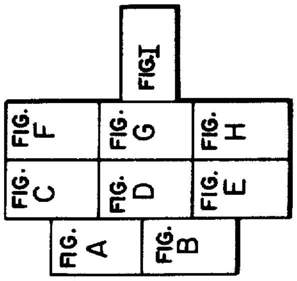
FIG. 6, comprising FIGS. 6A through 6I connected as shown, is a block diagram of a structure for performing the operational steps which are depicted in FIG. 5.

With reference to FIG. 6, CPU 300, which is shown as an IBM System 370 computer, supplies mode of operation commands to master communications controller 301, which is shown as an IBM System 370 Integrated Communications Adapter. Master communications controller 301 steers the mode of operation command via a communication link to the particular LPU to which the CPU has addressed the mode of operation command.

As shown in FIG. 6, the communication link comprises a telephone system which includes modems 302 and 303, which are shown as Bell Telephone Company 202 Modems, at the central and local installations, respectively. Modems 302 and 303 are interconnected by four-wire, half-duplex Bell Telephone Company service 304.

Mode of operation commands are steered by communication controller 305, which is shown as a DEC DL-11 Asynchronous Line Interface, to the LPU to which the CPU addressed the mode of operation command over LPU data bus 306.

Mode detector 307 receives mode of operation commands over data bus 306 and data line 308. If mode detector 307 receives an on-line command, mode detector 307 sends a pulse to OR gate 310 via line 309. If mode detector 307 receives an off-line mode command, mode detector 307 sends a pulse to OR gate 310 via line 311. In response to a pulse on line 309 or a pulse on line 311 OR gate 310 sends a pulse to the set terminal of flip-flop 312 via line 313. When flip-flop 312 is set, flip-flop 312 enables sequencer 314.

On the other hand, if mode detector 307 receives a stop mode command, mode detector 307 sends a pulse to the reset terminal of flip-flop 312 via line 315. When flip-flop 312 is reset, flip-flop 312 disables sequencer 314.

Returning to FIG. 5A, if the LPU has received an on-line mode command or an off-line mode command, the LPU transmits a command to associated customer stations CS to enter an idle mode, as indicated by LPU function 103.

If the LPU has received an on-line mode command, as determined by the LPU at function 104, the LPU at function 105 determines whether or not local memory contains any stored customer transactions. Customer transactions would have been stored, for example, if any customers had previously performed transactions while the LPU was in the off-line mode of operation. If the LPU determines that local memory contains stored customer transactions, the LPU assembles the stored customer transactions, as indicated by LPU function 106, and transmits the assembled customer transactions to the CPU in the form of one or more completion messages at function 107. The content and format of the completion messages is described in detail in the co-pending Slater et al. patent application which is incorporated by reference herein.

In FIG. 6, only one customer station CS is shown. It should be understood, however, that the LPU may also supervise operation of other customer stations CS, which are identical to the one which is shown.

With reference to FIG. 6, if sequencer 314 has been enabled in response to an on-line mode command or off-line mode command, sequencer 314 sends a pulse via line 316 to terminal "$\phi\phi$" of CS command encoder 317. Consequently, CS command encoder 317 transmits a "$\phi\phi$", or "enter idle mode", command to a customer station CS, which is associated with the LPU, over CS data bus 318.

CS command decoder 319 at the CS receives the "$\phi\phi$" command. CS command decoder 319 sends a pulse via line 320 which enables card reader/writer 321 to place the CS in the idle mode.

Sequencer 314 sends a pulse via line 316 to AND gate 323. AND gate 323 also receives a pulse via line 309 from mode detector 307, when the LPU is in the on-line mode, so that AND gate 323 is enabled and sends a pulse to completion message assembler 326 via line 325. The pulse on line 325 enables completion message assembler 326, which is connected to transaction file 327 over data line 328.

If transaction file 327 contains stored customer transactions, completion message assembler 326 obtains the transaction data over data line 328 and assembles one or more completion messages. In response to polls from the CPU over LPU data bus 306 and data line 329, completion message assembler 326 sends completion messages to the CPU over data line 330 and LPU data bus 306.

CARD DATA READING

With reference to FIG. 5A, after a customer station CS, whose functions are contained in blocks which consist of dashed line segments, enters the idle mode, as indicated by CS function 108, the CS is operable to sense when a customer inserts his card. If a customer inserts his card, as indicated by customer function 109, the CS senses the card as indicated by CS function 110. The CS reads the card data and stores the card data in a buffer register as indicated by CS function 111. The CS then determines at function 112 whether or not the card data has been read correctly. If an error occurred when the card data was read, the CS reads the card again. If the CS does not detect an error condition, the CS transmits the card data to the LPU as indicated by CS function 113. Consequently, the LPU stores the card data as indicated by LPU function 114.

Referring to FIG. 6, when a customer inserts his card into card reader/writer 321, as indicated generally by the numeral 331, card reader/writer 321 reads the card data and enters the card data in buffer register 332. Parity and longitudinal register check (LRC) 333 determines whether or not the card data has been read correctly. If an error is detected, parity and LRC check 333 sends a pulse via line 334 to card reader/writer 321, which causes card reader/writer 321 to read the card again. If the card data has been read correctly and no error is detected, parity and LRC check 333 sends a pulse via line 335 to buffer register 332, which causes buffer register 332 to send the card data to the LPU over data line 336 and CS data bus 318.

The LPU receives the card data and enters the information in local memory. The LPU, for example, stores the bank code in register 337, the account number and suffix in register 338, the credit limit in register 339, the expiration date in register 340, the control code in register 341, the amount remaining in register 342, the next usage date (NUD) in register 343, and the usage interval in register 344.

CARD DATA CHECKS

With reference to FIG. 5A, the LPU uses the card data which has been stored in local memory to perform several checks. The LPU determines at LPU function 115 whether or not the bank code, which was read by the CS from the inserted card, appears in the bank code file in local memory.

If the bank code which the CS read from the inserted card does not appear in the bank code file, the card is not authorized for use in the automated banking system. The LPU transmits a command to the CS to return the inserted card, as indicated by LPU function 116. In response, the CS returns the inserted card, as indicated by CS function 117. The CS at function 118 transmits a response to the LPU upon execution of the card return command. The CS thereafter returns to its idle condition to await insertion of another card.

If the bank code which the CS read from the inserted card appears in the bank code file in local memory, the LPU, as indicated by LPU function 119, determines whether or not an image of the inserted card appears in the duplicate card file.

If identity exists between the data which the CS read from the inserted card and a record of a card image in the duplicate card file, the LPU initiates a card capture process which will be described shortly.

If an image of the card which the CS read does not appear in the duplicate card file in local memory, the LPU at function 120 determines whether or not the account number and suffix which the CS read from the inserted card appear in the discretionary file in local memory. If the account number and suffix which the CS read from the inserted card are found in the discretionary file, the LPU determines at function 121 whether the presence of the account number and suffix in the discretionary file is a result of a directive to a) capture or b) update the inserted card.

If information which is associated with the matching account number and suffix in the discretionary file directs card capture, the LPU initiates a card capture process which will be described shortly. On the other hand, if the information which is associated with the matching account number and suffix in the discretionary file directs card update, the LPU enters the card update data in the affected card data registers in local memory and, as indicated by LPU function 122, sets a card update flag whose function will be discussed later.

Figure 5B:
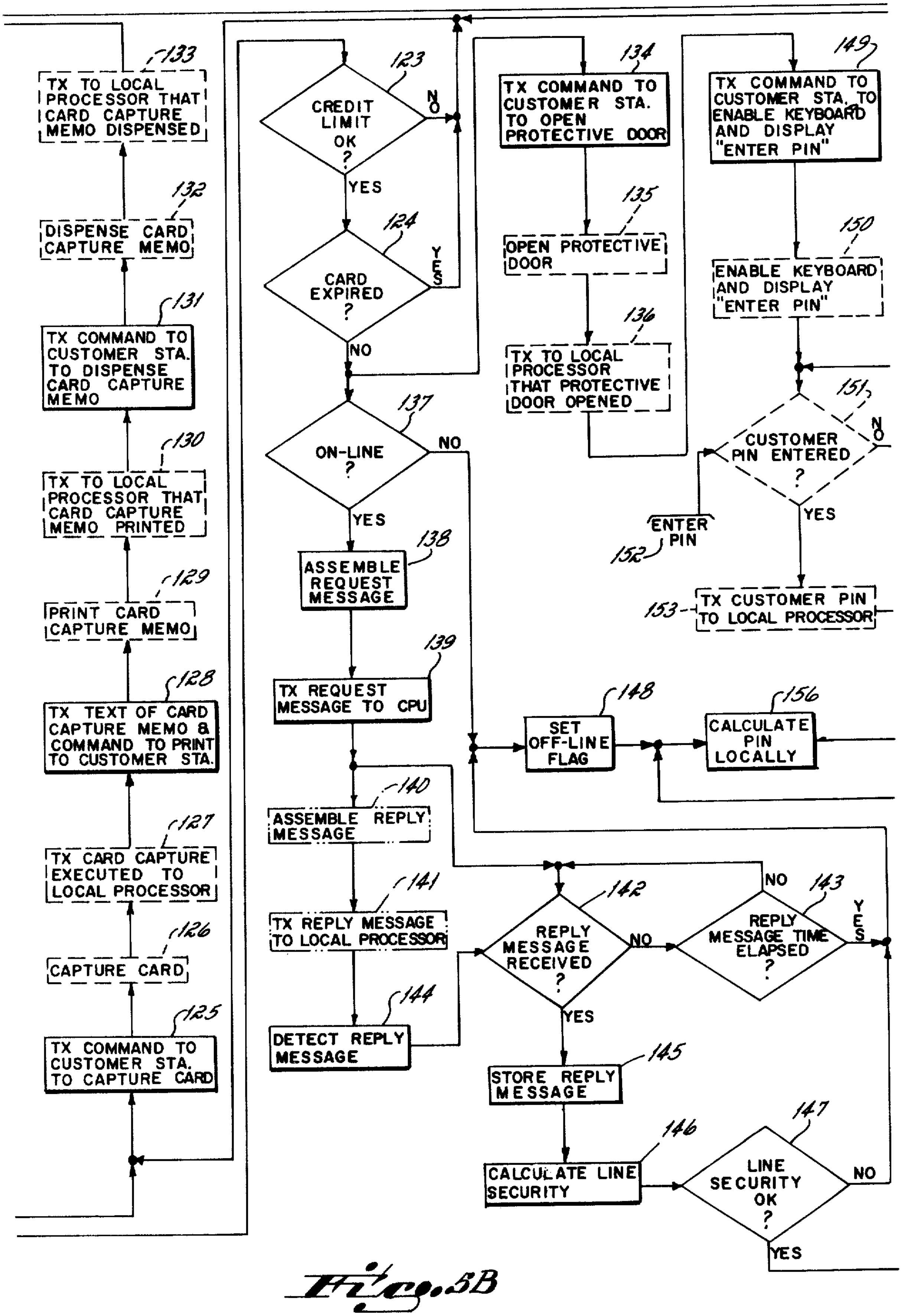

With reference to FIG. 5B, a credit limit check is next performed by the LPU, as indicated by LPU function 123, a) if the account number and suffix which the CS read from the inserted card do not appear in the discretionary file or b) if the account number and suffix which the CS read from the inserted card appear in the discretionary file, and the discretionary file directs card update rather than card capture.

If the credit limit which the CS read from the inserted card exceeds the maximum allowable credit limit which has been established by the bank which issued the inserted card, the LPU initiates a card capture process which will be described shortly. Otherwise the LPU checks the expiration date which the CS read from the inserted card as indicated by LPU function 124. If the card expiration date indicates that the card has expired, the LPU initiates a card capture process which is described immediately below.

If a) an image of the inserted card appears in the duplicate card file, b) the account number and suffix are present in the discretionary file and the discretionary file directs card capture, c) the credit limit exceeds the maximum credit limit for the bank that is identified by the bank code, or d) the expiration date indicates that the card has expired, the LPU sends a command to the CS to capture the card, as indicated by LPU function 125. In response the CS captures the card as indicated by CS function 126. The CS at function 127 sends a response to the LPU upon execution of the card capture command.

After the card has been captured, the LPU sends the text of a card capture memo and a print command to the CS, as indicated by LPU function 128. In response the CS prints a card capture memo, as indicated by CS function 129. The CS at function 130 sends a response to the LPU which indicates that the card capture memo has been printed.

After the card capture memo has been printed, the LPU sends a memo dispensation command to the CS, as indicated by LPU function 131. In response the CS dispenses the card capture memo to the person who inserted the card as indicated by CS function 132. The CS at function 133 sends a response to the LPU upon execution of the memo dispensation command and thereafter returns to its idle condition to await insertion of another card.

The card data checks will now be described in connection with FIG. 6. A pulse from sequencer 314 on line 345 enables card data analyzer 346. Card data analyzer 346 contains digital circuit modules which perform bank code, duplicate card file, discretionary file, credit limit, and expiration date checks. The structure and operation of these digital circuit modules is more fully described in the co-pending Slater et al. patent application.

Briefly, bank code check circuit module 347 checks whether or not the bank code which the CS read from the inserted card is present in the bank code file in local memory. The bank code from the inserted card in register 337 is input to bank code check 347 over data line 348. The bank codes in bank code file 349 are input to bank code check 347 over data line 350.

If the bank code which the CS read from the inserted card is not present in the bank code file, which indicates that the inserted card is not usable in the automated banking system, bank code check 347 sends a pulse to OR gate 351 via line 352. In response OR gate 351 sends a pulse via line 353 to terminal "13" of CS command encoder 317. Consequently, CS command encoder 317 transmits a "13", or "return card", command to the CS over CS data bus 318.

CS command decoder 319 at the CS receives the "13" command. CS command encoder 319 sends a pulse via line 354 to card reader/writer 321, which causes card reader/writer 321 to return the inserted card. Upon return of the inserted card, card reader/writer 321 sends a pulse via line 355 to response encoder 356. Response encoder 356 transmits a card return response over CS data bus 318 to response decoder 358, which consequently sends a control pulse to sequencer 314 via line 357.

If the bank code which the CS read from the inserted card is present in the bank code file in local memory, duplicate card file check circuit module 359 checks whether or not an image of the inserted card appears on the duplicate card file in local memory. The data from the inserted card in registers 337–344 is input to duplicate card file check 359 over data line 360. The images in duplicate card file 361 are input to duplicate card file check 359 over data line 362.

If an image of the inserted card appears in the duplicate card file, which indicates, for example, a fraudulently reproduced card has been inserted, duplicate card file check 359 sends a pulse to OR gate 363 via line 364. In response OR gate 363 sends a pulse via line 365 to terminal "16" of CS command encoder 317. Consequently, CS command encoder 317 transmits a "16", or "capture card", command to the CS over CS data bus 318.

CS command decoder 319 at the CS receives the "16" command. CS command decoder 319 sends a pulse via line 366 to card reader/writer 321, which causes card reader/writer 321 to capture the inserted card. Upon capture of the inserted card, card reader/writer 321 sends a pulse via line 367 to response encoder 356. Response encoder ff356 transmits a card capture response over CS data bus 318 to response decoder 358, which consequently sends a control pulse to sequencer 314 via line 357.

In response to the control pulse, sequencer 314 sends a pulse via line 368 to AND gate 369. AND gate 369 also receives a pulse from OR gate 363 via line 365, so that AND gate 369 is enabled and sends a pulse to OR gate 370. In response OR gate 370 sends a pulse to terminal "$\phi 2$" of CS command encoder 317. Consequently, CS command encoder 317 sends a "$\phi 2$", or "print", command to the CS over CS data bus 318.

CS command decoder 319 at the CS receives the "$\phi 2$" command. CS command decoder 319 sends a pulse via line 371 to printer 372, which causes printer 372 to print the text of a capture memo that the LPU transmits to printer 372 from capture message register 373 over data line 374, CS data bus 318, and data line 375. After printer 372 prints the capture memo, printer 372 sends a pulse via line 376 to response encoder 356. Response encoder 356 transmits a print response over CS data bus 318 to response decoder 358, which consequently sends a control pulse to sequencer 314 via line 357.

Sequencer 314 in response to the control pulse initiates dispensation of the card capture memo to the person who inserted the card. Sequencer 314 sends a pulse via line 377 to OR gate 378. In response OR gate 378 sends a pulse to terminal "11" of CS command encoder 317. Consequently, CS command encoder 317 transmits a "11", or "dispense memo", command to the CS over CS data bus 318.

CS command decoder 319 at the CS receives the "11" command. CS command decoder 319 sends a pulse via line 379 to printer 372, which causes printer 372 to dispense the card capture memo. Upon dispensation of the card capture memo, printer 372 sends a pulse via line 380 to response encoder 356. Response encoder 356 sends a memo dispensation response over CS data bus 318 to response decoder 358, which consequently sends a control pulse to sequencer 314 via line 357. This completes the card capture process.

If an image of the inserted card which the CS read does not appear in the duplicate card file, the card is not captured, but instead discretionary file check circuit module 381 determines whether or not the account number and suffix which the CS read from the inserted card are present in the discretionary file in local memory. The account number and suffix from the inserted card in register 338 are input to discretionary file check 381 over data line 382. The records in discretionary file 383 are input to discretionary file check 381 over data line 384.

If the account number and suffix are present in the discretionary file, discretionary file check 381 sends a pulse via line 385 to OR gate 387. In response OR gate 387 sends a pulse to enable capture/update check circuit module 386. Consequently, capture/update check 386 checks the record in discretionary file 383 which is indexed by the account number and suffix and which is input to capture/update check 386 over data line 384.

If the record, for example, consists of all zeros, capture/update check 386 sends a pulse via line 388 to OR gate 363. This causes the inserted card to be captured in accordance with the process which was described in detail above. If the record is non-zero, capture/update check 386 sends a pulse via line 389 to OR gate 390. This causes the card data in registers 337-344 to be updated as described immediately below.

In response to a pulse from capture/update check 386, OR gate 390 sends a pulse to set update flip-flop 391. A pulse from update flip-flop 391 on line 392 and a pulse from OR gate 387 on line 393 enable AND gate 394. Consequently, AND gate 394 sends a pulse to buffer register 395. This pulse causes buffer register 395 to send the card update data, which is input to buffer register 395 from discretionary file 383 over data line 384, to registers 337-344 over data line 396. This completes update of the data which the CS read from the inserted card and sent to the LPU, by means of the record in the discretionary file.

If the account number and suffix which the CS read from the inserted card are not present in the discretionary file, or after the card data which is stored in local memory has been updated as just described if the account number and suffix are present in the discretionary file, credit limit check digital circuit module 397 determines whether or not the credit limit which the CS read from the inserted card exceeds the maximum credit limit for the band which is identified by the bank code which the CS read from the inserted card. The credit limit from the inserted card in register 339 is input to credit limit check 397 over data line 398. The bank code from the inserted card in register 337 in input to credit limit check 397 over data line 348. The maximum bank credit limits in bank credit limit file 399 are input to credit limit check 397 over data line 400.

If the credit limit which the CS read from the inserted card exceeds the maximum credit limit which has been established by the bank that is identified by the bank code which the CS read from the card, credit limit check 397 sends a pulse to OR gate 363 via line 401. This initiates the card capture process which was described in detail above.

If the credit limit which the CS read from the inserted card does not exceed the identified bank's maximum allowable credit limit, expiration date check digital circuit module 402 checks to determine whether or not the inserted card has expired. The expiration date from the inserted card in register 340 is input to expiration date check 402 over data line 403. The time and date, which are input to time and date register 404 from clock 405 when a pulse from sequencer 314 is on line 345, are input to expiration date check 402 over data line 406.

If the expiration date which the CS read from the inserted card indicates that the inserted card has expired, expiration date check 402 sends a pulse to OR gate 363 via line 407. This initiates the card capture process which was described in detail above.

ACCESS TO PANEL

With reference to FIG. 5B, if the bank code, duplicate card file, discretionary file, credit limit, and card expiration date checks do not culminate in the return or capture of the inserted card, the LPU at function 134 sends a command to the CS to open the protective door. In response the CS opens the protective door to reveal the transaction panel at the CS as indicated by CS function 135. The CS at function 136 transmits a response to the LPU upon execution of the open protective door command.

Referring to FIG. 6, sequencer 314 sends a pulse via line 408 to terminal "$\phi$1" of CS command encoder 317. Consequently, CS command encoder 317 transmits a "$\phi$1", or "open protective door", command to the CS over CS data bus 318.

CS command decoder 319 at the CS receives the "$\phi$1" command. CS command decoder 319 sends a pulse via line 409 to protective door operator 410, which causes protective door operator 410 to open the protective door. Upon opening the protective door, protective door operator 410 sends a pulse via line 411 to response encoder 356. Response encoder 356 sends a protective door open response over CS data bus 318 to response decoder 358, which consequently sends a control pulse to sequencer 314 via line 357.

Request Message/Reply Message (On-line)

Returning to FIG. 5B, the LPU meanwhile determines whether it is in the on-line mode or the off-line mode as indicated by LPU function 137. If the LPU determines that it is in the on-line mode, the LPU assembles a request message as indicated by LPU function 138. The LPU at function 139 transmits the request message to the CPU.

The request message includes the time and date and data which the CS read from the inserted card, which the CPU uses to process the request message. A format and content for the request message are discussed in detail in the co-pending Slater et al. patent application.

With reference to FIG. 6, the pulse from sequencer 314 on line 408 and the pulse from mode detector 307 on line 309 enable AND gate 412. The pulse from mode detector 307, by way of review, indicates that the LPU is in the on-line mode.

Consequently, AND gate 412 sends a pulse via line 413 to enable request message assembler 414. The time and date in time and date register 404 are input to request message assembler 414 over data line 406. The data, which the CS read from the inserted card, in registers 337-344 is input to request message assembler 414 over data line 360. In response to a poll from the CPU over LPU data bus 306 and data line 415, request message asembler 414 transmits the request message to the CPU over data line 416 and data bus 306.

The CPU receives the request message and assembles a reply message, as indicated by CPU function 140 in FIG. 5B. Referring to FIG. 1, the CPU in response to the request message accesses update file UF which is associated with the bank that is identified by the bank code which the LPU sends in the request message. The CPU determines whether or not the account number and suffix in the request message are present in the update file. If the account number and suffix are present in the update file, the CPU assembles the card update data in the update file into the reply message.

The CPU uses the bank code which the LPU sent in the request message to access an algorithm in algorithm file AF. The CPU employs the algorithm to derive a personal identification number (PIN) comparison number from the account number portion of the account number and suffix which the LPU sent in the request message.

The CPU also accesses customer data file CDF which is associated with the bank that is identified by the bank code which the LPU sent in the request message. The CPU searches for the account number and suffix and accesses the identified customer's account balances and other customer-related tabular information, such as the identified customer's credit profile.

The CPU uses the identified customer's account balances and credit profile to compute a working balance, which comprises the amount of funds which the customer has available for on-line transactions, for each of the identified customer's credit-type accounts, such as his checking, savings, and credit card accounts, it being noted that the working balance for each of the identified customer's debit-type accounts, such as his mortgage and loan accounts, equals zero. The CPU uses the identified customer's account balances, including the account balances of both credit- and debit-type accounts, and the identified customer's credit profile to calculate an extended credit balance, which comprises a sum which extends a working balance when the identified customer transacts an on-line cash withdrawal in excess of the working balance for the account that is the debit account. The extended credit balance facilitates "split deposits" with little risk to the bank as further described in the co-pending Slater et al. patent application. The CPU also uses the identified customer's account balances and credit profile to compute a maximum cash limit which limits the identified customer to the withdrawal of no more than a certain amount of cash.

The CPU further uses the bank code which the LPU sent in the request message to access another algorithm in algorithm file AF. The CPU employs the algorithm to calculate a line security code from the time and date which the LPU sent in the request message.

A format and content for the reply message are discussed in detail in the co-pending Slater et al. patent application. The reply message includes the line security code, the PIN comparison number, account descriptions for the identified customer's accounts together with the actual account balances and account working balances for those accounts, the extended credit balance, the maximum credit limit, and any card update data. The CPU also assembles a customer command, which will be described later, into the reply message.

The CPU sends the reply message to the LPU as indicated by CPU function 141 in FIG. 5B.

The LPU determines whether or not a reply message has been received as indicated by LPU function 142. The LPU determines at function 143 whether or not a predetermined amount of time, for example, 30 seconds, has elapsed since the LPU sent the request message to the CPU.

If the LPU receives a reply message within the predetermined time period, as indicated by LPU function 144, the LPU stores the reply message as indicated by LPU function 145.

With reference to FIG. 6, the CPU 300, which includes reply message assembler 417, accesses central memory 418 when necessary and processes the request message. After the reply message is assembled, the CPU sends the reply message to the LPU. The LPU receives the reply message over LPU data bus 306. The LPU enters the reply message in local memory over data line 419. The LPU enters the line security code in register 420; the PIN comparison number in register 421; the account descriptions in registers $\mathbf{422}_n$; the actual, or inquiry, balances in registers $\mathbf{423}_n$; the working balances in registers $\mathbf{424}_n$; the extended credit balance in register 425; the maximum cash limit in register 426; the customer command in register 427; and any card update data in registers $\mathbf{428}_n$.

Returning to FIG. 5B, the LPU accesses an algorithm which is associated with the bank code which the CS read from the inserted card and which is identical to the algorithm which the CPU used to calculate the line security code. The LPU employs the algorithm and the same time and data data that the LPU sent to the CPU in the request message to calculate a line security comparison number, as indicated by LPU function 146. The LPU at function 147 determines whether or not the line security comparison number is the same as the line security code in the reply message.

Referring to FIG. 6, when the LPU is in the on-line mode, pulses from sequencer 314 on line 408 and from mode detector 307 on line 309 enable AND gate 412. AND gate 412 sends a pulse via line 413 which enables line security comparison number calculator 324. An algorithm from line security file 429 is input to line security comparison number calculator 324 over data line 430. The time and date in time and date register 404 are input to line security comparison number calculator 324 over data line 406.

After the line security comparison number is calculated, line security comparison number calculator 324 sends the line security comparison number over data line 431 to line security check digital circuit module 432. The line security code from the reply message in register 420 is input to line security check 432 over data line 435.

AND gate 433 is enabled by a pulse on line 413 and a pulse from reply message detector 434, when reply message detector 434 detects a reply message. Consequently, AND gate 433 sends a pulse which enables line security check 432. Line security check 432 compares the line security comparison number which was calculated by the LPU with the line security code which was calculated by the CPU and sent to the LPU in the reply message.

Referring again to FIG. 5B, if the LPU determines at function 137 that it is in the off-line mode, the LPU does not assemble a request message, but instead the LPU sets an off-line flag, as indicated by LPU function 148. Also, if the LPU sends a request message to the CPU but does not receive a reply message from the CPU within the predetermined time period, the LPU switches from the on-line mode to the off-line mode and proceeds to LPU function 148 where the LPU sets the off-line flag. In addition, if the LPU determines that the line security comparison number which it calculates is not the same as the line security code which the CPU sent in the reply message, the LPU at function 148 sets the off-line flag.

With reference to FIG. 6, a pulse from mode detector 307 on line 311 causes OR gate 436 to send a pulse to set off-line flip-flop 437 if the LPU is in the off-line mode.

If the LPU is in the on-line mode and sends a request message to the CPU, a pulse on line 413 enables time monitor 438. Time monitor 438 checks the time which is input to time monitor 438 over data line 439 from clock 405. If the LPU does not receive a reply message within the time period which is set into time monitor 438, time monitor 438 sends a pulse to OR gate 436 via line 440. Consequently, OR gate 436 sends a pulse to set off-line flip-flop 437. If a reply message is received within the allowed time period, however, a pulse from reply message detector 434 on line 441 disables time monitor 438 before time monitor 438 sets off-line flip-flop 437.

Finally, if a reply message is received, but line security check 432 determines that the line security comparison number which the LPU calculates and the line security code which the CPU sent in the reply message do not match, line security check 432 sends a pulse via line 442 to OR gate 436, which causes OR gate 436 to send a pulse to set off-line flip-flop 437.

CARDHOLDER VERIFICATION

Returning to FIG. 5B, the LPU at function 149 sends a command to the CS to enable the keyboard and to display "ENTER PIN". In response the CS enables the keyboard and displays "ENTER PIN", as indicated by CS function 150.

The CS determines at function 151 whether or not the customer has made a PIN entry by means of the keyboard. After a customer enters a PIN, as indicated by customer function 152, the CS at function 153 transmits the PIN to the LPU.

Referring to FIG. 6, sequencer 314 sends a pulse via line 443 to terminal "$\phi 3$" of CS command encoder 317. Consequently, CS command encoder 317 sends a "$\phi 3$", or "enable keyboard and display 'ENTER PIN'", command to the CS over CS data bus 318.

CS command decoder 319 at the CS receives the "$\phi 3$" command. CS command decoder 319 sends a pulse via line 444 to OR gate 445. In reponse OR gate 445 sends a pulse via line 446 to keyboard 447. This pulse enables keyboard 447 so that the customer can enter a PIN. The pulse from CS command decoder 319 on line 444 also activates "ENTER PIN" lamp 448 in display 449 to instruct the customer to enter a PIN.

When the customer enters a PIN, as indicated generally by the numeral 450, keyboard 447 sends the PIN to the LPU over data line 451 and CS data bus 318.

Figure 5C:
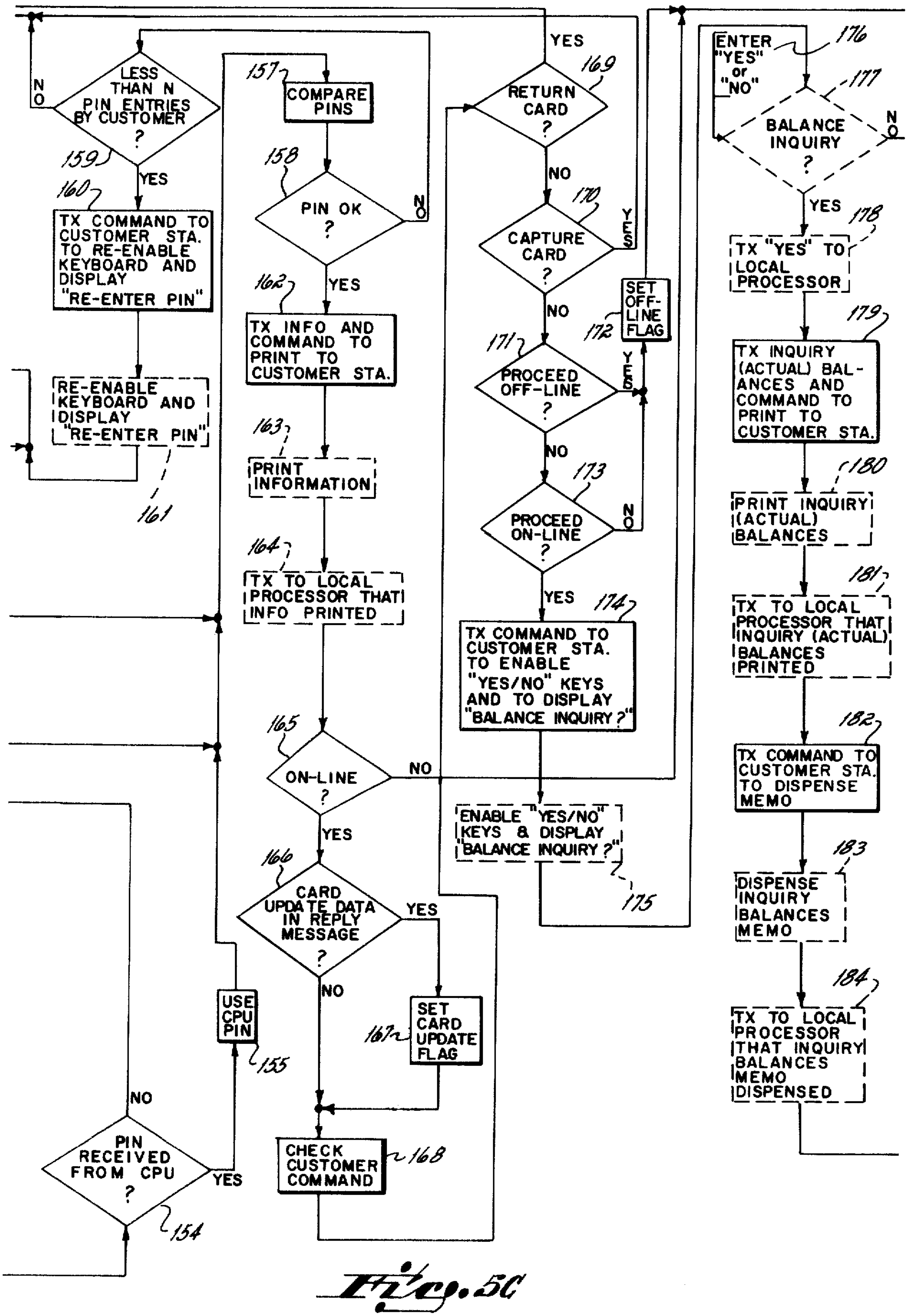

As shown in FIG. 5C, if the LPU is in the on-line mode and a reply message has been received, the LPU at function 154 determines whether or not the CPU has sent a PIN comparison number in the reply message. If a PIN comparison number is included in the reply message, the LPU sets a flag which directs the LPU to compare the PIN which the customer entered with the PIN comparison number in the reply message, as indicated by LPU function 155.

If the LPU is in the off-line mode, as indicated by LPU function 137; if the LPU was in the on-line mode and a request message was sent to the CPU, but the CPU did not send a reply message to the LPU within the allotted time, as indicated by LPU function 143; or if the LPU at function 147 determines that the line security code which the CPU sent in the reply message does not match the line security comparison number which the LPU computed, the off-line flag is set as indicated by LPU function 148. In any of these cases, or in the case where line security exists but the CPU did not send a PIN comparison number in the reply message, the LPU calculates a PIN comparison number locally, as indicated by LPU function 156 in FIG. 5B.

With reference to FIG. 6, if the LPU has received a reply message, reply message PIN comparison number check digital circuit module 452, which is enabled by a pulse from sequencer 314 on line 443, checks register 421 and determines whether or not the reply message included a PIN comparison number. If the CPU sent a PIN comparison number in the reply message, reply message PIN comparison number check 452 sends a pulse via line 454 to set CPU PIN flip-flop 453.

If a PIN comparison number is not included in the reply message, reply message PIN comparison number check 452 sends a pulse via line 455 to OR gate 456. OR gate 456 sends a pulse to enable PIN calculator 457. The bank code which the CS read from the inserted card in register 337 is input to PIN calculator 457 over data line 348. The algorithms in algorithm file 458 in local memory are input to PIN calculator 457 over data line 459. PIN calculator 457 selects the proper algorithm by means of the bank code and derives a PIN comparison number from the account number portion of the account number and suffix which is input to PIN calculator 457 from register 338 over data line 382.

Note also that if off-line flip-flop 437 has been set due to the failure of line security, the lapse of the time period within which the LPU must receive a reply message, or because the LPU is in the off-line mode, off-line flip-flop 437 sends a pulse to OR gate 456 via line 460. This pulse causes OR gate 456 to send a pulse to enable PIN calculator 457, and a PIN comparison number is calculated locally as described in detail immediately above.

Referring again to FIG. 5C, the LPU at function 157 compares the PIN which the customer entered with the PIN comparison number either included in the reply message or calculated locally as a result of the process which was described above. If the LPU determines at function 158 that the PIN which the customer entered does not match the PIN comparison number, and LPU determines whether or not the customer has attempted a predetermined number of PIN entires, as indicated by LPU function 159. The customer, for example, may be permitted three attempts to enter the correct PIN.

If the customer has exceeded the predetermined allowable number of attempts to enter the correct PIN, the LPU commands the CS to capture the card, print a card capture message, and dispense a card capture memo to the customer in accordance with LPU and CS functions 125–133 described earlier. The CS thereafter returns to its idle condition and awaits insertion of another card.

If the customer has not exceeded the predetermined allowable number of attempts to enter the correct PIN, the LPU at function 160 sends a command to the CS to re-enable the keyboard and to display "RE-ENTER PIN". In response the CS at function 161 re-enables the keyboard and displays "RE-ENTER PIN". The sequence of LPU and CS functions 151–153 and 157–161 repeats until LPU function 159 indicates that the inserted card should be captured or until LPU function 158 indicates that the customer successfully entered his PIN within the predetermined allowable number of attempts.

Referring to FIG. 6, PIN check 461 is enabled by a pulse from sequencer 314 on line 443. The PIN which the customer entered by means of keyboard 447 and which the CS sent to the LPU is input to PIN check digital circuit module 461 over data line 462.

If the LPU has received a reply message which included a PIN comparison number, CPU PIN flip-flop 453 sends a pulse to PIN check 461 via line 463 which causes the reply message PIN comparison number in register 421 to be input to PIN check 461 over data line 464. If off-line flip-flop 437 has been set in one of the manners which was described in detail above, or the CPU did not send a PIN comparison number in the reply message, OR gate 456 sends a pulse to PIN check 461 via line 465 which causes the locally calculated PIN comparison number in PIN calculator 457 to be input to PIN check 461 over data line 466.

PIN check 461 compares the PIN which the customer entered with the appropriate PIN comparison number. If the PIN which the customer entered does not match the PIN comparison number, PIN check 461 sends a pulse to counter 467 over line 468. This pulse increments the count in counter 467. The incremented count in counter 467 is input to one register of comparator 469. The other register of comparator 469 contains the predetermined number of allowable PIN entry attempts N.

If comparator 469 determines that the number in counter 467 equals the predetermined number of allowable PIN entry attempts, comparator 469 sends a pulse via line 470 to OR gate 363. This initiates the card capture process which was described in detail earlier.

If comparator 469 determines that the number in counter 467 is less than the predetermined number of allowable PIN entry attempts, comparator 469 sends a pulse via line 471 to terminal "$\phi$4" of CS command encoder 317. Consequently, CS command encoder 317 sends a "$\phi$4", or "re-enable keyboard and display 'RE-ENTER PIN'", command to the CS over CS data bus 318.

CS command decoder 319 at the CS receives the "$\phi$4" command. CS command decoder 319 sends a pulse via line 472 to OR gate 445. This causes keyboard 447 to be enabled in a manner which was described above. The pulse from CS command decoder 319 on line 472 also activates "RE-ENTER PIN" lamp 473 in display 449 to instruct the customer to re-enter his PIN. When the customer re-enters a PIN, keyboard 447 transmits the PIN over date line 451 and CS data bus 318 and the PIN check process which was just described is repeated.

PRINTING INITIAL INFORMATION ON TRANSACTION MEMO

Returning to FIG. 5C, if the cardholder PIN has been verified by the LPU at function 158, the LPU sends information, such as time and date and customer identification information, like an account number, to the CS together with a print command, as indicated by LPU function 162. In response the CS prints the information on a memo, as indicated by CS function 163. The CS at function 164 sends a response to the LPU to indicate that it has printed the information on the memo.

With reference to FIG. 6, sequencer 314 sends a pulse to OR gate 370 via line 474. In response OR gate 370 sends a pulse to terminal "$\phi$2" of CS command encoder 317. Consequently, CS command encoder 317 sends a "$\phi$2", or "print", command to the CS over CS data bus 318.

CS command decoder 319 at the CS receives the "$\phi$2" command. CS command decoder 319 sends a pulse via line 371 to printer 372, which causes printer 372 to print the time and date and customer identification information that the LPU sends to printer 372. The LPU sends the time and date in register 404 to printer 372 over data line 406, CS data bus 318, and data line 475. The LPU transmits the customer identification information in registers 337–344 to printer 372 over data line 360, CS data bus 318, and data line 476. After printer 372 prints the information on a memo, printer 372 sends a pulse via line 376 to response encoder 356. Response encoder 356 sends a print response over CS data bus 318 to response decoder 358, which consequently sends a control pulse to sequencer 314 via line 357.

CARD DATA UPDATE (ON-LINE)

If the LPU determines at function 165 that it is in the on-line mode, the LPU determines whether or not the reply message which it received from the CPU included any card update data, as indicated by LPU function 166. If the CPU sent any card update data in the reply message, the LPU updates the card data in local memory and sets the card update flag as indicated by LPU function 167.

With reference to FIG. 6, sequencer 314 sends a pulse to AND gate 477 via line 478. When off-line flip-flop 437 is not set, inverter 479 on line 460 sends a pulse via line 480 to AND gate 477. Thus, when the LPU is in the on-line mode, the pulse from sequencer 314 on line 478 and the pulse from inverter 479 enable AND gate 477, and AND gate 477 sends a pulse to OR gate 387 via line 481. In response OR gate 387 sends a pulse to enable capture/update check 386.

Any card update data from the reply message in registers $428_n$ is input to capture/update check 386 over data line 482. Capture/update check 386 checks the card update data as previously described.

If the data in registers $428_n$ is all zeros, capture/update check 386 sends a pulse via line 388 to OR gate 363. This pulse initiates the card capture process which was described earlier.

If the data in registers $428_n$ is non-zero, capture/update check 386 sends a pulse to OR gate 390. This pulse initiates update of the card data in local memory. Update flip-flop 391 is set, and AND gate 394 sends a pulse to buffer register 395, which causes buffer register 395 to send the card update data, that was input to buffer register 395 over data line 482, to registers 337–344 over data line 396.

CUSTOMER COMMAND (ON-LINE)

Referring again to FIG. 5C, if LPU function 166 determines that the CPU sent no card update data in the reply message, of after local memory is updated and the card update flag is set at LPU function 167, the LPU checks the customer command in the reply message as indicated by LPU function 168.

The LPU determines at function 169 whether or not the customer command directs that the inserted card be returned. If the customer command directs return of the inserted card, the LPU initiates a card return sequence in accordance with previously described LPU and CS functions 116–118 (FIG. 5A). The CS thereafter returns to its idle condition and awaits insertion of another card.

If the customer command in the reply message does not direct that the inserted card be returned, the LPU determines at function 170 whether or not the customer command directs that the inserted card be captured. If the customer command directs capture of the inserted card, the LPU initiates the card capture sequence in accordance with previously described LPU and CS functions 125–133 (FIG. 5B). The CS thereafter returns to its idle condition and awaits insertion of another card.

If the customer command in the reply message does not direct that the inserted card be captured, the LPU determines at function 171 whether or not the customer command directs the LPU to handle ensuing customer transactions in the off-line mode. If the customer command directs the LPU to handle customer transactions off-line, the LPU sets the off-line flag, as indicated by LPU function 172.

If the customer command in the reply message does not direct the LPU to handle ensuing customer transactions in the off-line mode, the LPU determines at function 173 whether or not the customer command directs the LPU to handle ensuing customer transactions in the on-line mode. If not, the LPU sets the off-line flag as indicated by LPU function 172 and handles ensuing transactions in the off-line mode.

Referring to FIG. 6, the customer command check will now be briefly described. The customer command which the CPU sent in the reply message is input to customer command decoder 486 from register 427 over data line 487. Sequencer 314 sends a pulse via line 483 to AND gate 484. AND gate 484 also receives a pulse on line 480, when the LPU is in the on-line mode, so that AND gate 484 is enabled and sends a pulse via line 485 to enable customer command decoder 486.

Customer command detector 486 sends a pulse via line 488 to OR gate 351 if the customer command directs card return. This pulse initiates the card return process which was described in detail above.

Customer command decoder 486 sends a pulse via line 489 to OR gate 363 if the customer command directs card capture. This pulse initiates the card capture process which was described in detail earlier.

Customer command decoder 486 sends a pulse via line 490 to OR gate 436, which sends a pulse to set off-line flip-flop 437, if the customer command directs the LPU to handle customer transactions in the off-line mode.

Customer command decoder 486 sends a pulse via line 491 to off-line flip-flop 437, which resets off-line flip-flop 437, if the customer command directs the LPU to handle customer transactions in the on-line mode.

BALANCE INQUIRY (ON-LINE)

Returning to FIG. 5C, if the LPU determines at function 173 that the customer command which the CPU sent in the reply message directs the LPU to continue in the on-line mode and process transactions in accordance with the data that the CPU sent to the LPU in the reply message, the LPU queries the customer whether or not he wishes to learn the actual balances of his accounts. The purpose of the balance inquiry is to permit the customer to learn the actual balances of the various accounts he maintains at his bank to facilitate performance of transactions which involve those accounts.

The LPU at function 174 sends a command to the CS to enable the Yes/No response keys and to display "BALANCE INQUIRY?". In response the CS enables the Yes/No response keys and displays "BALANCE INQUIRY?", as indicated by CS function 175.

The customer indicates by depression of one of the Yes/No response keys whether or not he wants to learn his actual account balances, as indicated by customer function 176. The CS determines at function 177 whether or not the customer has depressed one of the Yes/No response keys.

If the customer wants to learn his actual account balances and, therefore, depresses the "Yes" response key, the CS sends the "Yes" response to the LPU, as indicated by CS function 178. Consequently, the LPU sends the actual balances of the customer's accounts to the CS together with a print command, as indicated by LPU function 179. In response the CS prints the actual balances of the customer's accounts on a memo, as indicated by CS function 180. The CS at function 181 transmits a response to the LPU to indicate that the actual balances have been printed.

The LPU then sends a command to the CS to dispense the inquiry (actual) account balances memo to the customer, as indicated by LPU function 182. In response the CS at function 183 dispenses the inquiry (actual) account balances memo to the customer. The CS at function 184 sends a response to the LPU to indicate that the inquiry (actual) account balances memo has been dispensed to the customer.

With reference to FIG. 6, sequencer 314 sends a pulse via line 491 to AND gate 492. AND gate 492 also receives a pulse on line 480, when the LPU is in the on-line mode, so that AND gate 492 is enabled and sends a pulse to terminal "22" of CS command encoder 317. Consequently, CS command encoder 317 transmits a "22", or "enable Yes/No response keys and display 'BALANCE INQUIRY?'", command to the CS over CS data bus 318.

CS command decoder 319 at the CS receives the "22" command. CS command decoder 319 sends a pulse via line 493 to OR gate 494. In response OR gate 494 sends a pulse via line 495 to Yes/No response keys 496. This pulse enables Yes/No response keys 496 so that the customer can indicate whether or not he wants to learn his actual account balances before he performs other transactions which involve the funds in his accounts. The pulse from CS command decoder 319 on line 493 also activates "BALANCE INQUIRY?" lamp 497 in display 449 to query the customer whether or not he wants to learn his actual account balances.

If the customer depresses the "Yes" response key, the "Yes" response key transmits a "Yes" response to the LPU over data line 498 and CS data bus 318. Yes/No response decoder 499 at the LPU receives the "Yes" response.

Consequently, Yes/No response decoder 499 sends a pulse to AND gate 500 via line 501. AND gate 500 also receives a pulse from AND gate 492 via line 502 during the balance inquiry process, so that AND gate 500 is enabled and sends a pulse via line 503 to OR gate 370. OR gate 370 sends a pulse to terminal "$\phi 2$" of CS command encoder 317. Consequently, CS command encoder 317 transmits a "$\phi 2$", or "print", command to the CS over CS data bus 318.

CS command decoder 319 at the CS receives the "$\phi 2$" command. CS command decoder 319 sends a pulse via line 371 to printer 372, which causes printer 372 to print the customer's actual account balances in registers $423_n$ that the LPU sends to printer 372 over data line 504, CS data bus 318, and data line 505.

After printer 372 prints the actual account balances, printer 372 sends a pulse via line 376 to response encoder 356. Response encoder 356 sends a print response over CS data bus 318 to response decoder 358, which consequently sends a control pulse to sequencer 314 via line 357.

In response to the control pulse, sequencer 314 sends a pulse via line 506 to OR gate 378. This initiates dispensation of the inquiry (actual) account balances memo to the customer in a manner which was described earlier in conjunction with dispensation of a card capture memo.

RE-INITIALIZATION AFTER BALANCE INQUIRY (ON-LINE)

Figure 5D:
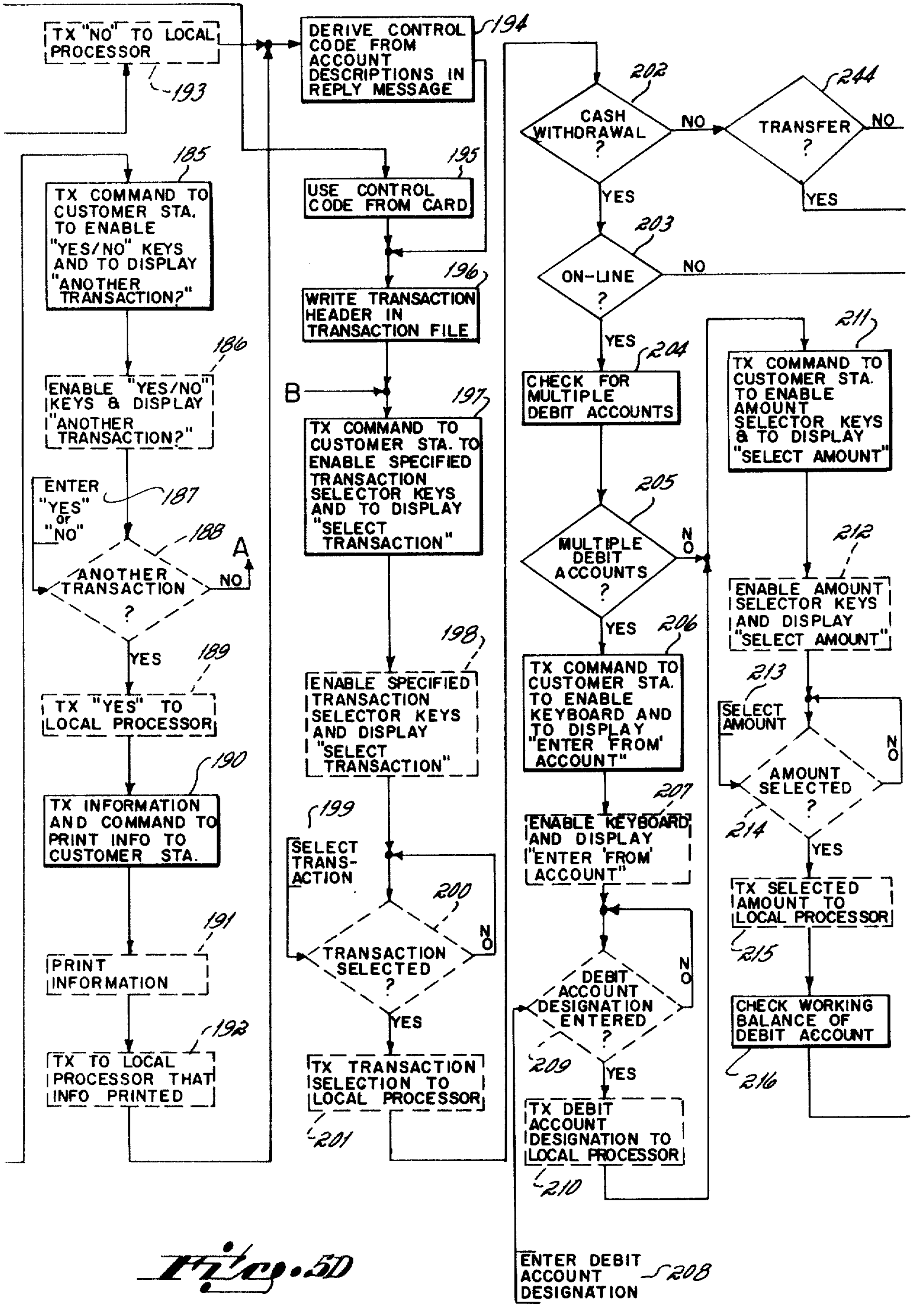

Referring to FIG. 5D, the LPU at function 185 sends a command to the CS to enable the Yes/No response keys and to display "ANOTHER TRANSACTION?". In response the CS enables the Yes/No response keys and displays "ANOTHER TRANSACTION?", as indicated by CS function 186.

The customer indicates by depression of one of the Yes/No response keys whether or not he wants to select an additional transaction, as indicated by customer function 187. The CS determines at function 188 whether or not the customer has depressed one of the Yes/No response keys.

If the customer wants one or more additional transactions and, therefore, depresses the "Yes" response key, the CS sends the "Yes" response to the LPU, as indicated by CS function 189. Consequently, the LPU initiates a sequence of LPU and CS functions 190–192 that are analogous to previously described LPU and CS functions 162–164. This results in the time and date and customer identification information, like an account number, being printed on a new transaction memo.

Referring to FIG. 6, after an actual account balances memo has been dispensed to the customer, sequencer 314 sends a pulse via line 507 to OR gate 508. In response OR gate 508 sends a pulse via line 509 to terminal "$\phi$9" of CS command encoder 317. Consequently, CS command encoder 317 transmits a "$\phi$9", or "enable Yes/No response keys and display 'ANOTHER TRANSACTION?'", command to the CS over CS data bus 318.

CS command decoder 319 at the CS receives the "$\phi$9" command. CS command decoder 319 sends a pulse via line 510 to OR gate 494. This causes the enablement of Yes/No response keys 496 by means of a process which was described earlier so that the customer can indicate whether or not he wants an additional transaction. The pulse from CS command decoder 319 on line 510 also activates "ANOTHER TRANSACTION?" lamp 511 in display 449 to query the customer whether or not he wants an additional transaction.

If the customer depresses the "Yes" response key, the "Yes" response key transmits a "Yes" response to the LPU over data line 498 and CS data bus 318. Yes/No response decoder 499 at the LPU receives the "Yes" response. Consequently, Yes/No response decoder 499 sends a pulse via line 501 to AND gate 512. AND gate 512 also receives a pulse from sequencer 314 via line 507, so that AND gate 512 is enabled and sends a pulse via line 513 to OR gate 370. This initiates the process which was described in detail above which causes the CS to print the time and date and certain customer identification information on a new transaction memo.

If the customer depresses the "No" response key, a customer close-out sequence, which will be described later, commences.

DETERMINATION OF CERTAIN TRANSACTIONS AVAILABLE TO CUSTOMER (ON-LINE)

Referring now to FIG. 5C, if the customer does not want to learn his actual account balances before he performs transactions which involve his accounts, he depresses the "No" response key at customer function 176. The CS determines that the customer has depressed the "No" response key, as indicated by CS function 177, and at function 193 (FIG. 5D) sends a "No" response to the LPU. If, on the other hand, the customer depresses the "Yes" response key at customer function 176, a balance inquiry transaction takes place. After the balance inquiry transaction the customer is asked whether or not he wants an additional transaction. If the customer wants an additional transaction, the re-initialization sequence which is described above takes place, culminating with CS function 192.

Thereafter, the LPU determines at function 194 what transactions are available to the customer by means of the account descriptions which the CPU sent in the reply message.

With reference to FIG. 6, if the customer depresses the "No" response key when asked if he wants to learn his actual account balances, the "No" response key transmits a "No" response to the LPU over data line 514 and CS data bus 318. Yes/No response decoder 499 receives the "No" response and sends a pulse to AND gate 515 via line 516. AND gate 515 also receives a pulse from AND gate 492 via line 502 at the beginning of the balance inquiry sequence, so that AND gate 515 is enabled and sends a pulse via line 517 to OR gate 518. Consequently, OR gate 518 sends a pulse to transaction controller 519 via line 520.

If the customer depresses the "Yes" response key when asked if he wants to learn his actual account balances, the LPU supervises completion of the balance inquiry transaction, additional transaction query, and re-initialization process which has already been described. Subsequently, sequencer 314 sends a pulse to AND gate 521 via line 522. AND gate 521 also receives a pulse on line 480, when the LPU is in the on-line mode, so that AND gate 521 is enabled and sends a pulse via line 523 to OR gate 518. Consequently, OR gate 518 sends a pulse to transaction controller 519 via line 520.

The account descriptions from the reply message in registers 422$_n$ are input to transaction controller 519 over data line 524. In response to the pulse from OR gate 518 on line 520, transaction controller 519 processes the account descriptions and sends a pulse to terminal "$\phi$5" of CS command encoder 317, via line 525. Transaction controller 519 also sends available transaction data to transaction file 327 over data line 526 and transmits available transaction data to the CS over data line 526 and CS data bus 318.

DETERMINATION OF CERTAIN TRANSACTIONS AVAILABLE TO CUSTOMER (OFF-LINE)

Referring to FIG. 5C, if the LPU determines at function 165 that it is in the off-line mode, or if the LPU switches to the off-line mode due to the customer command, which the CPU sends in a reply message, in accordance with LPU functions 171–173, the LPU determines at function 195 what transactions are available to the customer. In this case, the LPU uses the control code which the CS read from the inserted card to determine what transactions are available to the customer.

With reference to FIG. 6, if the LPU is in the off-line mode, a pulse from sequence controller 314 on line 522 and a pulse from off-line flip-flop 437 on line 460 enable AND gate 527, so that AND gate 527 is enabled and sends a pulse via line 528 to transaction controller 519.

The control code from the inserted card in register 341 is input to transaction controller 519 over data line 529. In response to the pulse from AND gate 527 on line 528, transaction controller 519 processes the control code and sends a pulse via line 525 to terminal "$\phi$5" of CS command encoder 317. Transaction controller 519 also sends available transaction data to transaction file 327 over data line 526 and transmits available transaction data to the CS over data line 526 and CS data bus 318.

ENABLEMENT OF CERTAIN TRANSACTIONS AVAILABLE TO CUSTOMER AND CUSTOMER SELECTION OF A TRANSACTION

Returning to FIG. 5D, the LPU at function 196 writes the transactions, such as cash withdrawal from savings, transfer from checking to savings, etc., as headings in the transaction file in local memory. Thus, when a customer performs transactions, the transactions can be grouped under transaction headings when a transaction memo is printed as will be described later.

The LPU then sends a command to the CS to enable certain transaction selector keys and to display "SELECT TRANSACTION", as indicated by LPU function 197. In response the CS at function 198 enables the specified transaction selector keys and displays "SELECT TRANSACTION".

The customer selects a transaction from among the transactions which are made available by means of certain enabled transaction selector keys, as indicated by customer function 199. The CS determines at function 200 whether or not the customer has selected a transaction. When the customer selects a transaction, the CS sends the transaction selection to the LPU, as indicated by CS function 201.

Referring to FIG. 6, in response to a pulse from transaction controller 519 on line 525, CS command encoder 317 sends a "$\phi$5", or "enable transaction selector keys and display 'SELECT TRANSACTION'", command to the CS over CS data bus 318.

CS command decoder 319 at the CS receives the "$\phi$5" command. CS command decoder 319 sends a pulse via line 530 to transaction selector key control 531. In response to the pulse on line 530, transaction selector key control 531 processes the available transaction data, which the LPU sends to transaction selector key control 531 over data line 526, CS data bus 318, and data line 532, and enables certain transaction selector keys 533 in accordance with the available transaction data. The pulse from CS command decoder 319 on line 530 also activates "SELECT TRANSACTION" lamp 534 in display 449 to instruct the customer to choose a transaction.

When the customer selects a transaction, the CS sends the transaction selection to the LPU. The particular one of transaction selector keys 533 which the customer depresses transmits the transaction selection over data line 535, CS data bus 318 and data line 542 to selection controller 536 at the LPU.

CASH WITHDRAWAL TRANSACTION

Returning to FIG. 5D, the LPU at function 202 determines whether or not the customer has selected a cash withdrawal transaction. If the LPU at function 202 determines that the customer has selected a cash withdrawal transaction, the LPU next determines whether it is in the on-line mode or the off-line mode, as indicated by LPU function 203.

CASH WITHDRAWAL (ON-LINE)

If the LPU at function 203 determines that it is in the on-line mode, the LPU at function 204 checks the account descriptions which the CPU sent in the reply message to determine whether or not the customer has more than one account of a particular type called for by the transaction selection which could serve as the debit account for the cash withdrawal. If the customer has several savings accounts, for example, and he has selected a cash-from-savings withdrawal transaction, the LPU must elicit an instruction from the customer with regard to which savings account is to have funds removed in the form of a cash withdrawal.

If the LPU determines at function 205 that more than one account which the CPU sent in the reply message could be used as the debit account, the LPU sends a command to the CS to enable the keyboard and to display "ENTER 'FROM' ACCOUNT", as indicated by LPU function 206. In response the CS at function 207 enables the keyboard and displays "ENTER 'FROM' ACCOUNT" to instruct the customer to enter a memorized designation for the particular account which the customer wants to serve as the debit account for the cash withdrawal.

The customer enters the memorized designation, such as a one or two digit number, by means of the keyboard to indicate which account he wants to serve as the debit account, as indicated by customer function 208. The CS determines at function 209 whether or not the customer has entered a designation to identify the debit account. Upon entry of a designation by the customer, the CS sends the designation to the LPU, as indicated by CS function 210.

If the LPU determines at function 205 that only one account could serve as the debit account for the cash withdrawal transaction, or after the LPU receives a debit account designation from the CS if more than one possible debit account is present, the LPU at function 211 sends a command to the CS to enable the cash withdrawal amount selector keys and to display "SELECT AMOUNT". In response the CS enables the amount selector keys and displays "SELECT AMOUNT" to instruct the customer to choose from among the amount selector keys the amount of money he wants to withdraw, as indicated by CS function 212.

The customer depresses one of the amount selector keys to indicate the amount of cash he wants to withdraw, as represented by customer function 213. The CS determines at function 214 whether or not the customer has selected a cash withdrawal amount. Upon selection of an amount by the customer, the CS at function 215 sends the cash withdrawal amount to the LPU.

With reference to FIG. 6, selection controller 536 processes the transaction selection which the CS sends to the LPU upon depression of one of transaction selector keys 533 as earlier described. In response selection controller 536 decodes the transaction selection and transmits the transaction selection to transaction file 327 over data line 546.

If the customer has selected cash withdrawal transaction, selection controller 536 sends a pulse via line 537 to AND gate 538. AND gate 538 also receives a pulse on line 480, when the LPU is in the on-line mode, so that AND gate 538 is enabled and sends a pulse to OR gate 539 via line 540. In response OR gate 539 sends a pulse to multiple debit account check 541.

A structure for multiple debit account check 541 is provided in the copending Slater et al. patent application. The account descriptions from the reply message in registers $422_n$ are input to multiple debit account check 541 over data line 524. The transaction selection from transaction selector keys 533 which the CS transmitted to the LPU is input to multiple debit account check 541 over data line 542. On the basis of the type of debit account, such as a savings account, which is called for by the particular cash withdrawal transaction and the account types which are contained in the account descriptions, multiple debit account check 541 determines whether or not more than one account which the CPU sent in the reply message could serve as the debit account.

If multiple debit account check 541 determines the presence of more than one possible debit account, multiple debit account check 541 sends a pulse via line 543 to terminal "29" of CS command encoder 317. Consequently, CS command encoder 317 sends a "29", or "enable keyboard and display 'ENTER "FROM" ACCOUNT'", command to the CS over CS data bus 318.

CS command decoder 319 at the CS receives the "29" command. In response CS command decoder 319 sends a pulse via line 544 to OR gate 445. This pulse initiates a previously described process to enable keyboard 447 so that the customer can enter a designation for a particular debit account. The pulse on line 544 also activates "ENTER 'FROM' ACCOUNT" lamp 545 in display 449 to instruct the customer to enter a debit account designation.

When multiple debit account check 541 determines that more than one account could serve as the debit account, a pulse on line 543 causes OR gate 548 to send a pulse via line 549 to enable designator 547. When the customer enters a designation by means of keyboard 447, the CS sends the designation over data line 451, CS data bus 318, and data line 462 to designator 547. Consequently, designator 547 sends the customer-entered designation to transaction file 327 over data line 550. Designator 547 also sends a pulse via line 551 to OR gate 592.

If multiple debit account check 541 does not detect more than one possible debit account, multiple debit account check 541 sends a pulse via line 553 to OR gate 592.

In response to the pulse on line 551 or the pulse on line 553, which depends upon whether multiple debit accounts are or are not present, OR gate 592 sends a pulse to AND gate 593. AND gate 593 also receives a pulse on line 537, when the transaction is a cash withdrawal, so that AND gate 593 is enabled and sends a pulse to OR gate 552. In response OR gate 552 sends a pulse to terminal "$\phi$7" of CS command encoder 317. Consequently, CS command encoder 317 sends a "$\phi$7", or "enable amount selector keys and display 'SELECT AMOUNT'", command to the CS over CS data bus 318.

CS command decoder 319 at the CS receives the "$\phi$7" command. In response CS command decoder 319 sends a pulse via line 554 to amount selector keys 555. This pulse enables amount selector keys 555 so that the customer can select the amount of his cash withdrawal. The pulse on line 554 also activates "SELECT AMOUNT" lamp 556 in display 449 to instruct the customer to select a cash withdrawal amount. When the customer depresses one of amount selector keys 555, the CS transmits the cash withdrawal amount over data line 557 and CS data bus 318 to the LPU.

Figure 5E:
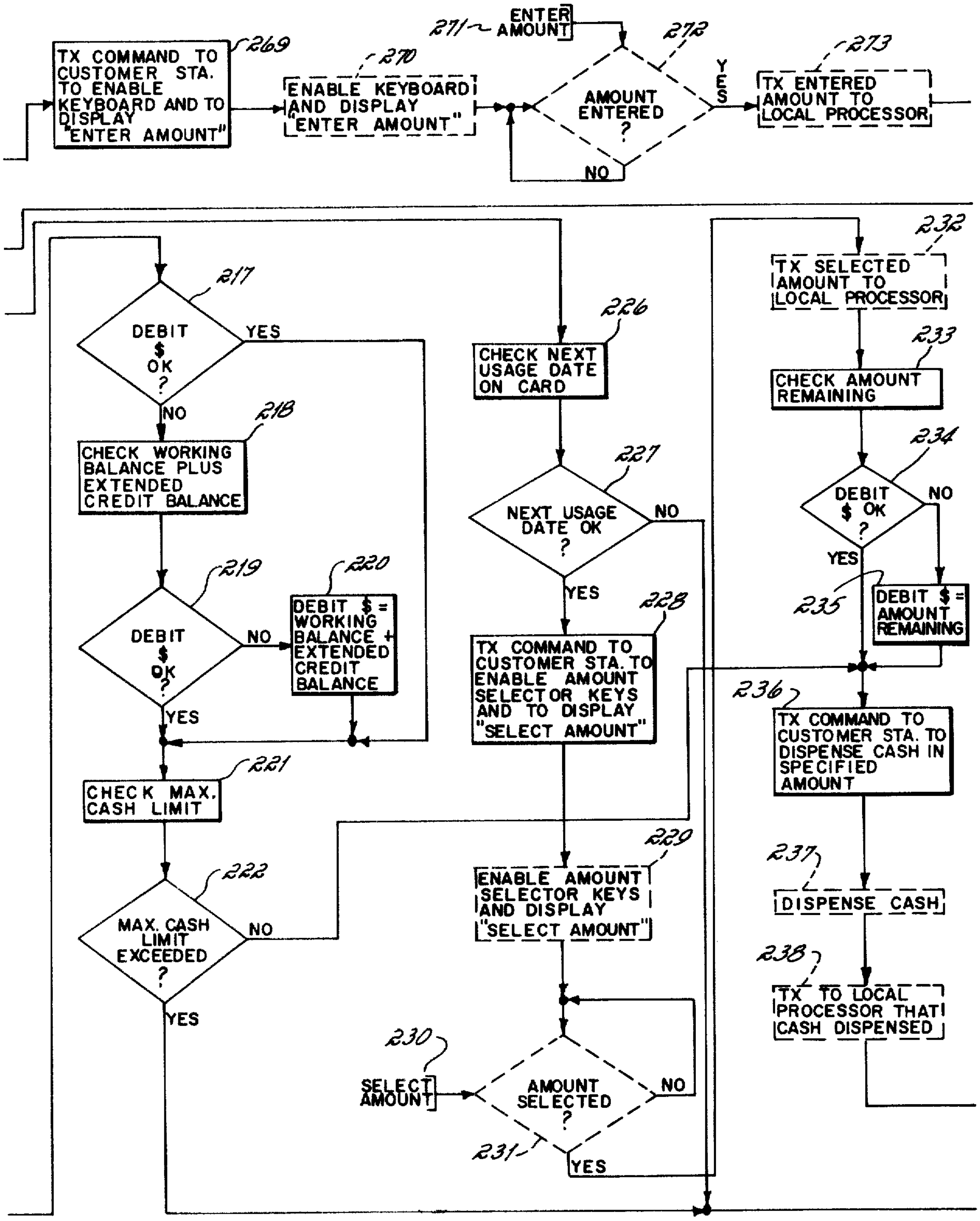

Referring again to FIG. 5D, the LPU at function 216 compares the cash withdrawal amount, which the customer selects by means of the amount selector keys, and the working balance for the debit account which the CPU sent in the reply message. With reference to FIG. 5E, the LPU determines whether or not the customer-selected amount exceeds the working balance for the debit account, as indicated by LPU function 217.

If the customer-selected amount exceeds the working balance for the debit account, the LPU at function 218 compares the customer-selected amount to the sum of a) the working balance for the debit account plus b) the extended credit balance. The LPU then determines at function 219 whether or not the customer-selected amount exceeds the sum of the debit account working balance and the extended credit balance.

If the customer-selected amount exceeds even the sum of the extended credit balance and the working balance for the debit account, the LPU at function 220 changes the customer-selected amount to the sum of the debit account working balance and the extended credit balance.

The LPU next adds a) the arrived at cash withdrawal amount, which is the lesser of 1) the amount which the customer originally selected by means of the amount selector keys and 2) the sum of the working balance for the debit account and the extended credit balance as previously determined, and b) any previous cash withdrawals which the customer has performed since he inserted his card. The LPU at function 221 compares the total to the maximum cash limit which the CPU sent to the LPU in the reply message.

If the LPU determines at function 222 that the total cash withdrawals would not exceed the maximum cash limit, the LPU permits the cash withdrawal in the arrived at amount and initiates a cash dispensation sequence which will be described in detail later.

Figure 5F:
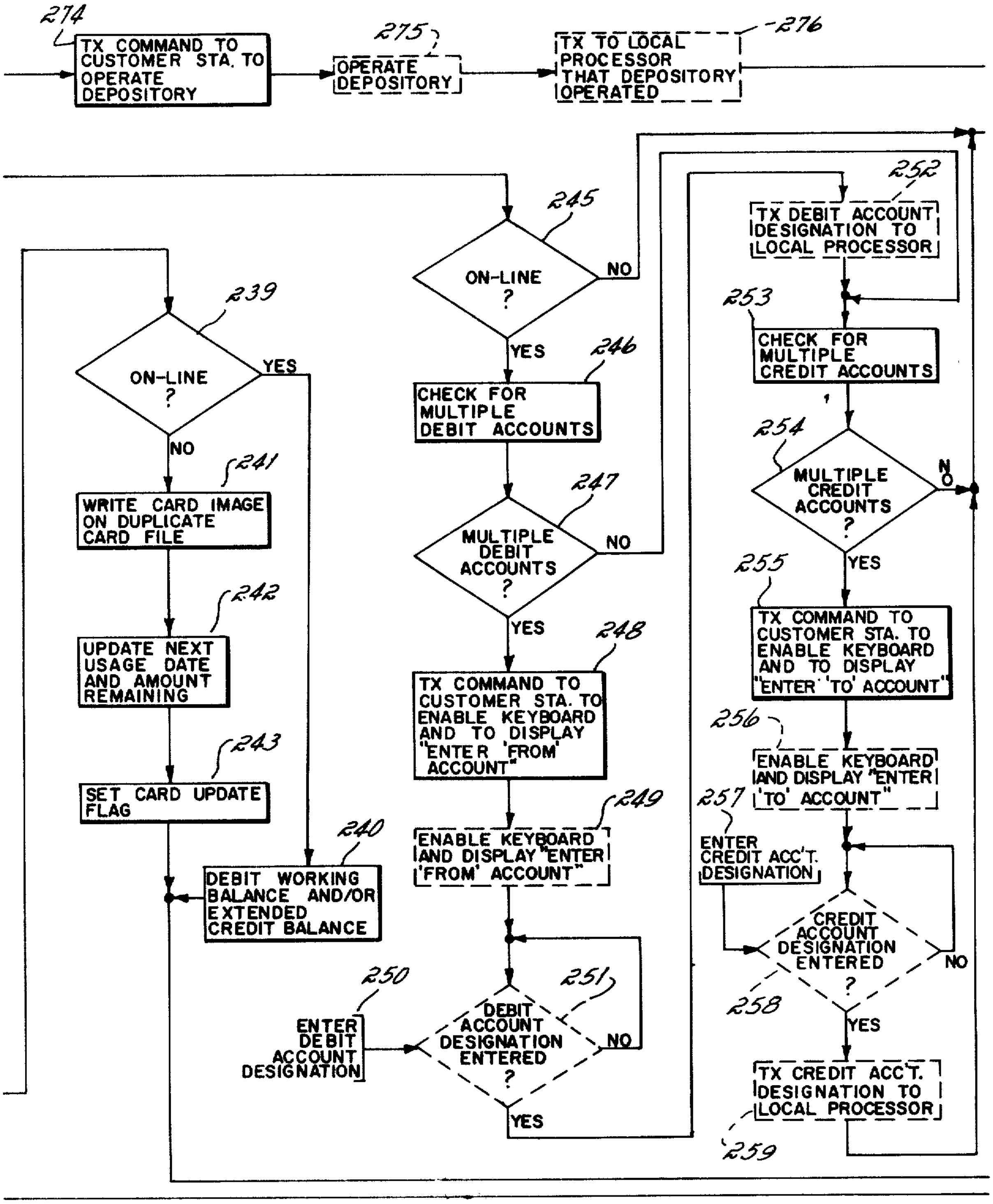
Figure 5G:
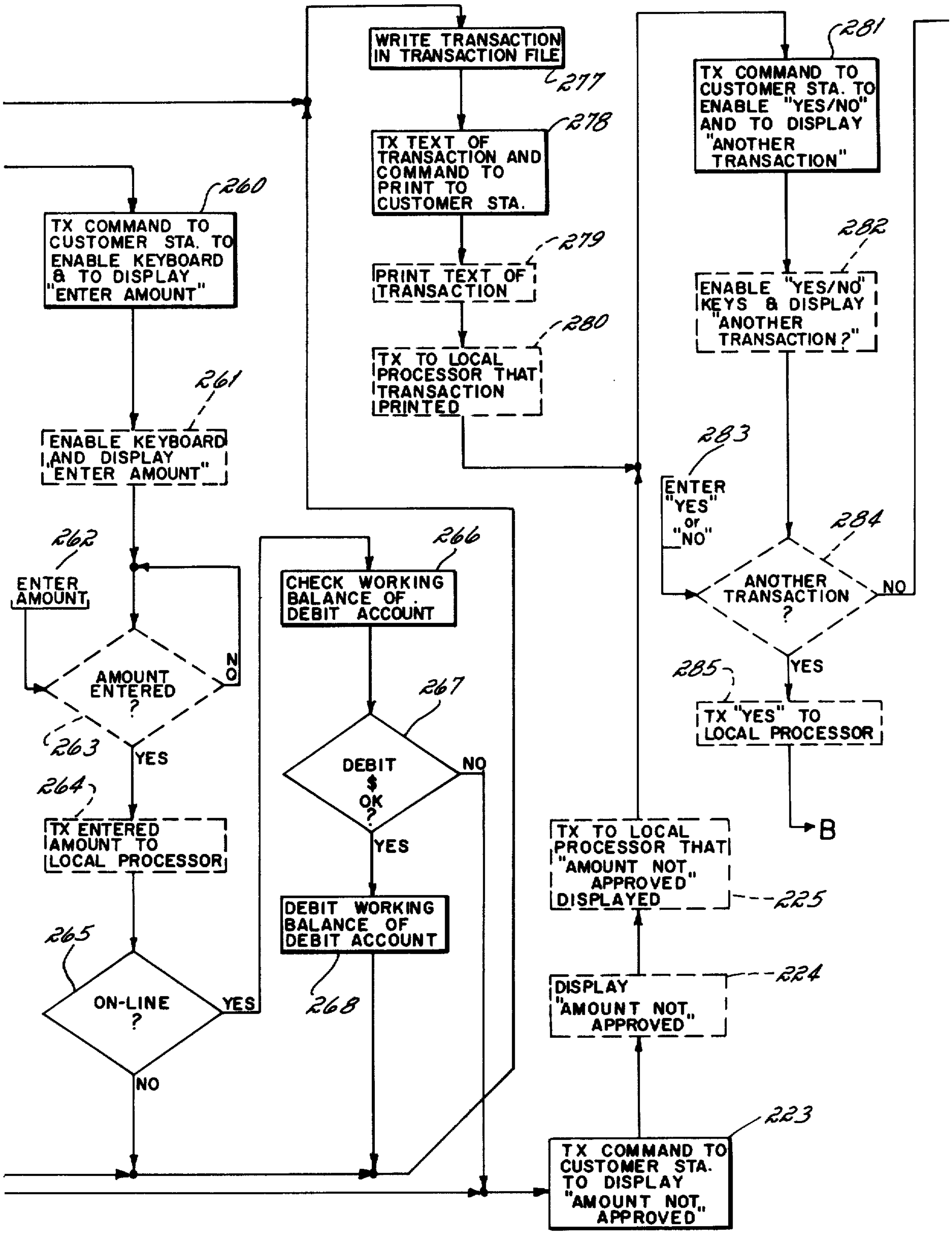

If the LPU determines at function 222 that the total cash withdrawals would exceed the maximum cash limit, the LPU sends a command to the CS to display "AMOUNT NOT APPROVED", as indicated by LPU function 223 in FIG. 5G. In response the CS displays "AMOUNT NOT APPROVED" as indicated by CS function 224. The CS at function 225 sends a response to the LPU to indicate that "AMOUNT NOT APPROVED" was displayed in order to notify the customer that the cash withdrawal has been denied.

With reference to FIG. 6, cash withdrawal processor 558, which is enabled by a pulse from selection controller 536 via line 537 in the case of a cash withdrawal, is provided to process cash withdrawal transactions. A structure for cash withdrawal processor 558 appears in the copending Slater et al. patent application.

Cash withdrawal processor 558 receives the cash withdrawal amount, which the customer selected by means of amount selector keys 555, over data line 559. When the LPU is in the on-line mode, cash withdrawal processor 558 receives a pulse on line 480. The working balance for the debit account in register $424_n$ is input to cash withdrawal processor 558 over data line 560. The extended credit balance in register 425 is input to cash withdrawal processor 558 over data line 561. The maximum cash limit in register 426 is input to cash withdrawal processor 558 over data line 562.

Cash withdrawal processor 558 processes the on-line cash withdrawal transaction in accordance with the LPU functions which were discussed in connection with FIG. 5. If the cash withdrawal is deemed permissible in accordance with the sequence of functions which is outlined in FIGS. 5D–5E, cash withdrawal processor 558 sends a pulse via line 563 to terminal "1$\phi$" of CS command encoder 317 to initiate a cash dispensation sequence which will be described in detail later. If the cash withdrawal is deemed impermissible, cash withdrawal processor 558 sends a pulse via line 564 to OR gate 565.

In response OR gate 565 sends a pulse to terminal "$\phi$8" of CS command encoder 317 via line 566. Consequently, CS command encoder 317 sends a "$\phi$8" or "display 'AMOUNT NOT APPROVED'", command to the CS over CS data bus 318.

CS command decoder 319 at the CS receives the "$\phi$8" command. In response CS command decoder 319 sends a pulse via line 567 to activate "AMOUNT NOT APPROVED" lamp 568 in display 449. Upon activation, "AMOUNT NOT APPROVED" lamp 568 sends a pulse via line 569 to response encoder 356. Response encoder 356 sends a response, which indicates "AMOUNT NOT APPROVED" has been displayed, over CS data bus 318 to response decoder 358, which consequently sends a control pulse to sequencer 314 via line 357.

CASH WITHDRAWAL (OFF-LINE)

Referring again to FIG. 5D, if the LPU determines at function 202 that the customer has selected a cash withdrawal, but determines that it is in the off-line mode rather than the on-line mode at function 203, the LPU initiates an off-line cash withdrawal transaction sequence.

With reference to FIG. 5E, the LPU compares the next usage date, which the CS read from the inserted card, and the current date, as indicated by LPU function 226. The LPU determines at function 227 whether or not the next usage date from the card is a date in the future.

If the next usage date will occur after the current date, the LPU initiates the cash withdrawal transaction denial sequence which consists of previously described LPU and CS functions 223–225 (FIG. 5G).

If the LPU determines at function 227 that the next usage date has already occurred or is the same date as the current date, the LPU at function 228 sends a command to the CS to enable the cash withdrawal amount selector keys and to display "SELECT AMOUNT". In response the CS enables the amount selector keys and displays "SELECT AMOUNT" to instruct the customer to choose from among the amount selector keys the amount of money he wants to withdraw, as indicated by CS function 229.

The customer depresses one of the amount selector keys to specify the amount of cash he wants to withdraw, as indicated by customer function 230. The CS determines at function 231 whether or not the customer has selected a cash withdrawal amount. Upon selection of an amount by the customer, the CS sends the cash withdrawal amount to the LPU, as indicated by CS function 232.

With reference to FIG. 6, if the customer has selected a cash withdrawal transaction, selection controller 536 sends a pulse via line 537 to AND gate 570. AND gate 570 also receives a pulse on line 460, when the LPU is in the off-line mode, so that AND gate 570 sends a pulse via line 571 to enable next usage date check 572.

Next usage date check 572 compares the next usage date which the CS read from the inserted card and the current date. The next usage date from the inserted card in register 343 is input to next usage date check 572 over data line 573. The time and date in register 404 is input to next usage date check 572 over data line 406.

If the next usage date from the card is a later date than the current date, next usage date check 572 sends a pulse via line 574 to OR gate 565. This pulse initiates the process previously described which displays "AMOUNT NOT APPROVED" and notifies the customer that an off-line cash withdrawal has been denied.

If, on the other hand, the next usage date from the card has occurred earlier or is the same date as the current date, next usage date check 572 sends a pulse via line 575 to OR gate 552. This pulse initiates the previously described process which enables amount selector keys 555 and displays "SELECT AMOUNT". When the customer depresses one of amount selector keys 555, the CS sends the cash withdrawal over data line 557 and CS data bus 318 to the LPU.

Returning to FIG. 5E, if the LPU did not deny the off-line cash withdrawal transaction as a result of the next usage date check, the LPU at function 233 compares the cash withdrawal amount which the customer has selected by means of the amount selector keys to the amount remaining which the CS read from the inserted card. The LPU determines at function 234 whether or not the customer-selected amount exceeds the amount remaining. If the customer-selected amount exceeds the amount remaining, the LPU changes the customer-selected amount to the amount which the CS read from the amount remaining field on the inserted card, as indicated by LPU function 235.

With reference to FIG. 6, cash withdrawal processor 558 receives the cash withdrawal amount, which the customer selected by means of amount selector keys 555, over data line 559. When the LPU is in the off-line mode, cash withdrawal processor 558 receives a pulse on line 460. The amount remaining is input to cash withdrawal processor 558 over data line 576.

Cash withdrawal processor 558 processes the off-line cash withdrawal transaction in accordance with the sequence of functions which is outlined in FIG. 5E. Cash withdrawal processor 558 sends a pulse via line 563 to terminal "1$\phi$" of CS command encoder 317 to initiate a cash dispensation sequence which is described in detail immediately below.

CASH DISPENSATION

The LPU determines whether or not the CS dispenses cash to the customer in an on-line or an off-line cash withdrawal transaction and, in addition to permissibility, supervises the amount vis-a-vis the customer-selected amount of the cash withdrawal.

Referring to FIG. 5E, if the LPU determines that the customer is entitled to a cash withdrawal in an arrived at amount, the LPU at function 236 sends a command to the CS to dispense cash to the customer in a specified amount. In response to the CS dispenses the specified amount of cash to the customer, as indicated by CS function 237. The CS at function 238 transmits a response to the LPU upon execution of the cash dispensation command.

Returning to FIG. 6, as mentioned earlier, cash withdrawal processor 558 sends a pulse via line 563 to terminal "1$\phi$" of CS command encoder 317 if either an on-line or an off-line cash withdrawal transaction is deemed permissible. Consequently, CS command encoder 317 sends a "1$\phi$", or "dispense cash", command to the CS over CS data bus 318.

CS command decoder 319 at the CS receives the "1$\phi$" command. In response CS command decoder 319 sends a pulse via line 577 to cash dispenser 578, which causes cash dispenser 578 to dispense currency. After dispensation of the currency, cash dispenser 578 sends a pulse via line 579 to response encoder 356. Response encoder 356 transmits a response, which indicates that currency has been dispensed, over CS data bus 318 to response decoder 358. Response decoder 358 consequently sends a control pulse to sequencer 314 via line 357.

Referring to FIG. 5F, the LPU at function 239 determines whether the cash withdrawal occurred while the LPU was in the on-line mode or the off-line mode. If the LPU determines that it has processed an on-line cash withdrawal, the LPU at function 240 first debits the working balance for the debit account. In addition the LPU debits the extended credit balance at function 240 if the LPU used the extended credit balance during the on-line cash withdrawal because the customer-selected amount exceeded the working balance for the debit account. The extended credit balance is debited by the amount which the arrived at cash withdrawal amount exceeds the working balance for the debit account.

If the LPU determines at function 239 that it has processed an off-line cash withdrawal, the LPU at function 241 writes an image of the inserted card on the duplicate card file. At function 242 the LPU debits the amount remaining, which the CS read from the inserted card, by the arrived at cash withdrawal amount. If the amount remaining has been reduced to zero, the LPU updates the next usage date by addition of the usage interval to the next usage date which the CS read from the inserted card and updates the amount remaining to the credit limit as indicated by LPU function 242. In the case of an off-line cash withdrawal, the LPU at function 243 sets the card update flag.

Referring to FIG. 6, in the case of an on-line cash withdrawal transaction, cash withdrawal processor 558 reduces the working balance for the debit account and also the extended credit balance, if the arrived at cash withdrawal amount exceeds the working balance for the debit account. Cash withdrawal processor 558 sends the updated working balance over data line 580 to working balance register $424_n$. If the extended credit balance was involved in the on-line cash withdrawal transaction, cash withdrawal processor 558 sends the updated extended credit balance over data line 581 to extended credit balance register 425.

In the case of an off-line cash withdrawal, cash withdrawal processor 558 debits the amount remaining by the arrived at cash withdrawal amount. Cash withdrawal processor 558 sends the updated amount remaining over data line 584 to amount remaining register 342. If, however, the amount remaining is reduced to zero by the cash withdrawal, cash withdrawal processor 558 adds a) the usage interval in register 344, which is input to cash withdrawal processor 558 over data line 582, and b) the next usage date in register 343, which is input to cash withdrawal processor 558 over data line 573. Cash withdrawal processor 558 sends the updated next usage date over data line 583 to next usage register 343. In this case, cash withdrawal processor 558 also updates the amount remaining by sending the credit limit, which is input from register 339 to cash withdrawal processor 558 over data line 398, to amount remaining register 342 over data line 584.

In the case of an off-line cash withdrawal, cash withdrawal processor 558 further sends a pulse via line 585 to OR gate 390. Consequently, OR gate 390 sends a pulse to set update flip-flop 391. Furthermore, an image of the inserted card is input to buffer register 586 over data line 360. In the case of an off-line cash withdrawal, the pulse from cash withdrawal processor 558 on line 558 causes buffer register 586 to send the image over data line 587 to duplicate card file 361.

FUND TRANSFER

Referring to FIG. 5D, if the LPU determines at function 202 that the customer has not selected a cash withdrawal transaction by means of the transaction selector keys, the LPU determines at function 244 whether or not the customer has selected a fund transfer transaction. If the LPU determines at function 244 that the customer has selected a fund transfer transaction by means of the transaction selector keys, the LPU determines at function 245 (FIG. 5F) whether it is in the on-line mode or the off-line mode.

FUND TRANSFER (ON-LINE)

Referring to FIG. 5F, if the LPU determines at function 245 that it is in the on-line mode, the LPU initiates an on-line fund transfer transaction sequence. The LPU at function 246 checks the account descriptions which the CPU sent in the reply message to determine whether or not the customer has more than one account which could serve as the debit account for the fund transfer. If the customer has several savings accounts, for example, and he has selected a savings-to-checking fund transfer transaction, the LPU must elicit an instruction from the customer with regard to which savings account is to have its funds transferred.

If the LPU determines at function 247 that more than one of the accounts which the CPU sent in the reply message could be used as the debit account, the LPU transmits a command to the CS to enable the keyboard and to display "ENTER 'FROM' ACCOUNT", as indicated by LPU function 248. In response the CS at function 249 enables the keyboard and displays "ENTER 'FROM' ACCOUNT" to instruct the customer to enter a memorized designation for the particular account which the customer wants to serve as the debit account for the fund transfer.

The customer enters the memorized designation, such as a one or two digit number, by means of the keyboard to indicate which account he wants to serve as the debit account, as indicated by customer function 250. The CS determines at function 251 whether or not the customer has entered a designation to identify the debit account. Upon entry of a designation by the customer, the CS sends the designation to the LPU, as indicated by CS function 252.

If the LPU determines at function 247 that only one account could serve as the debit account for the fund transfer transaction, or after the LPU receives a debit account designation from the CS if more than one possible debit account is present, the LPU at function 253 checks the account descriptions which the CPU sent in the reply message to determine whether or not the customer has more than one account which could be the credit account for the fund transfer. If the customer has several checking accounts, for example, and he has selected a savings-to-checking fund transfer transaction, the LPU must elicit an instruction from the customer with regard to which checking account is to receive transferred funds.

If the LPU determines at function 254 that more than one of the accounts which the CPU sent in the reply message could be the credit account, the LPU sends a command to the CS to enable the keyboard and to display "ENTER 'TO' ACCOUNT", as indicated by LPU function 255. In response the CS at function 256 enables the keyboard and displays "ENTER 'TO' ACCOUNT" to instruct the customer to enter a memorized designation for the particular account which the customer wants to be the credit account for the fund transfer.

The customer enters the memorized designation, such as a one or two digit number, by means of the keyboard to indicate which account he wants to receive transferred funds, as indicated by customer function 257. The CS determines at function 258 whether or not the customer has entered a designation to identify the account which he wants credited. Upon entry of a designation by a customer, the CS sends the designation to the LPU, as indicated by CS function 259.

If the LPU determines at function 254 that only one account could be the credit account for the fund transfer transaction, or after the LPU receives a credit account designation from the CS if more than one possible credit account is present, the LPU at function 260 in FIG. 5G sends a command to the CS to enable the keyboard and to display "ENTER AMOUNT". In response the CS at function 261 enables the keyboard and displays "ENTER AMOUNT" to instruct the customer to enter the amount of funds he wants to transfer.

The customer uses the keyboard to indicate the amount of funds he wants to transfer, as indicated by customer function 262. The CS determines at function 263 whether or not the customer has entered a fund transfer amount. Upon entry of a fund transfer amount by the customer, the CS sends the fund transfer amount to the LPU, as indicated by CS function 264.

With reference to FIG. 6, selection controller 536 processes the transaction selection which the CS transmits to the LPU upon depression of one of transaction selector keys 533 as earlier described. In response selection controller 536 decodes the transaction selection and sends the transaction selection to transaction file 327 over data line 546.

If the customer has selected a fund transfer transaction, selection controller 536 sends a pulse via line 588 to AND gate 589. AND gate 589 also receives a pulse on line 480, when the LPU is in the on-line mode, so that AND gate 589 is enabled and sends a pulse to OR gate 539 via line 590. In response OR gate 539 sends a pulse to multiple debit account check 541. This pulse initiates the multiple debit account designation process which was described in detail earlier.

When multiple debit account check 541 determines that more than one account which the CPU sent in the reply message could serve as the debit account, a pulse on line 543 causes OR gate 548 to send a pulse via line 549 to enable designator 547. As previously described, designator 547 sends a customer-entered designation to transaction file 327 over data line 550. Designator 547 also sends a pulse via line 551 to OR gate 591.

If multiple debit account check 541 does not detect more than one possible debit account, multiple debit account check 541 sends a pulse via line 553 to OR gate 591.

In response to the pulse on line 551 or the pulse on line 553, which depends on whether multiple debit accounts are or are not present, OR gate 591 sends a pulse to AND gate 594. AND gate 594 also receives a pulse on line 590, when the transaction is an on-line fund transfer, so that AND gate 594 is enabled and sends a pulse to multiple credit account check 595.

A structure for multiple credit account check 595 is provided in the copending Slater et al. patent application. The account descriptions from the reply message in registers $422_n$ are input to multiple credit account check 595 over data line 524. The transaction selection from transaction selector keys 533 which the CS sent to the LPU is input to multiple credit account check 595 over data line 542.

If multiple credit account check 595 determines the presence of more than one possible credit account, multiple credit account check 595 sends a pulse via line 596 to terminal "3φ" of CS command encoder 317. Consequently, CS command encoder 317 sends a "3φ", or "enable keyboard and display 'ENTER "TO" ACCOUNT'", command to the CS over CS data bus 318.

CS command decoder 319 at the CS receives the "3φ" command. In response CS command decoder 319 sends a pulse via line 597 to OR gate 445. This pulse initiates a previously described process which enables keyboard 447 so that the customer can enter a designation for a particular credit account. The pulse on line 597 also activates "ENTER 'TO' ACCOUNT" lamp 598 in display 449 to instruct the customer to enter a credit account designation.

When multiple credit account check 595 determines that more than one account could be the credit account, a pulse on line 596 causes OR gate 548 to send a pulse via line 549 to enable designator 547. When the customer enters a designation by means of keyboard 447, the CS sends the designation over data line 451, CS data bus 318, and data line 462 to designator 547. Consequently, designator 547 transmits the customer-entered designation to transaction file 327 over data line 550.

Designator 547 also sends a pulse via line 551 to AND gate 599. Flip-flop 600 is reset by a pulse on line 543 from multiple debit account check 541 when multiple possible debit accounts are present. Flip-flop 600 is set by a pulse on line 596 from multiple credit account check 595 when multiple possible credit accounts are present. AND gate 599 receives a pulse on line 601, when flip-flop 600 is set, so that ANd gate 599 is enabled and sends a pulse to OR gate 602, when multiple possible credit accounts are present.

If multiple credit accounts check 595 does not detect more than one possible credit account, multiple credit account check 595 sends a pulse via line 603 to OR gate 602.

In response to the pulse from AND gate 599 or the pulse on line 603, OR gate 602 sends a pulse to AND gate 604. AND gate 604 also receives a pulse on line 588, when the transaction is a fund transfer, so that AND gate 604 is enabled and sends a pulse to OR gate 605.

In response OR gate 605 sends a pulse to terminal "φ6" of CS command encoder 317. Consequently, CS command encoder 317 sends a "φ6", or "enable keyboard and display 'ENTER AMOUNT'", command to the CS over CS data bus 318.

CS command decoder 319 at the CS receives the "φ6" command. In response CS command decoder 319 sends a pulse via line 606 to OR gate 445. This pulse initiates a previously described process which enables keyboard 447 so that the customer can enter the amount of the fund transfer. The pulse on line 606 also activates "ENTER AMOUNT" lamp 607 in display 449 to instruct the customer to select a fund transfer amount. After the customer enters the fund transfer amount by means of keyboard 447, the CS sends the fund transfer amount over data line 451 and CS data bus 318 to the LPU.

Referring again to FIG. 5G, the LPU at function 265 determines whether it is in the on-line mode or the off-line mode. When the LPU is in the on-line mode, the LPU compares the fund transfer amount which the customer entered by means of the keyboard and the working balance of the debit account, as represented by LPU function 266. The LPU at function 267 determines whether or not the customer-entered fund transfer amount exceeds the working balance of the account from which funds would be transferred.

If the customer-entered fund transfer amount does not exceed the working balance for the debit account, the LPU at function 268 reduces the working balance of the debit account by the amount the customer requested. If, however, the customer-entered fund transfer amount exceeds the working balance for the debit account, the LPU deems the on-line fund transfer transaction impermissible and initiates the sequence of previously described LPU and CS functions 223–225.

Referring to FIG. 6, fund transfer processor 608 is provided to process fund transfer transactions. A structure for fund transfer processor 608 appears in the copending Stater et al. patent application.

Fund transfer processor 608 receives the fund transfer amount, which the customer entered by means of keyboard 447, over data line 462. When the LPU is in the on-line mode, fund transfer processor 608 receives a pulse on line 480. The working balance for the debit account in register $424_n$ is input to fund transfer processor 608 over data line 560.

Fund transfer processor 608 processes the on-line fund transfer transaction in accordance with the LPU functions which were described in connection with FIG. 5. If the fund transfer is deemed permissible in accordance with the sequence of functions which is outlined in FIG. 5G, fund transfer processor 608 reduces the working balance for the debit account by the amount of the fund transfer. Fund transfer processor 608 then sends the updated working balance for the debit account over data line 580 to working balance register $424_n$.

If the fund transfer is deemed impermissible, fund transfer processor 608 sends a pulse via line 609 to OR gate 565. This pulse initiates the previously described process which displays "AMOUNT NOT APPROVED" to notify the customer that the fund transfer has been denied.

FUND TRANSFER (OFF-LINE)

Referring again to FIg. 5D, if the LPU determines at function 244 that the customer has selected a fund transfer, but determines that it is in the off-line mode rather than the on-line mode at function 245 (FIG. 5F), the LPU initiates an off-line fund transfer sequence.

With reference to FIG. 5G, the LPU at function 260 sends a command to the CS to enable the keyboard and to display "ENTER AMOUNT". In response the CS at function 261 enables the keyboard and displays "ENTER AMOUNT" to instruct the customer to enter the amount of funds he wants to transfer.

The customer uses the keyboard to indicate the amount of funds he wants to transfer, as indicated by customer function 262. The CS determines at function 263 whether or not the customer has entered a fund transfer amount. Upon entry of a fund transfer amount by the customer, the CS sends the fund transfer amount to the LPU, as indicated by CS function 264.

With reference to FIG. 6, selection controller 536 processes the transaction selection which the CS sends to the LPU upon depression of one of transaction selector keys 533 as earlier described. In response selection controller 536 decodes the transaction selection and sends the transaction selection to transaction file 327 over data line 546.

If the customer has selected a fund transfer transaction, selection controller 536 sends a pulse via line 588 to AND gate 610. AND gate 610 also receives a pulse on line 460, when the LPU is in the off-line mode, so that AND gate 610 is enabled and sends a pulse to OR gate 605. This pulse initiates the previously described process which enables keyboard 447 and displays "ENTER AMOUNT" to instruct the customer to enter the amount of the transfer.

After the customer enters the fund transfer amount by means of keyboard 447, the CS sends the fund transfer amount to the LPU over data line 451 and CS data bus 318. Fund transfer processor 608 receives the customer-entered fund transfer amount over data line 462. When the LPU is in the off-line mode, fund transfer processor 608 receives a pulse on line 460. Fund transfer processor 608 processes the off-line fund transfer transaction simply by sending the customer-entered fund transfer amount to transaction file 327 as will be described later.

DEPOSIT/PAYMENT (ON-LINE OR OFF-LINE)

Referring again to FIG. 5D, if the LPU determines at function 244 that the customer has not selected a fund transfer transaction, the LPU by process of elimination concludes that the customer has selected a deposit/payment transaction. Consequently, the LPU initiates a deposit/payment sequence which is the same whether the LPU is in the on-line mode or the off-line mode.

Referring to the top of FIG. 5E, the LPU at function 269 sends a command to the CS to enable the keyboard and to display "ENTER AMOUNT". In response the CS at function 270 enables the keyboard and displays "ENTER AMOUNT" to instruct the customer to enter the amount of his deposit or payment.

The customer uses the keyboard to indicate the deposit amount or payment amount, as the case may be, as indicated by customer function 271. The CS determines at function 272 whether or not the customer has entered the amount of a deposit or payment. Upon entry of a deposit/payment amount by the customer, the CS sends the deposit/payment amount to the LPU, as indicated by CS function 273.

The LPU at function 274 sends a command to the CS to operate the depository which receives the customer's deposit or payment. In response the CS at function 275 operates the depository. After the depository has been operated, the CS at function 276 sends a response to the LPU to indicate that the depository has been operated.

Referring to FIG. 6, selection controller 536 processes the transaction selection which the CS sends to the LPU upon depression of one of transaction selector keys 533 as previously described. In response selection controller 536 decodes the transaction selection and sends the transaction selection to transaction file 327 over data line 546.

If the customer has selected a deposit/payment transaction, selection controller 536 sends a pulse via line 611 to OR gate 605. This pulse initiates the previously described process which enables keyboard 447 and displays "ENTER AMOUNT" to instruct the customer to enter the amount of his deposit or payment.

The pulse on line 611 also enables deposit/payment buffer register 612. After the customer enters the deposit/payment amount by means of keyboard 447, the CS sends the deposit/payment amount over data line 451 and CS data bus 318. Deposit/payment buffer register 612 receives the customer-entered deposit/payment amount over data line 462. In response deposit/payment buffer register 612 sends the customer-entered deposit/payment to transaction file 327 as will be described shortly.

Deposit/payment buffer register 612 also sends a pulse via line 613 to terminal "14" of CS command encoder 317. Consequently, CS command encoder 317 sends a "14", or "process deposit", command to the CS over CS data bus 318.

CS command decoder 319 at the CS receives the "14" command. CS command encoder 319 sends a pulse via line 614 to depository operator 615, which causes depository operator 615 to rotate the depository and retain the customer's deposit or payment. Upon operation of the depository, depository operator 615 sends a pulse via line 616 to response encoder 356. Response encoder 356 sends a response, which indicates that the depository has been operated, over CS data bus 318 to response decoder 358, which consequently sends a control pulse to sequencer 314 via line 357.

TRANSACTION RECORDATION

Referring to FIG. 5G, the LPU at function 277, as it completes a transaction either a) a cash withdrawal, b) a fund transfer, or c) a deposit or payment transaction, stores the transaction data in a transaction file in local memory. The LPU thereafter sends the transaction data and a print command to the CS, as indicated by function 278.

In response to the print command the CS at function 279 prints the transaction data on the transaction memo, or receipt, which was printed with time and date and customer identification information at function 163 (FIG. 5C), or at function 191 (FIG. 5D) in the event that a balance inquiry transaction has taken place. The CS at function 280 sends a response to the LPU which indicates that the transaction data has been printed.

Referring to FIG. 6, it has been previously described that selection controller 536 decodes the transaction selection, which the customer chooses when he depresses a particular transaction selector key 533, and sends the transaction selection to transaction file 327 over data line 546. In the case of on-line cash withdrawal transactions where the customer must designate one of a plurality of accounts as the debit account by an entry using keyboard 447, it has been earlier described that designator 547 sends the customer-entered debit account designation over data line 550 to transaction file 327. In the case of on-line fund transfer transactions where the customer must designate one of a plurality of accounts as the debit and/or credit account(s) by means of keyboard 447, it has been previously described that designator 547 sends the customer-entered debit and/or credit account designation(s) over data line 550 to transaction file 327.

In the case of an on-line or an off-line cash withdrawal transaction, cash withdrawal processor 558 sends the arrived at cash withdrawal amount for a permissible cash withdrawal transaction to transaction file 327 over data line 616. In the case of an on-line or an off-line fund transfer transaction, a determination of permissibility having been made in the case of an on-line fund transfer transaction, fund transfer processor 608 sends the customer-entered fund transfer amount to transaction file 327 over data line 616. In the case of an on-line or an off-line deposit or payment transaction, deposit/payment buffer register 612 sends the customer-entered deposit/payment amount to transaction file 327 over data line 616.

After a transaction is completed, sequencer 314 sends a pulse to OR gate 370 via line 617. In response OR gate 370 sends a pulse to terminal "$\phi$2" of CS command encoder 317. Consequently, CS command encoder 317 sends a "$\phi$2", or "print", command to the CS over CS data bus 318.

CS command decoder 319 at the CS receives the "$\phi$2" command. CS command decoder 319 sends a pulse via line 371 to printer 372, which causes printer 372 to print the transaction data that the LPU sends to printer 372 from transaction file 327 over data line 636, CS data bus 318, and data line 618. After printer 372 prints the transaction data on the transaction memo, printer 372 sends a pulse via line 376 to response encoder 356. Response encoder 356 sends a response which indicates that the transaction data has been printed over CS data bus 318 to response decoder 358, which consequently sends a control pulse to sequencer 314 via line 357.

ADDITIONAL TRANSACTIONS

Returning to FIG. 5G, the LPU at function 281 sends a command to the CS to enable the Yes/No response keys and to display "ANOTHER TRANSACTION?". In response the CS at function 282 enables the Yes/No response keys and displays "ANOTHER TRANSACTION?" to query the customer whether or not he desires an additional transaction.

The customer indicates by depression of one of the Yes/No response keys whether or not he wants to select an additional transaction, as indicated by customer function 283. The CS determines at function 284 whether or not the customer has depressed one of the Yes/No response keys.

If the customer wants one or more additional transactions and, therefore, depresses the "Yes" response key, the CS sends the "Yes" response to the LPU, as indicated by CS function 285. The LPU in response returns to function 197 in FIG. 5D and the LPU and CS functions necessary to perform another transaction sequence are repeated.

With reference to FIG. 6, sequencer 314 sends a pulse via line 619 to OR gate 508. In response OR gate 508 sends a pulse via line 509 to terminal "$\phi$9" of CS command encoder 317. Consequently, CS command encoder 317 sends a "$\phi$9", or "enable Yes/No response keys and display 'ANOTHER TRANSACTION?'", command to the CS over CS data bus 318.

CS command decoder 319 at the CS receives the "$\phi$9" command. CS command decoder 319 sends a pulse via line 510 to OR gate 494. This pulse initiates the previously described process which enables Yes/No response keys 496 so that the customer can indicate whether or not he wants another transaction and displays "ANOTHER TRANSACTION?" to query the customer whether or not he wants an additional transaction.

If the customer depresses the "Yes" response key when he is queried whether or not he wants an additional transaction, the "Yes" response key sends a "Yes" response to the LPU over data line 498 and CS data bus 318. Yes/No response decoder 499 at the LPU receives the "Yes" response. Consequently, Yes/No response decoder 499 sends a pulse via line 501 to AND gate 620. AND gate 620 also receives a pulse from sequencer 314 via line 619, so that AND gate 620 is enabled and sends a pulse to sequencer 314. This pulse causes sequencer 314 to step so that sequencer 314 applies a pulse to line 522 and another transaction sequence is commenced.

CUSTOMER CLOSEOUT

Referring to FIG. 5, if the customer depresses the "No" response key when he is queried whether or not he wants an additional transaction a) at customer function 187 (FIG. 5D) after a balance inquiry transaction or b) at customer function 284 (FIG. 5G) after any other type of transaction, a customer closeout sequence is begun.

Figure 5H:
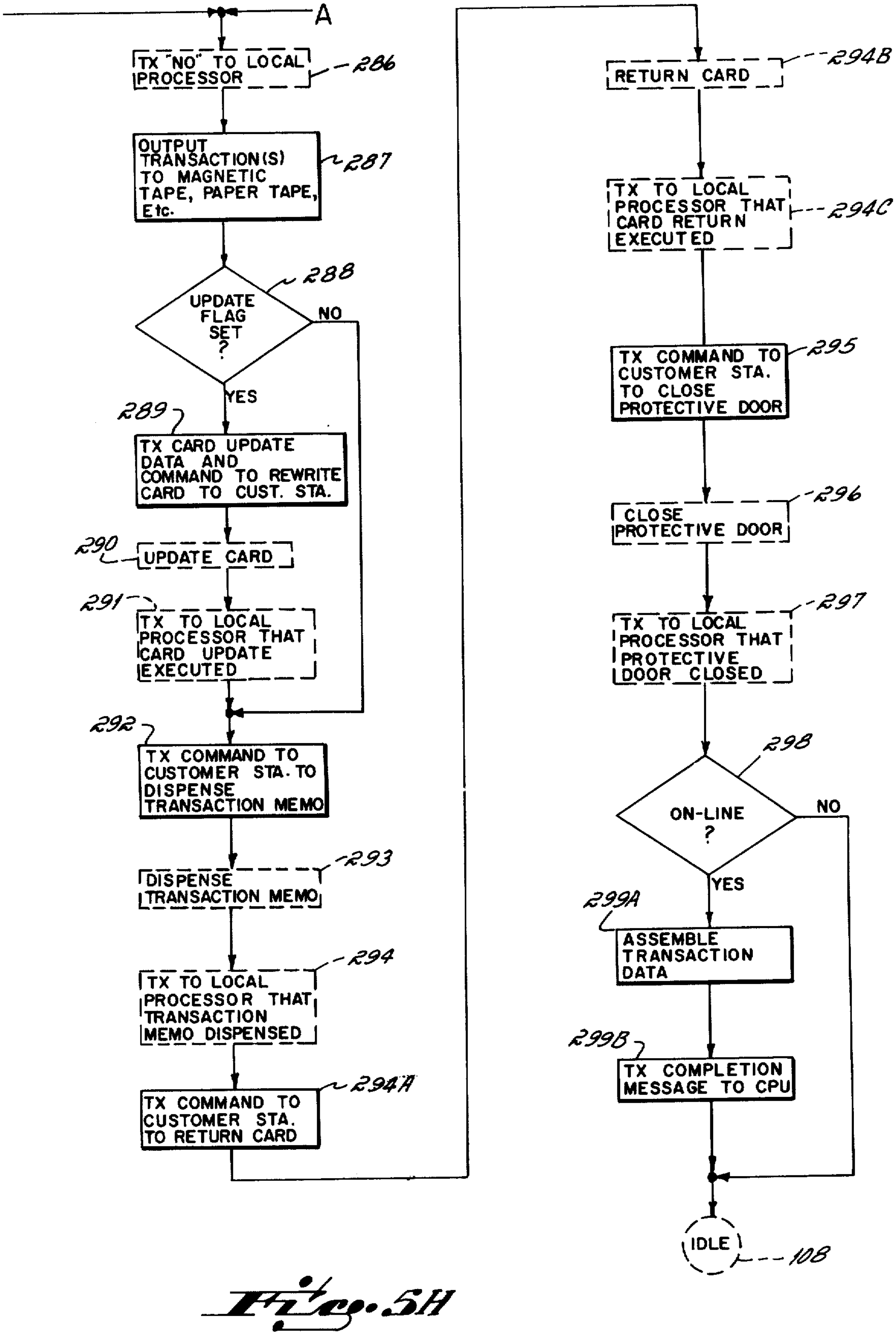
Figure 6A:
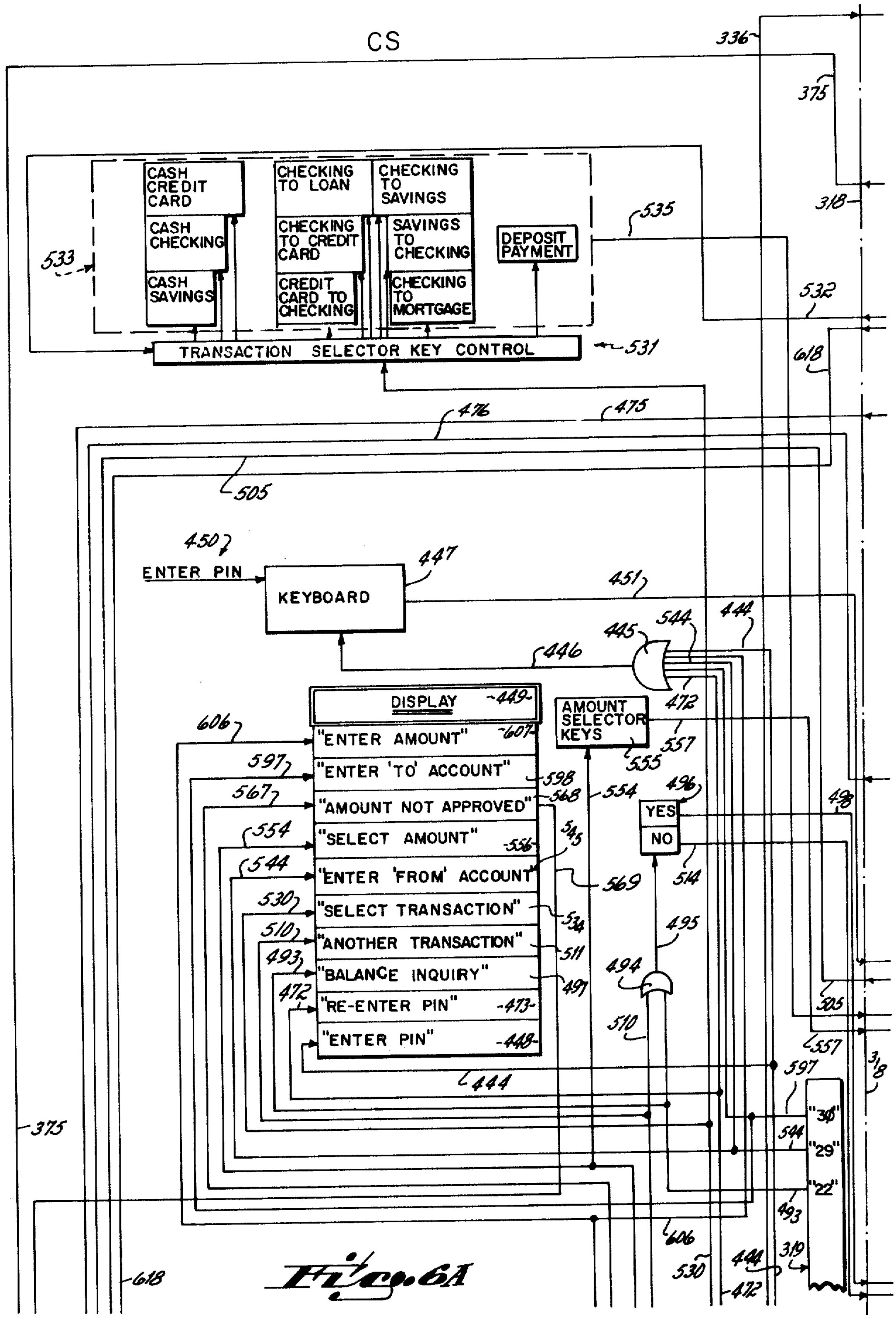
Figure 6B:
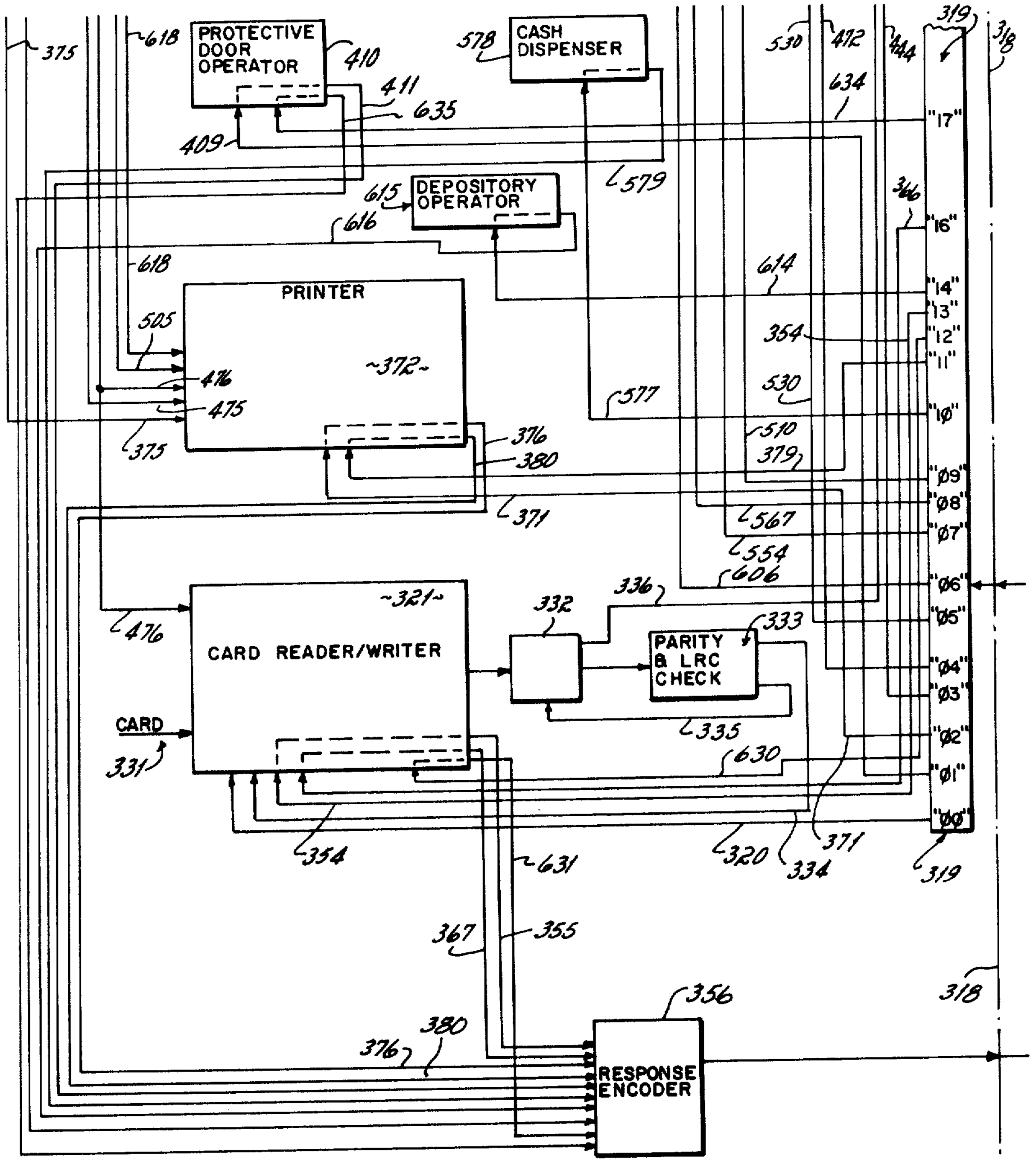
Figure 6C:
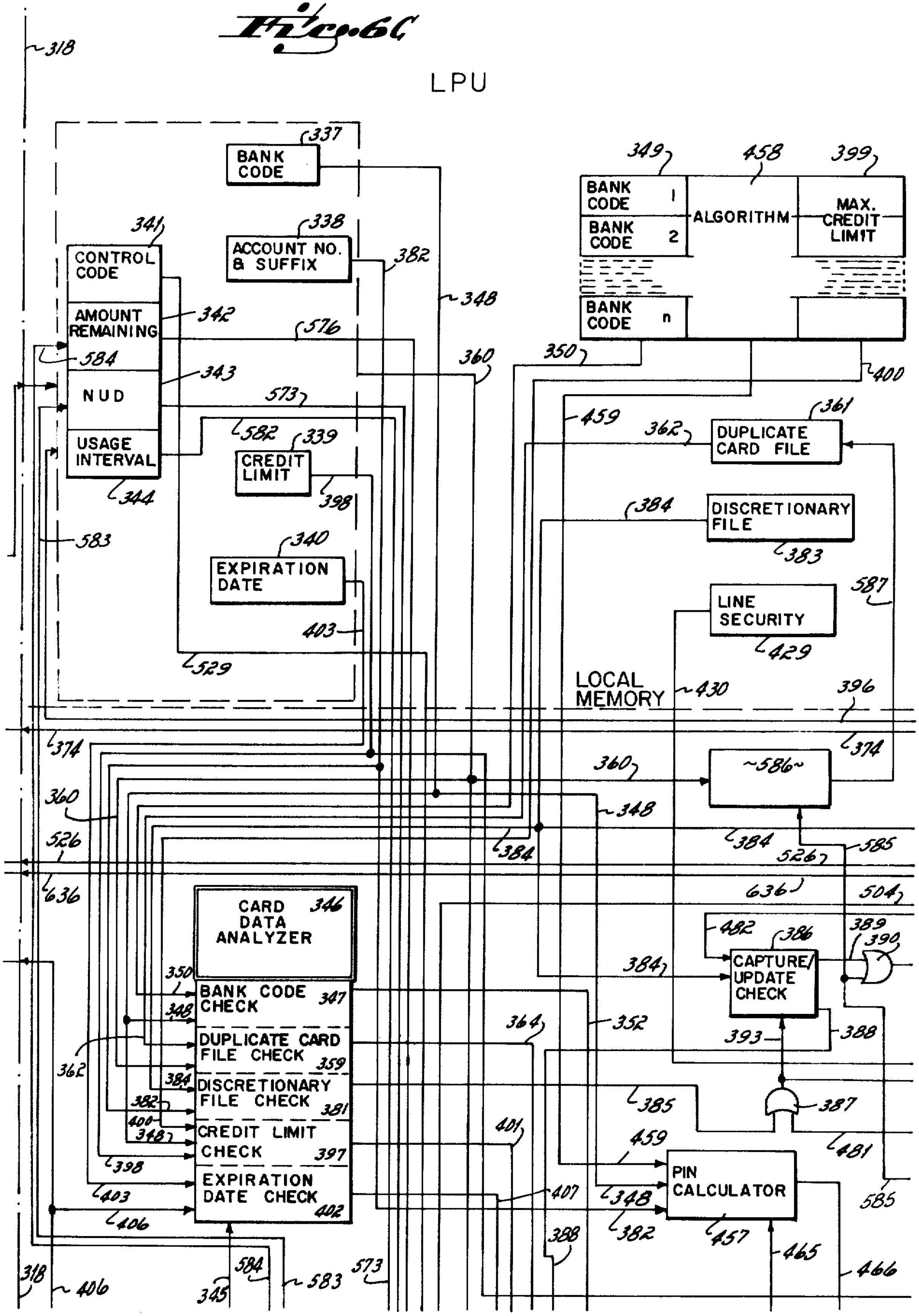
Figure 6D:
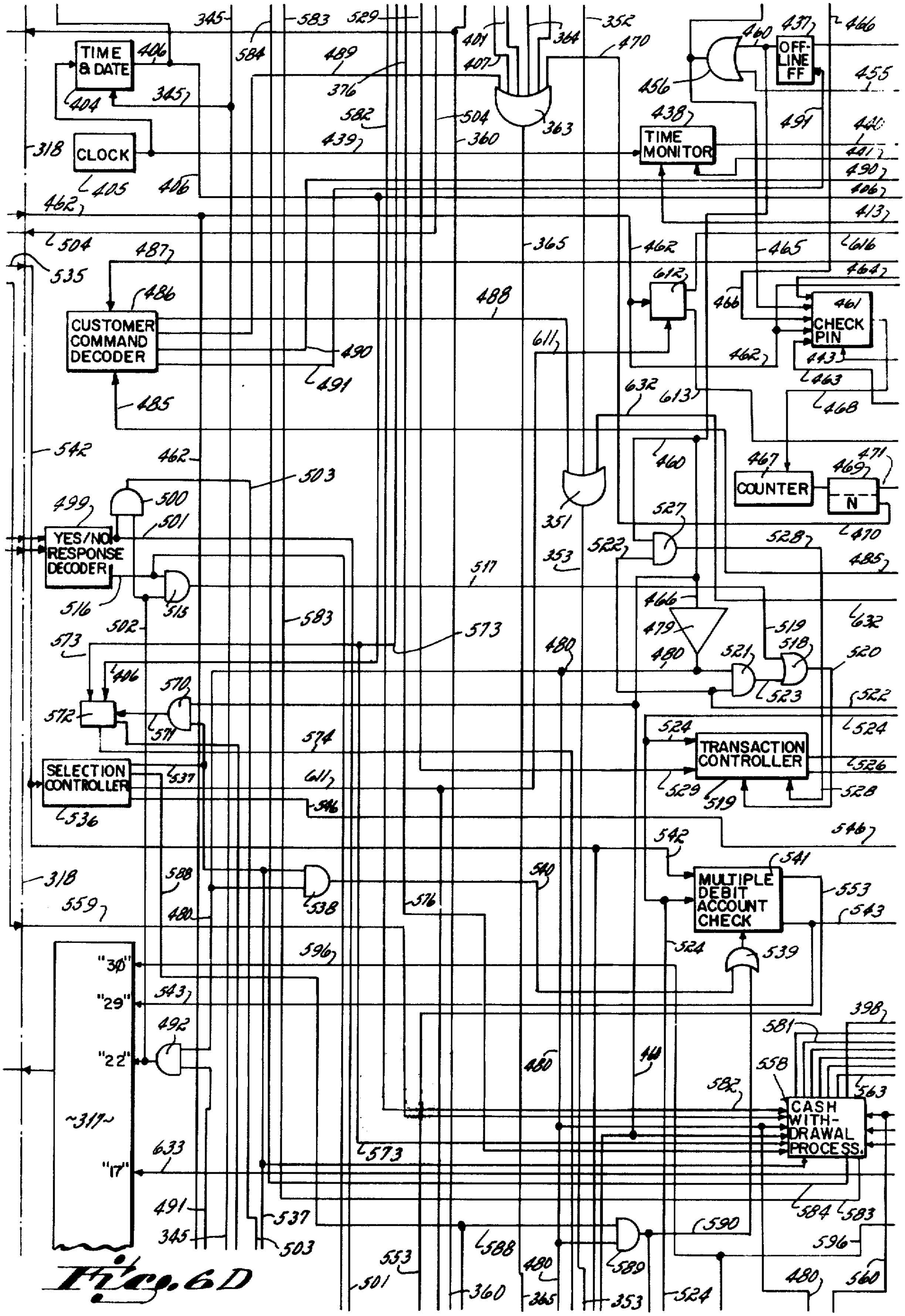
Figure 6E:
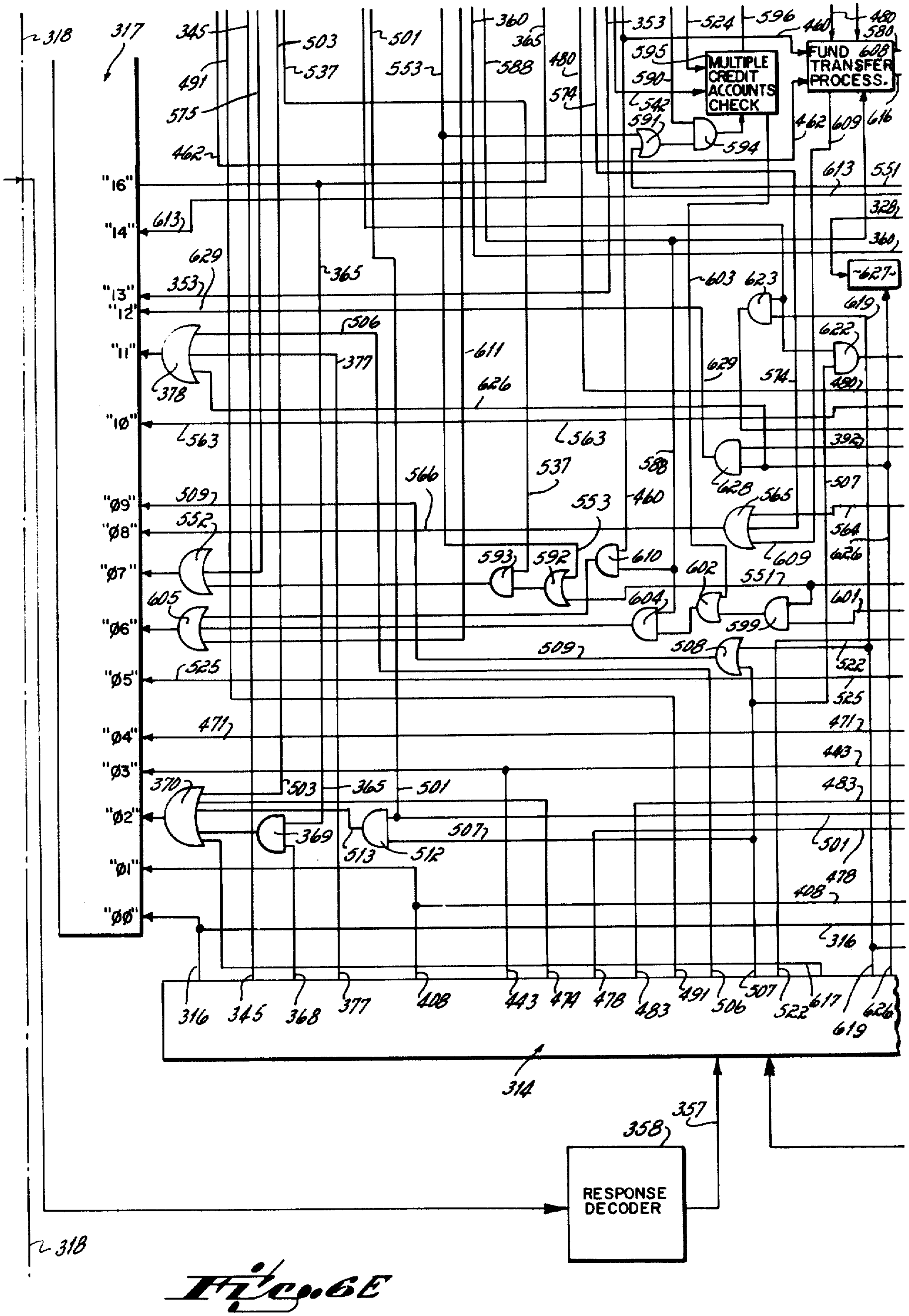
Figure 6F:
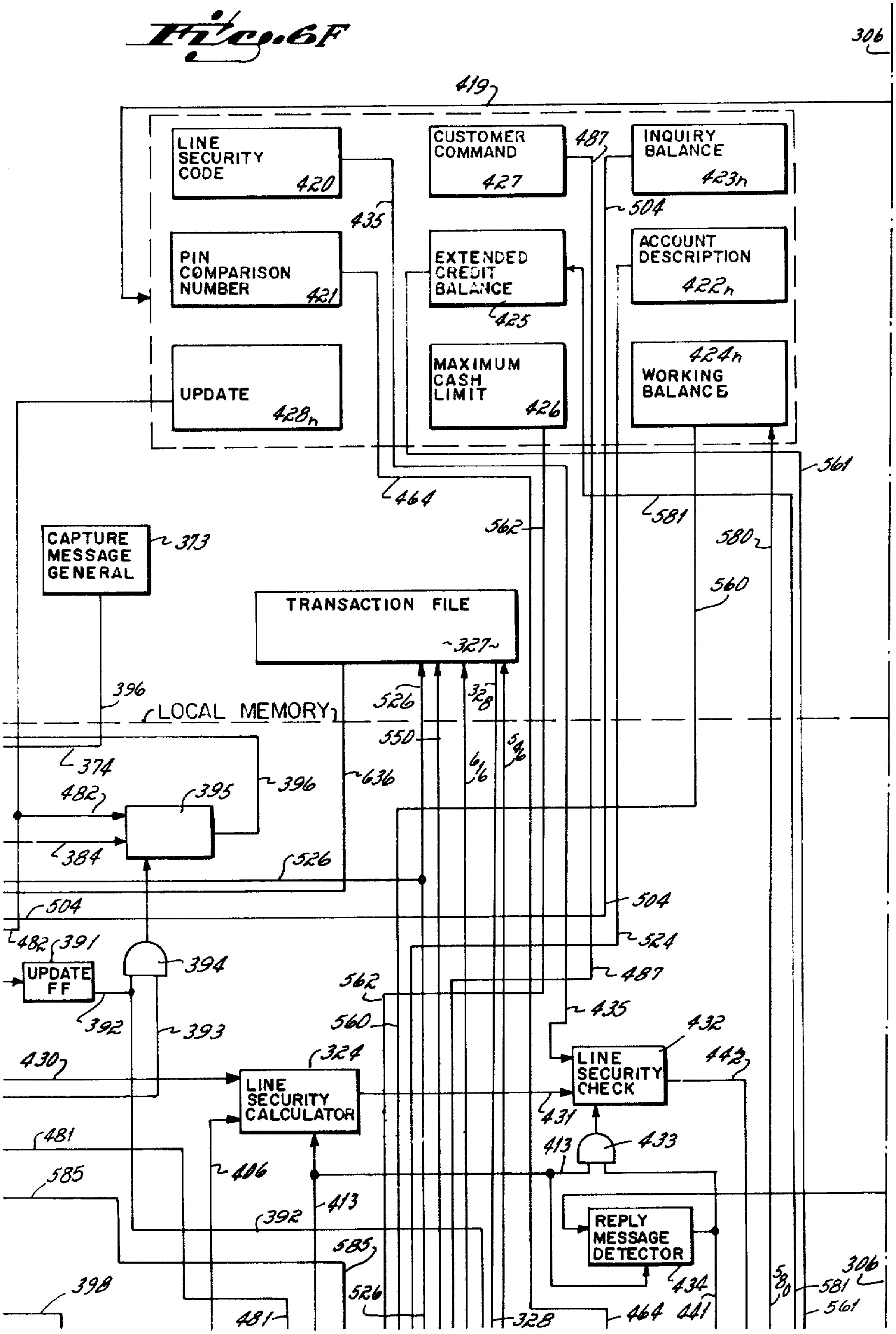
Figure 66:
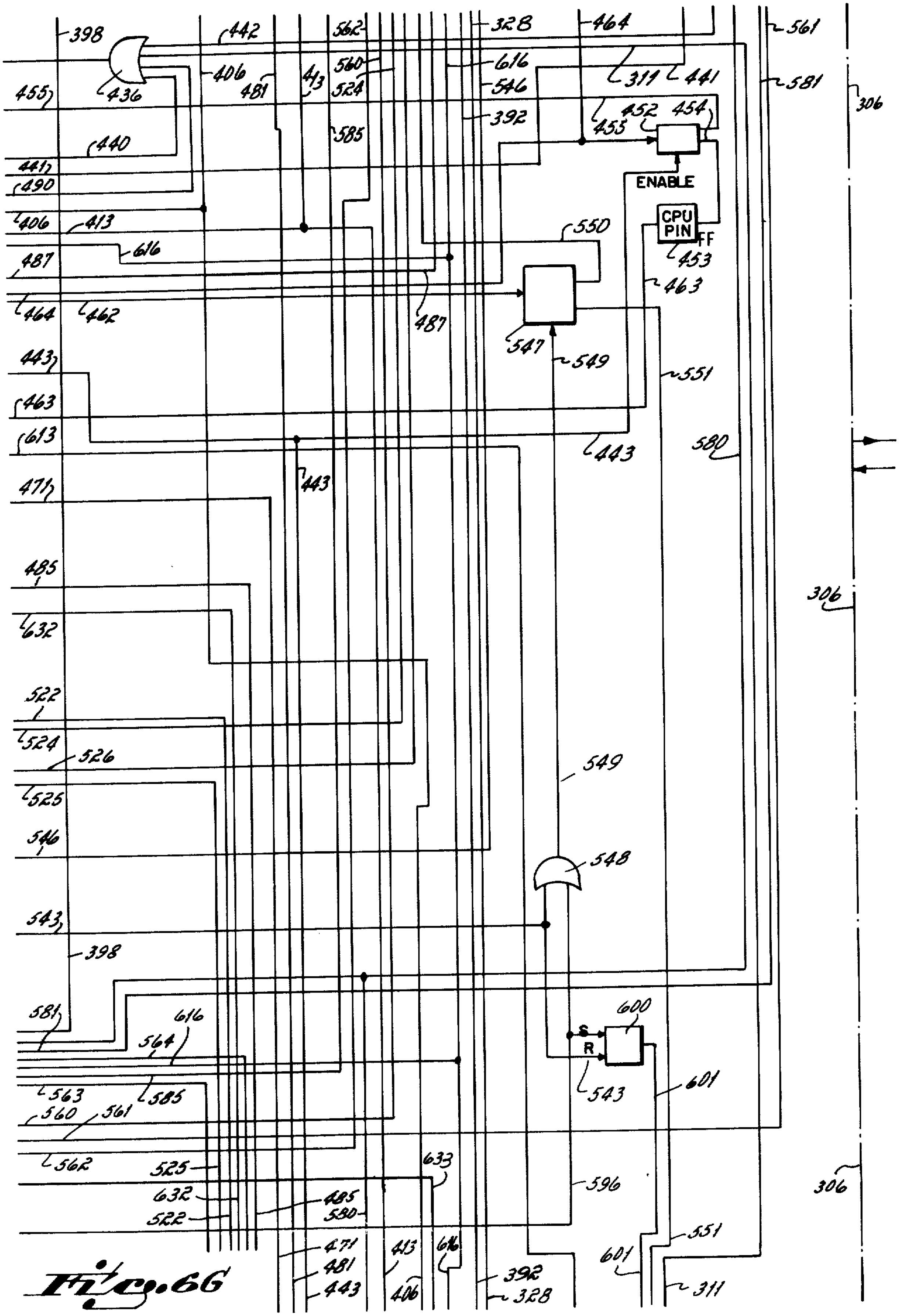
Figure 6H:
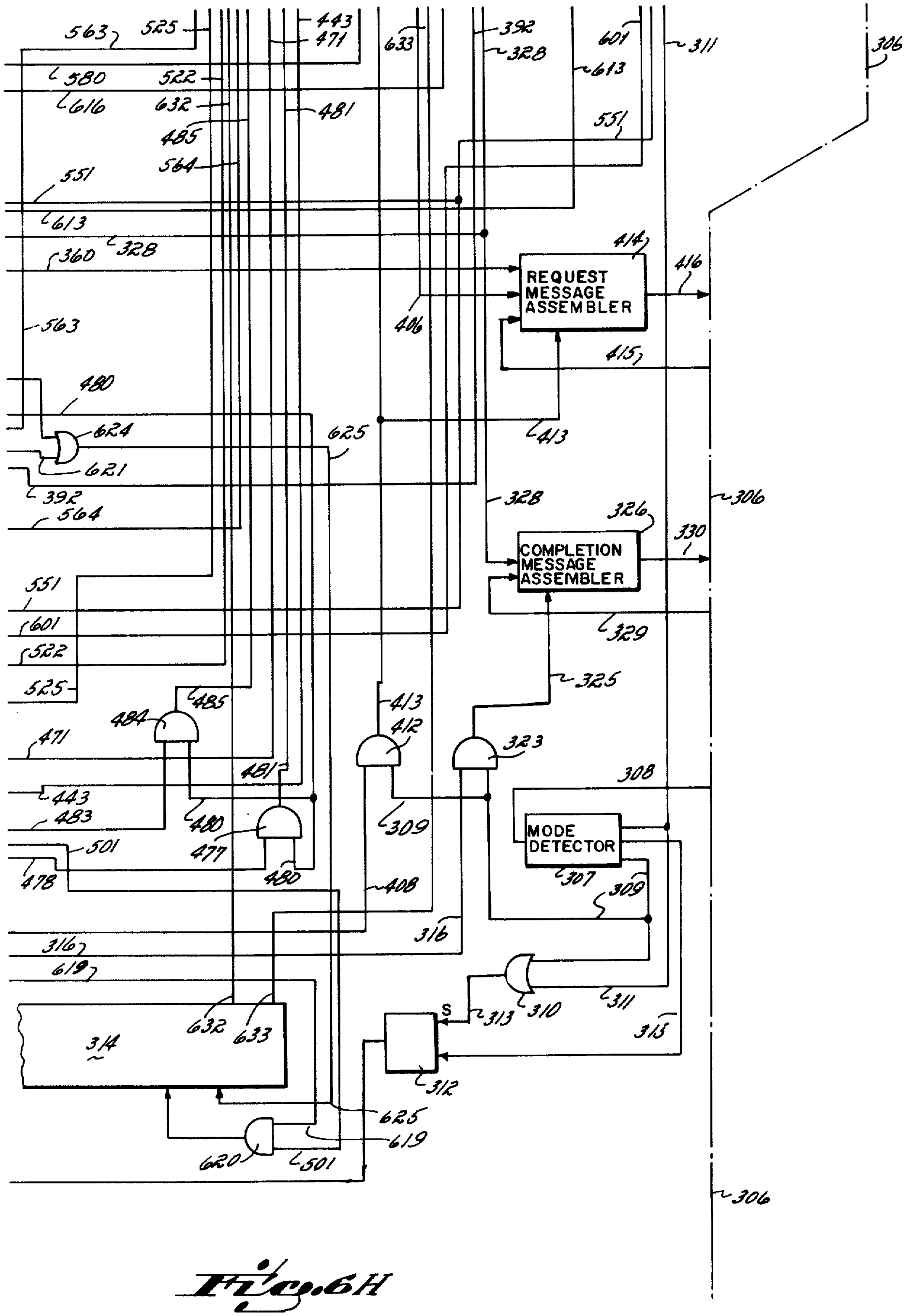
Figure 6I:
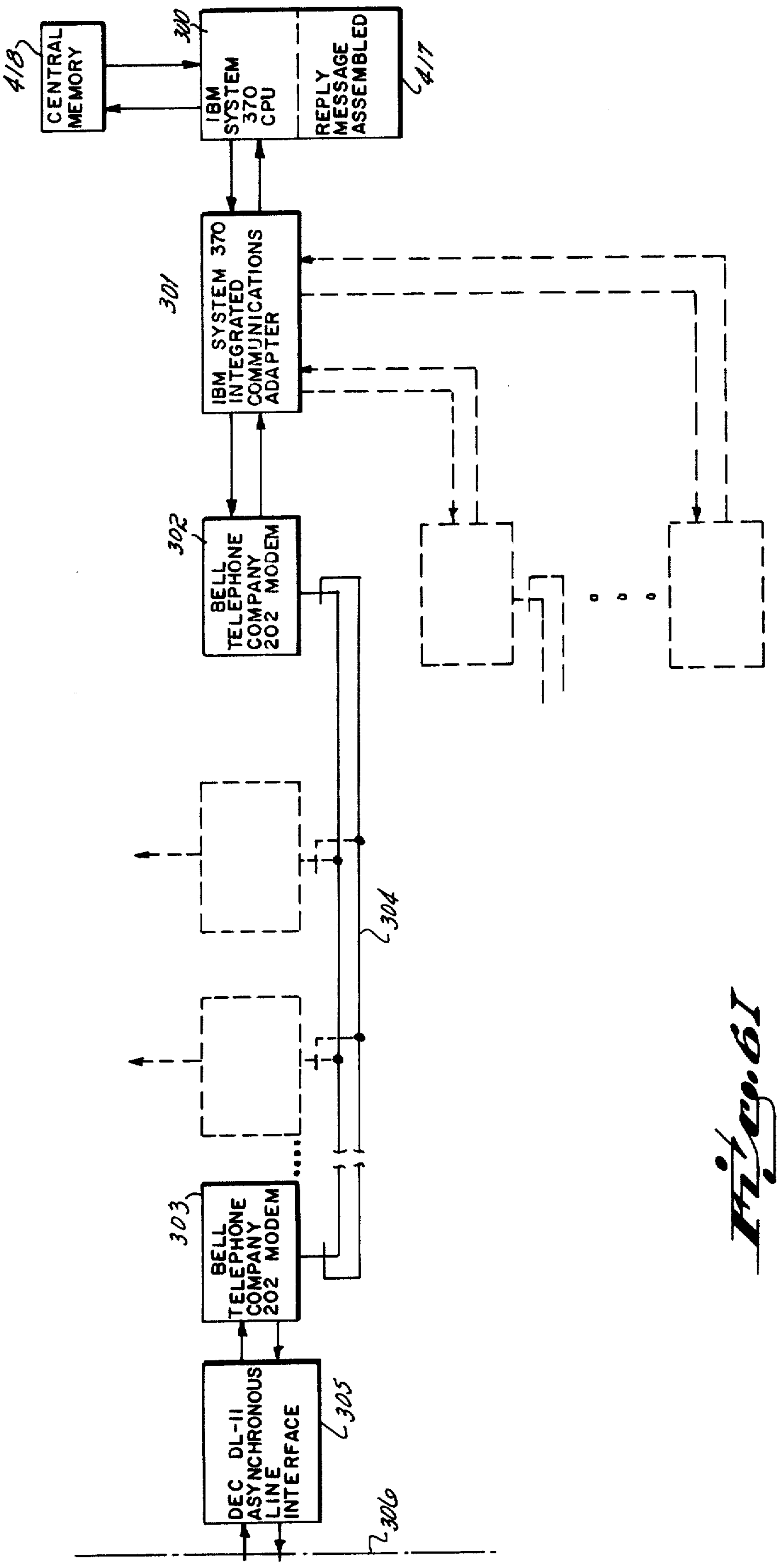

With reference to FIG. 5H, if the customer does not want another transaction and, therefore, depresses the "No" response key, the CS sends the "No" response to the LPU as indicated by CS function 286.

In response, the LPU at function 287 writes the transaction data on magnetic tape, perforates paper tape to record the transaction data, etc. so that the transaction data is stored in hard copy or machine readable form. The record which is prepared can be used at a later time for accounting verification and other bookkeeping purposes. It provides a permanent record of all transactions which customers perform at the customer stations associated with the LPU and facilitates settlement, or accounting verification, for checking transactions which are performed at the individual customer stations. Although the customer stations may be quite distant from the LPU, a permanent record is conveniently compiled at the LPU rather than just at the customer stations. This facilitates accessibility to a permanent record for checking the transactions which are sent to the CPU.

The LPU at function 288 determines whether or not the card update flag was set, either at function 122 as a result of the discretionary file check, at function 167 as a result of inclusion of card update data in a reply message, or at function 243 as a result of an off-line cash withdrawal transaction. If the card update flag is set, the LPU at function 289 sends the card update data and a command to the CS to re-write the inserted card. In response the CS at function 290 re-writes the inserted card with the card update data. After the inserted card has been re-written, the CS at function 291 sends a response to the LPU which indicates that the inserted card has been updated.

If the card update flag is not set, or, if it is set, after the CS re-writes the inserted card, the LPU at function 292 sends a command to the CS to dispense the transaction memo to the customer. In response the CS at function 293 dispenses the transaction memo to the customer. After the transaction memo is dispensed to the customer, the CS at function 294 sends a response to the LPU which indicates that the transaction memo has been dispensed.

After the transaction memo is dispensed to the customer, the LPU at function 294A sends a command to the CS to return the inserted card to the customer. In response the CS at function 294B returns the inserted card to the customer. After the inserted card is returned to the customer, the CS at function 294C sends a response to the LPU which indicates that the inserted card has been returned.

After the inserted card is returned to the customer, the LPU at function 295 sends a command to the CS to close the protective door. In response the CS at function 296 closes the protective door. After the protective door is closed, the CS at function 297 transmits a response to the LPU which indicates that the CS has closed the protective door.

The LPU then determines at function 298 whether it is in the on-line mode or in the off-line mode. If the LPU is in the on-line mode, the LPU at function 299A assembles the transaction data for the just completed transaction(s) into a completion message. The LPU at function 299B then sends the completion message to the CPU for accounting purposes so that the CPU can adjust the customer's accounts based on the transaction data which the LPU sends in the completion message.

Meanwhile, the CS returns to its idle condition and awaits the insertion of another card.

Referring to FIG. 6, if the customer depresses the "No" response key when he is queried whether or not he wants an additional transaction, the "No" response key sends a "No" response to the LPU over data line 514 and CS data bus 318. Yes/No decoder 499 at the LPU receives the "No" response. Consequently, Yes/No response decoder 499 sends a pulse via line 516 to AND gate 622 and to AND gate 623.

AND gate 622 also receives a pulse from sequencer 314 on line 507, when the customer is queried whether or not he wants an additional transaction after a balance inquiry transaction, so that AND gate 622 is enabled and sends a pulse to OR gate 624. AND gate 623 also receives a pulse from sequencer 314 on line 619, when the customer is queried whether or not he wants an additional transaction after any other type of transaction, so that AND gate 623 is enabled and sends a pulse via line 621 to OR gate 624. In either case OR gate 624 sends a pulse via line 625 to sequencer 314 which causes sequencer 314 to apply a pulse to line 626.

The transaction data is input to magnetic tape deck, punch, etc. 627 from transaction file 327 over data line 328. In response to a pulse from sequencer 314 on line 626 magnetic tape deck, punch, etc., 627 prepares a permanent hard copy or machine readable record of the transaction data for bookkeeping purposes.

Update flip-flop 391, which is set when the LPU determines that data on the inserted card must be updated, sends a pulse over line 392 to AND gate 628. AND gate 628 also receives a pulse from sequencer 314 on line 626, so that AND gate 628 is enabled when the inserted card must be updated. If the inserted card must be updated, AND gate 628 sends a pulse via line 629 to terminal "12" of CS command encoder 317. Consequently, CS command encoder 317 sends a "12", or "re-write card", command to the CS over CS data bus 318.

CS command decoder 319 at the CS receives the "12" command. In response CS command decoder 319 sends a pulse via line 630 to card reader/writer 321, which causes card reader/writer 321 to re-write the inserted card with the card update data that the LPU sends to card reader/writer 321 from registers 337–344 over data line 360, CS data bus 318, and data line 476. After card reader/writer 321 writes the card update data on the inserted card, card reader/writer 321 sends a pulse via line 631 to response encoder 356. Response encoder 356 sends a response, which indicates that the CS has updated the inserted card, over CS data bus 381 to response decoder 358, which consequently sends a control pulse to sequencer 314 via line 357.

OR gate 378 also receives the pulse from sequencer 314 on line 626. In response OR gate 378 sends a pulse to terminal "11" of CS command encoder 317. This pulse initiates the previously described process, which causes the CS to dispense a memo to the customer, so that CS dispenses a transaction memo to the customer and provides him with a record of the transactions which he performed. After printer 372 dispenses the transaction memo to the customer, printer 372 sends a pulse via line 380 to response encoder 356. Response encoder 356 sends a response, which indicates that the CS has dispensed the transaction memo, over CS data bus 318 to response decoder 358, which consequently sends a control pulse to sequencer 314 via line 357.

After dispensation of the transaction memo, sequencer 314 sends a pulse via line 632 to OR gate 351. In response OR gate 351 sends a pulse to terminal "13" of CS command encoder 317. This pulse initiates the previously described process which causes the CS to return the inserted card to the customer. After card reader/writer 321 has returned the inserted card to the customer, card reader/writer 321 sends a pulse via line 355 to response encoder 356. Response encoder 356 sends a response, which indicates that the CS has returned the inserted card, over CS data bus 318 to response decoder 358, which consequently sends a control pulse to sequencer 314 via line 357.

In response to the control pulse, sequencer 314 sends a pulse via line 633 to terminal "17" of CS command encoder 317. Consequently, CS command encoder 317 sends a "17", or "close protective door", command to the CS over CS data bus 318.

CS command decoder 319 at the CS receives the "17" command. In response CS command decoder 319 sends a pulse via line 634 to protective door operator 410, which causes protective door operator 410 to close the protective door. After protective door operator 410 has closed the protective door, protective door operator 410 sends a pulse via line 635 to response encoder 356. Response encoder 356 sends a response, which indicates that the CS has closed the protective door, over CS data bus 318 to response decoder 358, which consequently sends a control pulse to sequencer 314 via line 357.

In response to the control pulse, sequencer 314 steps so that a pulse is applied once again to line 316. Sequencer 314 sends the pulse over line 316 to AND gate 323. AND gate 323 also receives a pulse from mode detector 307, when the LPU is in the on-line mode. If the LPU is in the on-line mode, AND gate 323 is enabled and sends a pulse to completion message assembler 326, which causes completion message assembler 326 to assemble the transaction data that is input to completion message assembler 326 from transaction file 327 over data line 328. Completion message assembler 326 thereafter sends a completion message to the CPU in response to a poll on line 329.

Sequencer 314 also sends the pulse on line 316 to terminal "$\phi\phi$" of CS command encoder 317. This initiates a previously described process which causes the CS to return to its idle condition and await another card insertion.

It has been indicated that FIG. 6 depicts only one customer station CS. The local processor LPU, however, can have more than one associated customer station CS. This simply requires addition at the local processor LPU of a distribution control and, since the customer stations are to operate asychronously, a sequencer 314 for each customer station CS.

The distribution control serves to route data from data lines 336, 451, 498, 514, 535, and 557, which appear on a data bus 318 for each customer station, to appropriate registers, in a) local memory or b) data registers which are associated with the data processing elements, at the local processor LPU. In addition, the distribution control routes responses from a response encoder 356 at each customer station CS to response decoder 358 and hence routes the control pulses from response decoder 358 to the appropriate sequencer 314.

The distribution control also serves to route data from data lines 360, 374, 406, 504, 526, and 636 to the appropriate customer station CS. Furthermore, the distribution control routes commands from CS command encoder 317 to a command decoder 319 for the appropriate customer station CS.

The distribution control may comprise conventional shift register buffer stores, electronic stepping, and gating circuits and will not be described in detail.

As noted, FIG. 6 is a schematic representation of the structure of the system. The construction can be implemented by hardware or by software using a programmed computer. Thus, the system of the present invention contemplates implementation using either a hard-wired circuit or a general purpose digital computer programmed to perform the functions of a hard-wired circuit, of a combination of both hard-wired circuitry and computer software.

Having described the invention, what is claimed is:

1. In an automated banking system which is alternatively operative in an on-line mode and an off-line mode and which is available to a plurality of customers, a method for processing banking transactions, including the steps of:

reading a card with customer identification and customer information, including customer credit information and customer available-transaction information, encoded thereon at one of a plurality of customer stations, sending said customer identification and customer information to a local processor which is associated with the plurality of customer stations over a first communication link, the plurality of customer stations being in a timesharing relationship with respect to data processing means at the local processor, assembling a request message containing at least said customer identification by means of the data processing means, when the local processor is in an on-line mode, sending the request message to a central processor over a second communication link, when the local processor is in the on-line mode, assembling a reply message containing account data associated with the identified customer, including a) account descriptions and b) account balances for the accounts of the identified customer, in response to a request message sent to the central processor, sending the reply message to the local processor over the second communication link, after the reply message has been assembled in response to a request message, determining a transaction selection by means of the data processing means at the local processor in response to the account descriptions in the reply message when the local processor is in the on-line mode and in response to the customer available-transaction information when the local processor is in the off-line mode, sending the transaction selection from the local processor to the customer station over the first communication link, permitting the identified customer to a) choose a transaction in accordance with the transaction selection and b) enter a transaction amount at the customer station, sending the transaction choice and amount from the customer station to the local processor over the first communication link, processing the transaction by means of the data processing means at the local processor in response to the transaction choice and amount a) in accordance with the account balances in the on-line mode and b) in accordance with the customer credit information in the off-line mode so as to determine the allowability of the transaction, sending execution commands from the local processor to the customer station over the first communication link, and completing the transaction at the customer station in accordance with the execution commands, whereby data processing functions associated with transactions are executed by the local processor and input/output functions associated with transactions are relegated to the customer stations.

2. The method of claim 1, further including the step of:

timesharing the central processor by means of a plurality of local processors in the on-line mode, each local processor having associated therewith a plurality of customer stations.

3. The method of claim 1, further including the step of:

analyzing the customer identification and customer information at the local processor by means of the data processing means in association with a memory at the local processor to determine whether or not the card is authorized, whereby a memory at the local processor is used in connection with checking card data, so that only a single memory must be updated, thereby reducing costs and the possibility of breaches in security.

4. The method of claim 1, further including the step of:

recording transactions on a hard copy or machine readable record at the local processor, whereby the record provides a compilation of the transactions which customers perform at the customer stations and can be readily obtained for bookkeeping purposes.

5. The method of claim 4, further including the steps of:

assembling a completion message containing data associated with the transactions by means of the data processing means, when the local processor is in the on-line mode, sending the completion message to the central processor over the second communication link, when the local processor is in the on-line mode, accounting for the transactions in response to the completion message sent to the central processor, and using the record to verify the accounting performed by the central processor in response to the completion message, whereby the accounting can be checked by means of the record kept at the local processor.

6. An automated banking system, alternatively operative in an on-line mode and an off-line mode, available to a plurality of customers for processing banking transactions, comprising:

a card with customer identification and customer information, including customer credit information and customer available-transaction information, encoded thereon, a central processor, at least one local processor, each said local processor including data processing means, each said local processor having associated therewith a plurality of customer stations which timeshare said data processing means, communication links for interconnecting said central processor and said at least one local processor and for interconnecting said at least one local processor and said plurality of customer stations, a card reader associated with each said customer station and responsive to said card for reading said customer identification and customer information and sending said customer identification and customer information to said local processor, request message assembly means associated with said timeshared data processing means and responsive in an on-line mode to at least said customer identification for preparing and sending a request message containing at least said customer identification to said central processor, reply message assembly means associated with said central processor and responsive to said request message for preparing and sending to said local processor a reply message including a) account descriptions and b) account balances for the accounts of said identified customer, a transaction controller associated with said timeshared data processing means and responsive in said on-line mode to said account descriptions in said reply message and responsive in an off-line mode to said customer available-transaction information read from said card for preparing and sending a transaction selection to said each customer station, transaction selector and amount means associated with said each customer station for permitting said identified customer to a) choose a transaction in accordance with said transaction selection and b) enter a transaction amount and for sending said transaction choice and amount to said local processor, transaction processing means associated with said timeshared data processing means and responsive to said transaction choice and amount for processing said transaction independently of said central processor in accordance with said account balances in said on-line mode and in accordance with said customer credit information in said off-line mode so as to determine the allowability of said transaction, command means associated with said local processor and responsive to said transaction processing means for preparing and sending execution commands to said each customer station, and execution means associated with said each customer station and responsive to said execution commands for completing said transaction in accordance with said execution commands, whereby said local processor executes data processing functions associated with said transactions and relegates input/output functions associated with said transactions to said customer stations.

7. The system of claim 6 including a plurality of local processors, each having associated therewith a plurality of customer stations, wherein said plurality of local processors timeshare said central processor in said online mode.

8. The system of claim 6, further comprising:

card data analyzer means associated with said data processing means, including memory means and checking means, said card data analyzer means being responsive to said customer identification and customer information for determining whether or not said card is authorized, whereby a memory at said local processor is used in connection with checking card data, so that only a single memory must be updated, thereby reducing costs and the possibility of breaches in security.

9. The system of claim 6, further comprising:

transaction recorder means associated with said local processor for preparing a hard copy or machine readable record of transactions which are completed at said plurality of customer stations, whereby said transaction recorder means provides a compilation at said local processor of transactions which customers perform at said plurality of customer stations, so that said record can be readily obtained for bookkeeping purposes.

10. The system of claim 9, further comprising:

completion message assembly means associated with said timeshared data processing means and responsive in said on-line mode to transaction data for preparing and sending a completion message containing said transaction data to said central processor, and accounting means associated with said central processor and responsive to said completion message for updating the accounts of said identified customer in accordance with said transaction data, whereby said record kept at said local processor can be used to check the updating of the accounts of said identified customer.

* * * * *

UNITED STATES PATENT AND TRADEMARK OFFICE
CERTIFICATE OF CORRECTION

PATENT NO. : 4,091,448

DATED : May 23, 1978

INVENTOR(S) : Martin B. Clausing

It is certified that error appears in the above-identified patent and that said Letters Patent are hereby corrected as shown below:

In the Abstract, Column 2, Line 2, "locl processor" should be --local processor--.

Column 1, Line 50, "disclosed" should be --discloses--.

Column 2, Line 55, "on" should be --in--.

Column 11, Line 52, "transaction" should be --transactions--.

Column 13, Line 35, "Sept." should be --(Sept.--.

Column 13, Line 61, "debittype" should be --debit-type--.

Column 14, Line 51, after "update" insert --data--.

Column 16, Line 23, "description" should be --descriptions--.

Column 17, Line 8, "quary" should be --query--.

Column 17, Line 55, "commmands" should be --commands--.

Column 22, Line 7, "ff356" should be --356--.

Column 23, line 29, "band" should be --bank--.

Column 26, Line 8, "data", first occurrence, should be --date--.

Column 31, Line 20, "detector" should be --decoder--.

Column 33, Line 59, delete "now".

UNITED STATES PATENT AND TRADEMARK OFFICE

CERTIFICATE OF CORRECTION

PATENT NO. : 4,091,448
DATED : May 23, 1978
INVENTOR(S) : Martin B. Clausing

It is certified that error appears in the above-identified patent and that said Letters Patent are hereby corrected as shown below:

Column 40, Line 12, between "withdrawal" and "over" insert --amount--.

Column 40, Line 52, delete "to".

Column 41, Line 57, between "usage" and "register" insert --date--.

Column 42, Line 2, "558" should be --585--.

Column 44, Line 41, "ANd" should be --AND--.

Column 45, Line 53, "FIg." should be --FIG.--

Column 51, Line 2, "381" should be --318--.

Column 52, Line 32, "of", first occurrence, should be --or--.

Signed and Sealed this

*Sixth* Day of *November 1979*

[SEAL]

*Attest:*

RUTH C. MASON
*Attesting Officer*

LUTRELLE F. PARKER
*Acting Commissioner of Patents and Trademarks*